(12) United States Patent
Yokote et al.

(10) Patent No.: US 8,806,272 B2
(45) Date of Patent: Aug. 12, 2014

(54) DEPENDABILITY MAINTENANCE SYSTEM, CHANGE ACCOMMODATION CYCLE EXECUTION DEVICE, FAILURE RESPONSE CYCLE EXECUTION DEVICE, METHOD FOR CONTROLLING DEPENDABILITY MAINTENANCE SYSTEM, CONTROL PROGRAM, AND COMPUTER-READABLE STORAGE MEDIUM STORING THE CONTROL PROGRAM

(75) Inventors: Yasuhiko Yokote, Tokyo (JP); Mario Tokoro, Tokyo (JP); Shuichiroh Yamamoto, Nagoya (JP); Yutaka Matsuno, Chofu (JE)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 13/990,332

(22) PCT Filed: Nov. 14, 2011

(86) PCT No.: PCT/JP2011/076219
§ 371 (c)(1),
(2), (4) Date: May 29, 2013

(87) PCT Pub. No.: WO2012/073686
PCT Pub. Date: Jun. 7, 2012

(65) Prior Publication Data
US 2013/0297972 A1 Nov. 7, 2013

(30) Foreign Application Priority Data
Nov. 30, 2010 (JP) .................................. 2010-267461
Aug. 12, 2011 (JP) .................................. 2011-177322

(51) Int. Cl.
*G06F 11/00* (2006.01)
(52) U.S. Cl.
USPC .................................................. 714/15; 714/1
(58) Field of Classification Search
USPC .............................. 714/15, 16, 20, 1, 2, 3, 4.1
See application file for complete search history.

(56) References Cited

U.S. PATENT DOCUMENTS

| | | | |
|---|---|---|---|
| 6,460,144 B1 | 10/2002 | Ashcroft et al. | |
| 7,600,160 B1 * | 10/2009 | Lovy et al. | 714/57 |

(Continued)

FOREIGN PATENT DOCUMENTS

| | | |
|---|---|---|
| JP | 2000-099359 A | 4/2000 |
| JP | 2007-249739 A | 9/2007 |
| JP | 2008-537203 A | 9/2008 |
| JP | 2009-169657 A | 7/2009 |

OTHER PUBLICATIONS

Mario Tokoro, "Challenge to Open Systems Problems", http://www.stanford.edu/class/ee380/Abstracts/100929.html, Sep. 29, 2010, pp. 1-35.

(Continued)

*Primary Examiner* — Dieu-Minh Le
(74) *Attorney, Agent, or Firm* — Lowe Hauptman & Ham, LLP

(57) ABSTRACT

A workspace computer and/or a runtime computer of the present invention determines a D value quantitatively indicative of a value of dependability of a target system, in accordance with dependability description data indicative of a requirement and specification regarding the dependability of the target system.

21 Claims, 52 Drawing Sheets

(56) References Cited

U.S. PATENT DOCUMENTS

| | | | |
|---|---|---|---|
| 7,756,735 B2 | 7/2010 | Sessions et al. | |
| 8,041,993 B2* | 10/2011 | Matsubara et al. | 714/11 |
| 8,429,450 B2* | 4/2013 | Brown et al. | 714/13 |
| 8,473,779 B2* | 6/2013 | Siewert et al. | 714/6.23 |
| 2006/0190766 A1 | 8/2006 | Adler et al. | |
| 2009/0113408 A1* | 4/2009 | Toeroe | 717/168 |
| 2009/0125892 A1* | 5/2009 | Crewdson | 717/136 |
| 2009/0182866 A1 | 7/2009 | Watanabe et al. | |
| 2012/0110583 A1* | 5/2012 | Balko et al. | 718/102 |

OTHER PUBLICATIONS

Peter Bishop et al., "A Methodology for Safety Case Development", Proceedings of the Sixth Safety-critical Systems Symposium, Feb. 1998, http://www.adelard.com/papers/sss98web.pdf, pp. 1-10.

Algirdas Avizienis et al., "Basic Concepts and Taxonomy of Dependable and Secure Computing", IEEE Transactions on Dependable and Secure Computing, vol. 1, No. 1, Jan.-Mar. 2004, pp. 11-33.

Mario Tokoro, "Dependable Operating Systems for Embedded Systems Aiming at Practical Applications", DEOS-FY2010-WP-02J, Dec. 1, 2010, pp. 1-48.

Jin Nakazawa et al., "Evaluating Degree of Systems' Dependability with Semi-Structured Assurance Case", Proceedings of the 13th European Workshop on Dependable computing(EWDC 2011), 2011, pp. 111-112.

DEOS Core Team, "Open Systems Dependability Core—Dependability Metrics", http://www.crest-os.jst.go.jp/topics/deos2009/metrics.pdf, Sep. 4, 2009, pp. 1-29.

International Search Report corresponding to PCT/JP2011/076219, dated Feb. 14, 2012.

* cited by examiner

FIG. 11

| Type of abnormality | Object | Phase | Target |
|---|---|---|---|
| Natural disaster | Availability | Specification | CPU |
| Human error | Reliability | Design | Memory |
| Malicious attack | Safety | Integration | File system |
| Hardware failure | Integrity | Verification | Network |
|  | Maintainability | Deployment | I/O |
|  |  | Maintenance | Power consumption |

FIG. 21

| Monitor node | module | |
|---|---|---|
| $2 | Module name | argument |
| Disk capacity | Monitoring of HDD | $1, $3 |
| Disk transfer amount | Monitoring of HDD | $1, $3 |

FIG. 22
Basic operation (D-Task)
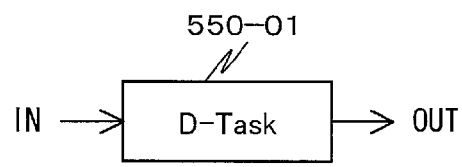
Control operation (D-Control)
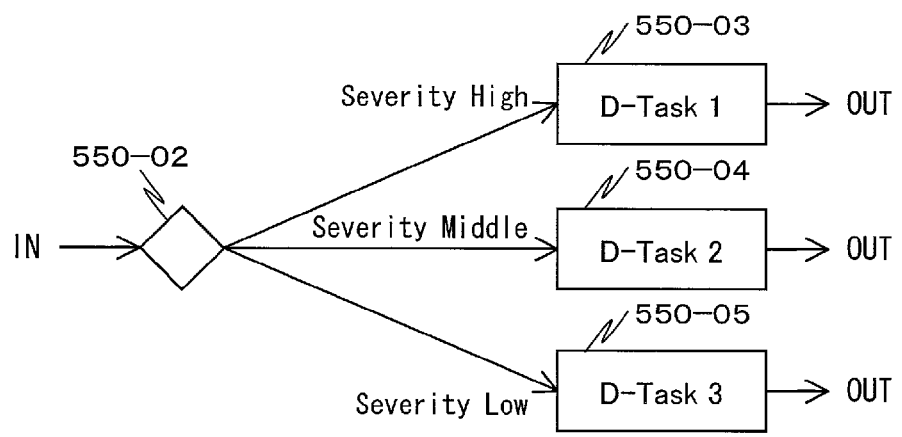

FIG. 26

Functional requirements regarding isolation items

| Isolation items | Functional requirements |
|---|---|
| Address space | Independent addressing is possible |
| Name space | File name, process ID etc. are independent |
| Real memory | Independent access to real memory is possible |
| Cache memory | Influence of cache memory is independent |
| CPU scheduling | CPU can be used independently |
| CPU assignment | CPU assignment is independent in case of multicore configuration |
| I/O bandwidth | I/O bandwidth is independent |
| Bus bandwidth | Bus bandwidth is independent |
| Interruption | Interruption process is independent |
| Time-of-day | Date and time are independent |
| Privilege | Independent privilege is given |

FIG. 29

Part of computer representation of dependability description data

```
<?xml version="1.0" encoding="utf-8"?>
<s-model version="1.0">
    <node>
        <id>n001</id>
        <description>Continuation of WEB server
        </description>
    </node>
    <node>
        <id>n002</id>
        <description>Continuation of operation of Client
        </description>
    </node>
    <link>
        <id>l001</id>
        <left>n001</left>
        <right>n002</right>
    </link>
    <link>
        <id>l001</id>
        <left>n001</left>
        <right>n003</right>
    </link>
```

```
    <link>
        <id>l003</id>
        <left>n001</left>
        <right>n004</right>
    </link>
    <evidence>
        <id>e007</id>
        <description>Passed stress test</description>
        <uri>db://a.b.c/sm/query?e007</uri>
    </evidence>
    <evidence>
        <id>e008</id>
        <description>Passed anomaly test
        </description>
        <uri>db://a.b.c/sm/query?e008</uri>
    </evidence>
    <link>
        <id>l020</id>
        <left>n013</left>
        <right>e008</right>
    </link>
</s-model>
```

Example of D-Case

Pattern 1 (monitoring module): monitoring that '$2' of process '$1' is '$3'

| Pattern | Module | |
|---|---|---|
| $2 | Module name | Argument |
| CPU utilization ratio | Monitoring of CPU | $1, $3 |
| Memory usage | Monitoring of memory | $1, $3 |
| Disk transfer amount | Monitoring of disk | $1, $3 |

(b)

Pattern 1 (action module): limiting '$2' of process '$1' to '$3'

| Pattern | Module | |
|---|---|---|
| $2 | Module name | Argument |
| CPU utilization ratio | CPU limit | $1, $3 |
| Memory usage | Memory limit | $1, $3 |
| Disk transfer amount | Disk limit | $1, $3 |

Pattern 2 (monitoring module): monitoring that '$2' of process '$1' is '$3'

| Pattern | Module | |
|---|---|---|
| $2 | Module name | Argument |
| CPU utilization ratio | Monitoring of CPU | $1, $3 |
| Memory usage | Monitoring of memory | $1, $3 |
| Disk transfer amount | Monitoring of disk | $1, $3 |

(b)

Pattern 2 (action module): Doing '$2' to process '$1'

| Pattern | Module | |
|---|---|---|
| $2 | Module name | Argument |
| Kill | Process creation or termination | Kill, $1 |
| Restart | Process creation or termination | Restart, $1 |
| Migration | Migration | $1 |

FIG. 49

Pattern 3 (monitoring module): monitoring that '$2' of process '$1' is '$3'

| Pattern | Module | |
|---|---|---|
| $2 | Module name | Argument |
| CPU utilization ratio | Monitoring of CPU | $1, $3 |
| Memory usage | Monitoring of memory | $1, $3 |
| Disk transfer amount | Monitoring of disk | $1, $3 |
| Addition → Network traffic volume | Monitoring of network | $1, $3 |

FIG. 52

```
<?xml version="1.0" encoding="UTF-8" ?>
- <dcase:dcase xmlns:dcase="http://www.sample_dcase.co.jp/2010/06/dcase"
id="_QdCjcPOIEd-p_d8e3tzhBw">
  <dcase:description />
- <dcase:nodes>
- <dcase:node type="Context" id="id1" name="C_1">
  <dcase:description>• Reception function is realized by a set of camera and robot. There
are two sets: working one and standby one. • Recovery from failure within allowed time
indicates recovery within 30 sec when no failure occurs in standby set, and recovery
within 5 min when failure occurs in standby set.</dcase:description>
  <dcase:properties />
  </dcase:node>
- <dcase:node type="Goal" id="id2" name="G_1">
  <dcase:description>Reception function recovers from failure within allowed
time</dcase:description>
  <dcase:properties />
  </dcase:node>
- <dcase:node type="Strategy" id="id3" name="S_1">
  <dcase:description>Discussion on detection of failure and response to
failure</dcase:description>
  <dcase:properties />
  </dcase:node>
- <dcase:node type="Goal" id="id4" name="G_4">
  <dcase:description>Working set/standby set are monitored during
operation</dcase:description>
  <dcase:properties />
  </dcase:node>
- <dcase:node type="Strategy" id="id5" name="S_4">
  <dcase:description>Discussion on design, test, and operational
status</dcase:description>
  <dcase:properties />
  </dcase:node>
- <dcase:node type="Context" id="id6" name="C_3">
  <dcase:description>Specification of monitor function</dcase:description>
  <dcase:properties />
  </dcase:node>
- <dcase:node type="Goal" id="id7" name="G_8">
  <dcase:description>Design meets specification of monitor function</dcase:description>
  <dcase:properties />
  </dcase:node>
- <dcase:node type="Evidence" id="id8" name="E_1">
  <dcase:description>Specification review result</dcase:description>
  <dcase:properties />
  </dcase:node>
```

FIG. 53

```
- <dcase:node type="Goal" id="id9" name="G_9">
  <dcase:description>Monitor function is tested</dcase:description>
  <dcase:properties />
  </dcase:node>
- <dcase:node type="Evidence" id="id10" name="E_2">
  <dcase:description>Test result</dcase:description>
  <dcase:properties />
  </dcase:node>
- <dcase:node type="Goal" id="id11" name="G_10">
  <dcase:description>Individual components are monitored</dcase:description>
  <dcase:properties />
  </dcase:node>
- <dcase:node type="Monitor" id="id12" name="M_1">
  <dcase:description>Robot 1 monitor</dcase:description>
- <dcase:properties>
  <dcase:property name="Userdef002" value="main" />
  <dcase:property name="Userdef005" value="Robot [NUMBER] monitor" />
  <dcase:property name="Userdef006" value="if exec
/home/et2010/damd/RobotCheck.sh main id="{id}" {n}then exec
/home/et2010/damd/RobotError.sh main" />
  <dcase:property name="Userdef007" value="NUMBER=1" />
  </dcase:properties>
  </dcase:node>
- <dcase:node type="Monitor" id="id13" name="M_2">
  <dcase:description>Robot 2 monitor</dcase:description>
- <dcase:properties>
  <dcase:property name="Userdef002" value="backup" />
  <dcase:property name="Userdef005" value="Robot [NUMBER] monitor" />
  <dcase:property name="Userdef006" value="if exec
/home/et2010/damd/RobotCheck.sh backup id="{id}" {n}then exec
/home/et2010/damd/RobotError.sh backup" />
  <dcase:property name="Userdef007" value="NUMBER=2" />
  </dcase:properties>
  </dcase:node>
- <dcase:node type="Monitor" id="id14" name="M_3">
  <dcase:description>Camera 1 monitor</dcase:description>
- <dcase:properties>
  <dcase:property name="Userdef002" value="Camera" />
  <dcase:property name="Userdef005" value="Camera [NUMBER] monitor" />
  <dcase:property name="Userdef006" value="if exec
/home/et2010/damd/CameraCheck.sh {NUMBER} id="{id}" {n}then exec
/home/et2010/damd/CameraStatus.sh {NUMBER} camera-status" />
  <dcase:property name="Userdef007" value="NUMBER=1" />
  <dcase:property name="Userdef008" value="Score=0,Weight=1" />
  </dcase:properties>
  </dcase:node>
```

FIG. 54

```
- <dcase:node type="Monitor" id="id22" name="M_4">
  <dcase:description>Camera 2 monitor</dcase:description>
- <dcase:properties>
  <dcase:property name="Userdef002" value="Camera" />
  <dcase:property name="Userdef004" value="" />
  <dcase:property name="Userdef005" value="Camera [NUMBER] monitor" />
  <dcase:property name="Userdef006" value="if exec
/home/et2010/damd/CameraCheck.sh {NUMBER} id="[id]" [n]then exec
/home/et2010/damd/CameraStatus.sh {NUMBER} camera-status" />
  <dcase:property name="Userdef007" value="NUMBER=2" />
  <dcase:property name="Userdef008" value="Score=0,Weight=1" />
  </dcase:properties>
  </dcase:node>
- <dcase:node type="Goal" id="id15" name="G_13">
  <dcase:description>Design meets specification of switching function</dcase:description>
  <dcase:properties />
  </dcase:node>
- <dcase:node type="Monitor" id="id26" name="M_5">
  <dcase:description>When camera is off, fail over</dcase:description>
- <dcase:properties>
  <dcase:property name="Userdef002" value="OK" />
  <dcase:property name="Userdef005" value="When camera is off, [ACTION]" />
  <dcase:property name="Userdef006" value="if exec /home/et2010/damd/videocheck.sh
id="[id]" [n]then exec /home/et2010/damd/demo1.sh {ACTION} camera-error" />
  <dcase:property name="Userdef007" value="ACTION=fail-over" />
  <dcase:property name="Userdef008" value="Score=0,Weight=1" />
  </dcase:properties>
  </dcase:node>
- <dcase:node type="Context" id="id16" name="C_6">
  <dcase:description>Specification of switching function</dcase:description>
  <dcase:properties />
  </dcase:node>
  </dcase:nodes>
- <dcase:links>
- <dcase:link id="id17" name="LINK_72" source="id15" target="id26">
  <dcase:description />
  <dcase:properties />
  </dcase:link>
- <dcase:link id="id18" name="LINK_71" source="id11" target="id14">
  <dcase:description />
  <dcase:properties />
  </dcase:link>
```

FIG. 55

```
- <dcase:link id="id19" name="LINK_73" source="id11" target="id12">
  <dcase:description />
  <dcase:properties />
  </dcase:link>
- <dcase:link id="id20" name="LINK_74" source="id11" target="id13">
  <dcase:description />
  <dcase:properties />
  </dcase:link>
- <dcase:link id="id21" name="LINK_70" source="id11" target="id22">
  <dcase:description />
  <dcase:properties />
  </dcase:link>
- <dcase:link id="id23" name="LINK_78" source="id12" target="id24">
  <dcase:description />
  <dcase:properties />
  </dcase:link>
- <dcase:link id="id25" name="LINK_79" source="id13" target="id24">
  <dcase:description />
  <dcase:properties />
  </dcase:link>
  </dcase:links>
  </dcase:dcase>
```

FIG. 56

```
/* Script "robot 1 monitor" generated from Monitor: M_1 */
if exec /home/et2010/damd/RobotCheck.sh main id="id12"
then exec /home/et2010/damd/RobotError.sh main /* Script "robot 2 monitor" generated from Monitor: M_2 */
if exec /home/et2010/damd/RobotCheck.sh backup id="id13"
then exec /home/et2010/damd/RobotError.sh backup /* Script "camera 1 monitor" generated from Monitor: M_3 */
if exec /home/et2010/damd/CameraCheck.sh 1 id="id14"
then exec /home/et2010/damd/CameraStatus.sh 1 camera-status /* Script "camera 2 monitor" generated from Monitor: M_4 */
if exec /home/et2010/damd/CameraCheck.sh 2 id="id22"
then exec /home/et2010/damd/CameraStatus.sh 2 camera-status /* Script " when cameral is off, fail over" generated from Monitor: M_5 */
if exec /home/et2010/damd/videocheck.sh id="id26"
then exec /home/et2010/damd/demo1.sh fail-over camera-error
```

DEPENDABILITY MAINTENANCE SYSTEM, CHANGE ACCOMMODATION CYCLE EXECUTION DEVICE, FAILURE RESPONSE CYCLE EXECUTION DEVICE, METHOD FOR CONTROLLING DEPENDABILITY MAINTENANCE SYSTEM, CONTROL PROGRAM, AND COMPUTER-READABLE STORAGE MEDIUM STORING THE CONTROL PROGRAM

RELATED APPLICATIONS

The present application is a National Phase of International Application Number PCT/JP2011/076219, filed Nov. 14, 2011, and claims priority from Japanese Application Number 2010-267461, filed Nov. 30, 2010 and Japanese Application Number 2011-177322, filed Aug. 12, 2011.

TECHNICAL FIELD

The present invention relates to a device etc. capable of measuring and evaluating the value of dependability in a target system including dependability description data indicative of a dependability requirement at a certain time which requirement is variable on a temporal axis, thereby maintaining dependability of the target system.

BACKGROUND ART

Recently, there has been a noticeable increase in abort of systems and services which support critical social infrastructures, such as abort of online systems of banks, communication failures of mobile phones and IP phones, and security failures of various commercial services, resulting in great influence on our lives. This is primarily due to a dramatic increase in scales and complexities of such commodities and services using embedded computer systems. Further investigation of the causes shows that many cases were due to human errors.

Conventionally, reliability, availability, maintainability, safety, integrity, and confidentiality of computer systems have been discussed as attributes called dependability to be provided in computer systems (Non-patent Literature 3). In the development of embedded systems, a development project is formed initially, functional requirements and non-functional requirements of target systems and services are exactly listed as specifications, long-term verifications and tests are made, and the embedded systems are deployed. However, as described above, the number of failures is increasing day by day. In standards such as CMMI and ISO 26262, attempts to reduce human errors have been made. However, these conventional techniques and standards do not take consideration of attributes of systems under open environments.

Conventional methods are based on the assumption that the specification at the time of development is surely implemented as a computer program, and the specification does not change after commodities and services are deployed. However, open environments change from the time of development to the time of deployment. Furthermore, the environments continue to change after the deployment. Accordingly, it is necessary to respond to such changes.

In order to deal with this, Japan Science and Technology Agency established the DEOS (Dependable Embedded Operating Systems/Dependability Engineering for Open Systems) project in CREST program (http://www.crest-os.jst.go.jp/), and has researched and developed a dependable operating system for embedded systems. The DEOS project calls dependability in open environments as open systems dependability, which is defined as follows. "Functions, structures, and system boundaries of modern large-scale software systems change temporally, which may result in incompleteness and uncertainty. Such incompleteness and uncertainty cannot be removed completely, and so the modern large-scale software systems essentially have factors that may result in failures in the future (Factors of Open Systems Failure). Open Systems Dependability is the ability to perform continuously the effort to remove such factors before they cause failure and to provide appropriate and quick action when they occur in order to minimize the damage, so that the system provides safely and continuously the services expected by the users, and to maintain accountability for the system operations and processes." (see Non-patent Literature 1)

Conventionally, embedded systems are developed (not limited to development of the embedded systems) based on requirements from stakeholders and specifications reflecting the requirements. Specifically, systems are developed according to specifications summarizing functional requirements and non-functional requirements of a target system. In a case of changing a part of the system in operation, the specifications and the system implementation are updated with consistency therebetween.

One of the reasons why the specifications and the system implementation should be updated consistently is that dependability of the system (see Non-patent Literatures 1, 3 etc.) must be maintained regardless of a change in the environment. Accordingly, it must be ensured that update of dependability description data corresponding to the specifications and development and addition of a module for monitoring and controlling a system for realizing the specification are made in consistency with the specifications.

Non-patent Literature 2 describes that a document called a Safety Case, which indicates the safety of a system, should be updated in accordance with a change in the system throughout the lifecycle of the system (e.g. concept, development, operation, maintenance, update, destruction).

The Safety Case is a structured document which presents the grounds (evidence) for the safety of a system. The Safety Case has so prevailed in the United Kingdom and other countries that it is mandatory to submit a Safety Case to the certification organization in the development and operation of a system requiring high safety, such as a nuclear plant. The Safety Case is prevailing worldwide. For example, ISO 26262, which is a functional safety standard for automobiles, makes it mandatory to submit a Safety Case.

CITATION LIST

Patent Literatures

[Patent Literature 1]
U.S. Pat. No. 7,756,735, specification (Jul. 13, 2010)

Non-Patent Literatures

[Non-Patent Literature 1]
Mario Tokoro, "Challenge to Open Systems Problems" Sep. 29, 2010. http://www.stanford.edu/class/ee380/Abstracts/100929.html [retrieved on Jul. 7, 2011]
[Non-Patent Literature 2]
Peter Bishop and Robin Bloomfield, "A Methodology for Safety Case Management," Safety Critical System Symposium, 1998. http://www.adelard.com/papers/sss98web.pdf [retrieved on Jul. 7, 2011]

[Non-patent Literature 3]

Algirdas Avizienis, Jean-Claude Laprie, Brian Randell, and Carl Landwehr, "Basic Concepts and Taxonomy of Dependable and Secure Computing," IEEE Transactions on Dependable and Secure Computing, vol. 1, no. 1, pp. 11-33, January-March 2004, doi:10.1109/TDSC.2004.2.

[Non-patent Literature 4]

Mario Tokoro, JST-CREST "Dependable Operating System for Embedded System intended for Practical Use—DEOS Project—White Paper Version 2.0", DEOS-FY201-WP-02J, 2010 Dec. 1

[Non-patent Literature 5]

Jin Nakazawa, Yutaka Matsuno, and Hideyuki Tokuda, "Evaluating Degree of Systems' Dependability with Semi-Structured Assurance Case" Proceedings of the 13th European Workshop on Dependable Computing (EWDC 2011), 2011.

[Non-patent Literature 6]

DEOS Core Team, "Open Systems Dependability Core—Dependability Metrics—", [online], 2009 Sep. 4, Japan Science and Technology Agency, [retrieved on Feb. 3, 2012], Internet <URL: http://www.crest-os.jst.go.jp/topics/deos2009/metrics.pdf>

SUMMARY OF INVENTION

Technical Problem

Increase in scalability and complexity of the system also makes requirements and specifications to the systems and services provided by the systems complicated. Consequently, it is impossible to extract all requirements completely before developing a system and to describe all the specifications before developing the systems (incompleteness in specification). The incompleteness in specification makes corresponding implementation incomplete (incompleteness in implementation), making it impossible to completely grasp behaviors of the services provided by the systems. This makes it unclear "what should be ensured to what extent?" and "whether it can be ensured or not". Furthermore, such incompleteness may result in a difference in understanding (misunderstanding) of a requirement to the system or service among stakeholders or human errors.

Furthermore, a new requirement for responding to the aforementioned environment change arises. A requirement at the time of development must be modified. It is impossible to know "how the environment will change?" beforehand, and therefore it is also impossible to know "whether the current operation of the system can surely deal with an environment change". Such uncertainty in a change makes it difficult to predict the operation of the system, resulting in system failure.

Due to such incompleteness and uncertainty, the investigation of the cause when system failure occurs takes more time and a suitable response to the system failure becomes difficult, making it difficult for a stakeholder to fulfill accountability.

Under such circumstances, conventionally, in Non-patent Literature 2, a response to failure supposed at the time of system development is described as a Safety Case and agreed among stakeholders, thereby fulfilling accountability of the stakeholders at the time of occurrence of failure. However, it is impossible to respond to a change in Safety Case due to an environment change.

Non-patent Literature 3 describes an attempt to prevent occurrence of failure by grasping failure in terms of changes "Faults-Errors-Failures". However, such a technique cannot deal with incompleteness and uncertainty mentioned above.

Non-patent Literatures 5 and 6 describe a method for dealing with the incompleteness or the uncertainty. However, the description is separated from the runtime environment, and modeling the description, and measuring and evaluating the value of the dependability are possible only in design.

On the other hand, Patent Literature 1 describes a method for mathematically controlling the complexity of Enterprise Architecture. Controlling the complexity may be expected to improve dependability, but Patent Literature 1 does not deal with the incompleteness and uncertainty.

Furthermore, in a conventional method for developing a system, requirements from a plurality of stakeholders are not summarized in the agreed-upon specification and difficult to be summarized in the specification. Besides, in a case where a part of the system is changed after the operation of the system starts, it is impossible to maintain consistency between the specification and a change in the system implementation.

For example, in the case of a Safety Case, there is no practical system which maintains consistency between (i) a response to failure which is agreed among stakeholders and (ii) actual response by the target system to failure and development and addition of a system-monitoring control section etc. Such consistency between the Safety Case and the target system must be maintained substantially by humans, which raises many problems such as time-lag between update of the system and update of the Safety Case. As far as the inventors know, in general, there is no practical system which ensures consistency between a document such as a Safety Case described in format understandable by a wide variety of stakeholders including the certification organization etc. and an actual operation of a system.

The present invention was made in view of the foregoing problems. An objective of the present invention is to realize a dependability maintenance device etc. which makes it possible to assist maintenance of (sustaining) dependability of a target system and makes it easy to maintain consistency between specifications of the target system and the system implementation, in an open environment with potential incompleteness and uncertainty. Herein, definition of dependability of a system is extended from that of Non-patent Literature 3 etc. to include agreement among stakeholders.

Solution to Problem

In order to solve the foregoing problems, a dependability maintenance system of the present invention is a dependability maintenance system for maintaining dependability of a target system, including: a change accommodation cycle execution device for executing a change accommodation cycle for adding and/or modifying dependability description data indicative of a requirement and specification regarding the dependability of the target system, in accordance with a change in a requirement and specification regarding the target system, during development of the target system or during update of the target system in operation; a failure response cycle execution device for executing a failure response cycle for avoiding abort of the target system based on the dependability description data when occurrence of failure or a sign of failure is detected during operation of the target system, and change request transmission means for, when the failure response cycle execution device detects the occurrence of the failure or the sign of the failure and abort of the target system is unavoidable, transmitting a request for changing the dependability description data to the change accommodation cycle execution device.

A method of the present invention for controlling a dependability maintenance system is a method for controlling a dependability maintenance system for maintaining dependability of a target system, the method including: a change accommodation cycle carried out by a change accommodation cycle execution device in the dependability maintenance system, for adding and/or modifying dependability description data indicative of a requirement and specification regarding the dependability of the target system, in accordance with a change in a requirement and specification regarding the target system, during development of the target system or during update of the target system in operation; a failure response cycle carried out by a failure response cycle execution device in the dependability maintenance system, for avoiding abort of the target system based on the dependability description data when occurrence of failure or a sign of failure is detected during operation of the target system, and when the failure response cycle execution device detects the occurrence of the failure or the sign of the failure and abort of the target system is unavoidable, transmitting a request for changing the dependability description data to the change accommodation cycle execution device.

With the arrangements, when the failure response cycle execution device detects occurrence of failure of the target system or a sign of failure of the target system and determines that abort of the target system is unavoidable, the failure response cycle execution device can transmit a request for changing dependability description data to the change accommodation cycle execution device.

Consequently, when the change accommodation cycle execution device receives the request for changing dependability description data from the failure response cycle execution device, the change accommodation cycle execution device can change the dependability description data in accordance with the request.

Therefore, the failure response cycle execution device and the change accommodation cycle execution device can collaborate with each other to smoothly carry out a series of processes in which occurrence of failure of the target system or a sign of failure of the target system is detected in the failure response cycle and when abort of the target system is unavoidable, dependability description data is changed in the change accommodation cycle. This allows continuously maintaining dependability of the target system in an open environment.

The dependability maintenance system including the change accommodation cycle execution device and the failure response cycle execution device may be realized by a computer. In this case, the scope of the invention also encompasses a program of the dependability maintenance system for causing a computer to function as the means to realize the dependability maintenance system by the computer, and a computer-readable storage medium storing the program.

Advantageous Effects of Invention

As described above, a dependability maintenance system of the present invention includes: a change accommodation cycle execution device for executing a change accommodation cycle for adding and/or modifying dependability description data indicative of a requirement and specification regarding the dependability of the target system, in accordance with a change in a requirement and specification regarding the target system, during development of the target system or during update of the target system in operation; a failure response cycle execution device for executing a failure response cycle for avoiding abort of the target system based on the dependability description data when occurrence of failure or a sign of failure is detected during operation of the target system, and change request transmission means for, when the failure response cycle execution device detects the occurrence of the failure or the sign of the failure and abort of the target system is unavoidable, transmitting a request for changing the dependability description data to the change accommodation cycle execution device.

A method of the present invention for controlling a dependability maintenance system includes: a change accommodation cycle carried out by a change accommodation cycle execution device in the dependability maintenance system, for adding and/or modifying dependability description data indicative of a requirement and specification regarding the dependability of the target system, in accordance with a change in a requirement and specification regarding the target system, during development of the target system or during update of the target system in operation; a failure response cycle carried out by a failure response cycle execution device in the dependability maintenance system, for avoiding abort of the target system based on the dependability description data when occurrence of failure or a sign of failure is detected during operation of the target system, and when the failure response cycle execution device detects the occurrence of the failure or the sign of the failure and abort of the target system is unavoidable, transmitting a request for changing the dependability description data to the change accommodation cycle execution device.

Therefore, the failure response cycle execution device and the change accommodation cycle execution device can collaborate with each other to smoothly carry out a series of processes in which occurrence of failure of the target system or a sign of failure of the target system is detected in the failure response cycle and when abort of the target system is unavoidable, dependability description data is changed in the change accommodation cycle. This allows continuously maintaining dependability of the target system in an open environment.

For a further understanding of the nature and advantages of the invention, reference should be made to the ensuing detailed description taken in conjunction with the accompanying drawings.

BRIEF DESCRIPTION OF DRAWINGS

FIG. 11 is an explanatory view showing a method described in Non-patent Literature 5.

FIG. 21 is an explanatory view showing an example of a table defining correspondence between a monitor node and a monitoring module, which table is used in the failure-occurrence detection process in FIG. 20.

FIG. 22 is an explanatory view schematically showing a configuration of a script used in the failure-occurrence detection process in FIG. 19.

FIG. 26 is a table summarizing examples of functional requirements for individual isolation items realized by an isolation section of the runtime computer in the dependability maintenance system in FIG. 1.

FIG. 29 shows a part of a list of the dependability description data in FIG. 5 which is described in XML as an example of computer representation.

FIG. 46 shows examples of a D-Case pattern <=> module correspondence table used in the failure response system in FIG. 42. (a) of FIG. 46 shows a correspondence table regarding a monitoring module, and (b) of FIG. 46 shows a correspondence table regarding an action module.

FIG. 48 shows examples of the D-Case pattern <=> module correspondence table used in the failure response system in FIG. 42. (a) of FIG. 48 shows a correspondence table regarding a monitoring module, and (b) of FIG. 48 shows a correspondence table regarding an action module.

FIG. 49 shows an example of the D-Case pattern <=> module correspondence table used in the failure response system in FIG. 42, which is a correspondence table regarding a monitoring module.

FIG. 52 is an explanatory view showing an example in which the D-Case in FIGS. 50 and 51 is written in XML format. Extraction from one sample is divided into FIGS. 52 to 55.

FIG. 53 is an explanatory view showing an example in which the D-Case in FIGS. 50 and 51 is written in XML format. The extraction from one sample is divided into FIGS. 52 to 55.

FIG. 54 is an explanatory view showing an example in which the D-Case in FIGS. 50 and 51 is written in XML format. The extraction from one sample is divided into FIGS. 52 to 55.

FIG. 55 is an explanatory view showing an example in which the D-Case in FIGS. 50 and 51 is written in XML format. The extraction from one sample is divided into FIGS. 52 to 55.

FIG. 56 is an explanatory view showing an example of monitoring control data (failure response script) converted from the D-Case shown in FIGS. 50, 51, 52-55.

DESCRIPTION OF EMBODIMENTS

[First Embodiment]

A workspace computer 101 and/or a runtime computer 102 in accordance with the present embodiment assist maintenance of (sustaining) dependability of a target system in an open environment with potential incompleteness and uncertainty. Accordingly, as described later, the workspace computer 101 and/or the runtime computer 102 in accordance with the present embodiment obtains a D value quantitatively indicative of the value of dependability of the target system based on dependability description data which describes a specification regarding dependability of the target system (the dependability description data may be data described by a differential structure model which allows a model to change on a temporal axis and allows representation of a structure of a target system as a computable model).

The following description will discuss in detail one embodiment of the present invention with reference to FIGS. 1 to 41.

[1. Hardware Configuration]

Figure 1:
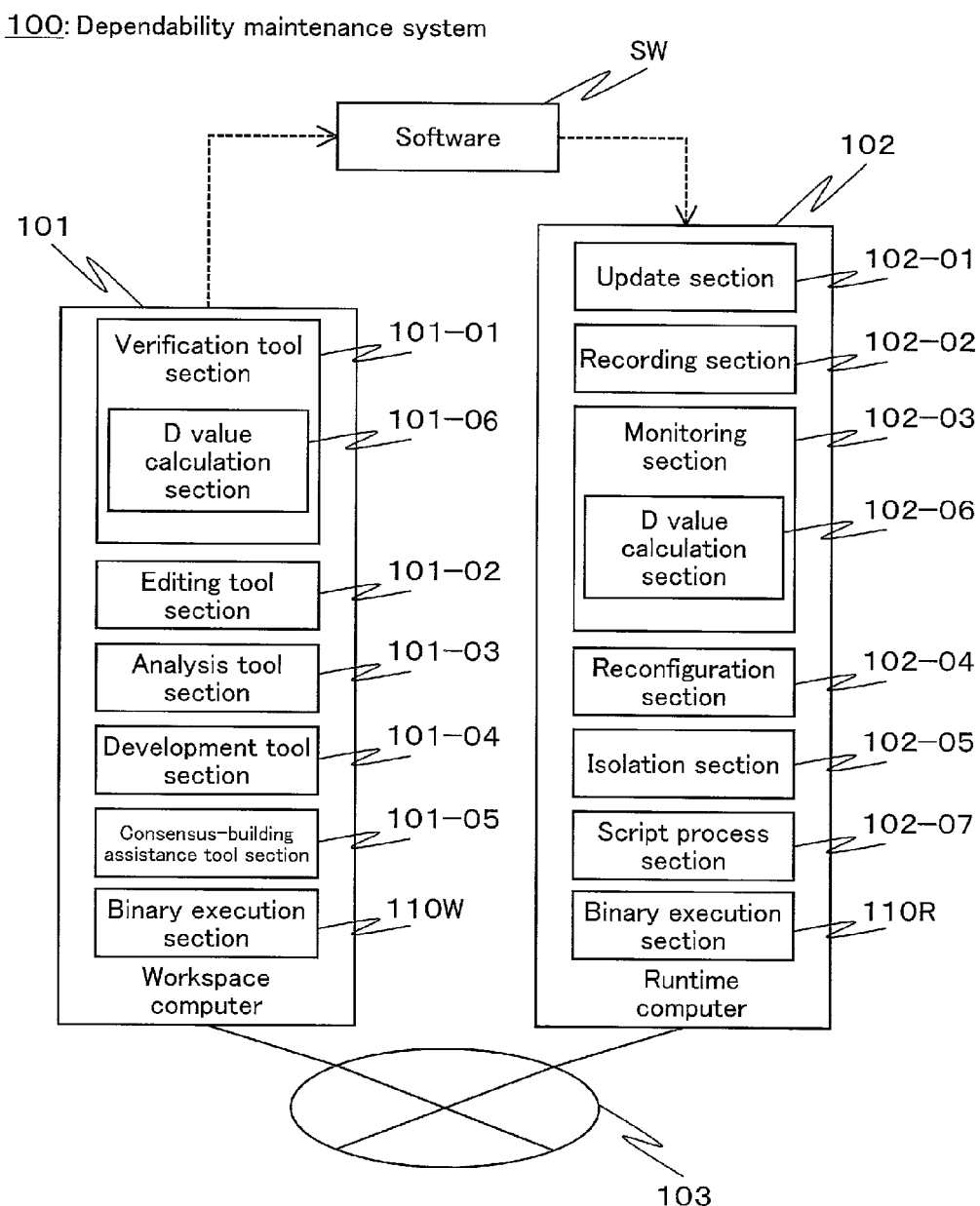
FIG. 1 is a functional block diagram schematically illustrating a configuration of a dependability maintenance system in accordance with an embodiment of the present invention.

FIG. 1 is a functional block diagram schematically illustrating a configuration of a dependability maintenance system 100 in accordance with the present embodiment.

As illustrated in FIG. 1, the dependability maintenance system 100 includes the workspace computer (dependability maintenance device, workspace device) 101 and the runtime computer (dependability maintenance device, runtime device) 102, each of which serves as a dependability maintenance device and which are connected with each other via a network 103. Software SW processed on the workspace computer 101 is deployed on the runtime computer 102 and processed thereon. A target system or application system and a support system necessary for execution thereof, such as a library, middleware, and a system service, are included in the runtime computer 102. The software SW has a representation form capable of being processed by a binary execution section 110 (110W, 110R; binary execution section 110W of workspace computer 101 and binary execution section 110R of runtime computer 102 are distinguished from each other by affixing W or R). The software SW includes an application executed in the target system and a runtime environment necessary for execution thereof, such as a library, middleware, and a system service.

The workspace computer 101 includes a verification tool section 101-01, an editing tool section 101-02, an analysis tool section 101-03, a development tool section 101-04, a consensus-building assistance tool section 101-05, and the binary execution section 110W. Although functional blocks of the workspace computer 101 are not limited to them, these representative functions are described shortly below.

The verification tool section 101-01 verifies the software SW. The editing tool section 101-02 edits the software SW. The analysis tool section 101-03 analyzes the software SW. At that time, information from the runtime computer 102 may be used. The development tool section 101-04 is used to develop the software SW.

The runtime computer 102 includes an update section 102-01, a recording section 102-02, a monitoring section 102-03, a reconfiguration section (reconfiguration means) 102-04, an isolation section 102-05, a script process section (script process means) 102-07, and the binary execution section 110R. Although functional blocks of the runtime computer 102 are not limited to them, these representative functions are described shortly below.

The update section 102-01 updates the software SW processed on the runtime computer 102. The recording section 102-02 records a state inside the runtime computer 102. The recording section 102-02 may record the state in accordance with an instruction of the software SW or in accordance with predetermined setting. The monitoring section 102-03 acquires the state inside the runtime computer 102 and calculates a D value which will be mentioned later. The monitoring section 102-03 may acquire the state in accordance with an instruction of the software SW or in accordance with predetermined setting. The reconfiguration section 102-04 changes a configuration inside the runtime computer 102. The reconfiguration section 102-04 may change the configuration in accordance with an instruction of the software SW or in accordance with predetermined setting or in accordance with a script. The isolation section 102-05 separates a component of the configuration inside the runtime computer 102 and makes the component independent. The script process section 102-07 executes a script derived from dependability description data which will be mentioned later.

The dependability maintenance system 100 may be a system constituted by two separate computers as illustrated in FIG. 1, or may be a system constituted by a single computer, or may be a system consisting of groups of computers, each group consisting of two or more computers. In this case, individual computers are connected with each other via a network 103.

Figure 2:
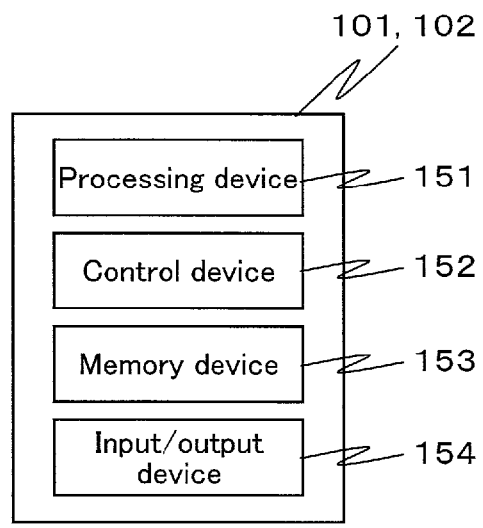
FIG. 2 is a block diagram showing a hardware configuration of a workspace computer and a runtime computer in the dependability maintenance system in FIG. 1.

FIG. 2 illustrates a hardware configuration of each of the workspace computer 101 and the runtime computer 102. The most basic configuration of each of the workspace computer 101 and the runtime computer 102 is a computer including a processing device 151, a control device 152, a memory device 153, an input/output device 154 which are connected with one another via an instruction bus and a data bus. In accordance with information of bit data supplied from the input/output device 154, the processing device 151 carries out operations such as arithmetic operation, logic operation, comparison operation, and shift operation. Data obtained as a result of the operation is stored in the memory device 153 and supplied from the input/output device 154 according to necessity. A series of these processes are controlled by the control device 152 in accordance with a software program stored in the memory device 153. Each of the workspace computer 101 and the runtime computer 102 in accordance with the present embodiment is hardware having the aforementioned basic functions as a computer, and is controlled by programs such as an operating system, a device driver, middleware, and application software.

Figure 3:
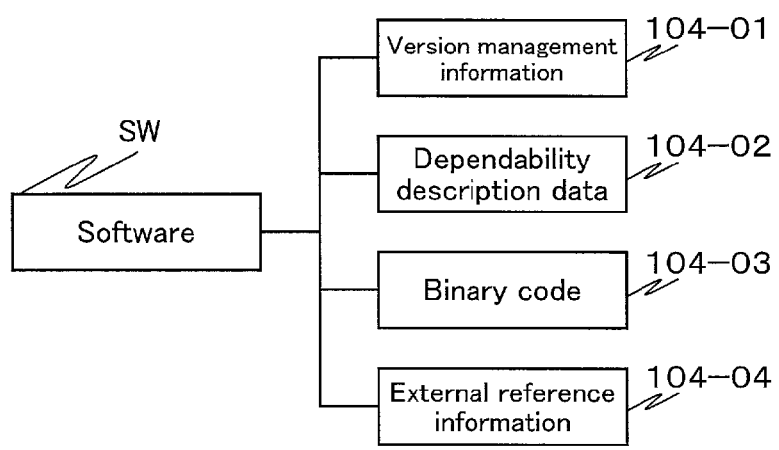
FIG. 3 is a block diagram showing a configuration example of software used in the dependability maintenance system in FIG. 1.

FIG. 3 illustrates a configuration example of the software SW in accordance with the present embodiment. Version management information 104-01 is information regarding management of the version of the software SW, and may include a time stamp. Dependability description data 104-02 is information regarding dependability description data (mentioned later) on the software SW. A binary code 104-03 is information on the process of the software SW written in representation form capable of being interpreted and executed by the binary execution section 110. External reference information 104-04 is information regarding external software which is required by the software SW or on which the software SW depends.

[2. Dependability Description Data]

Figure 4:
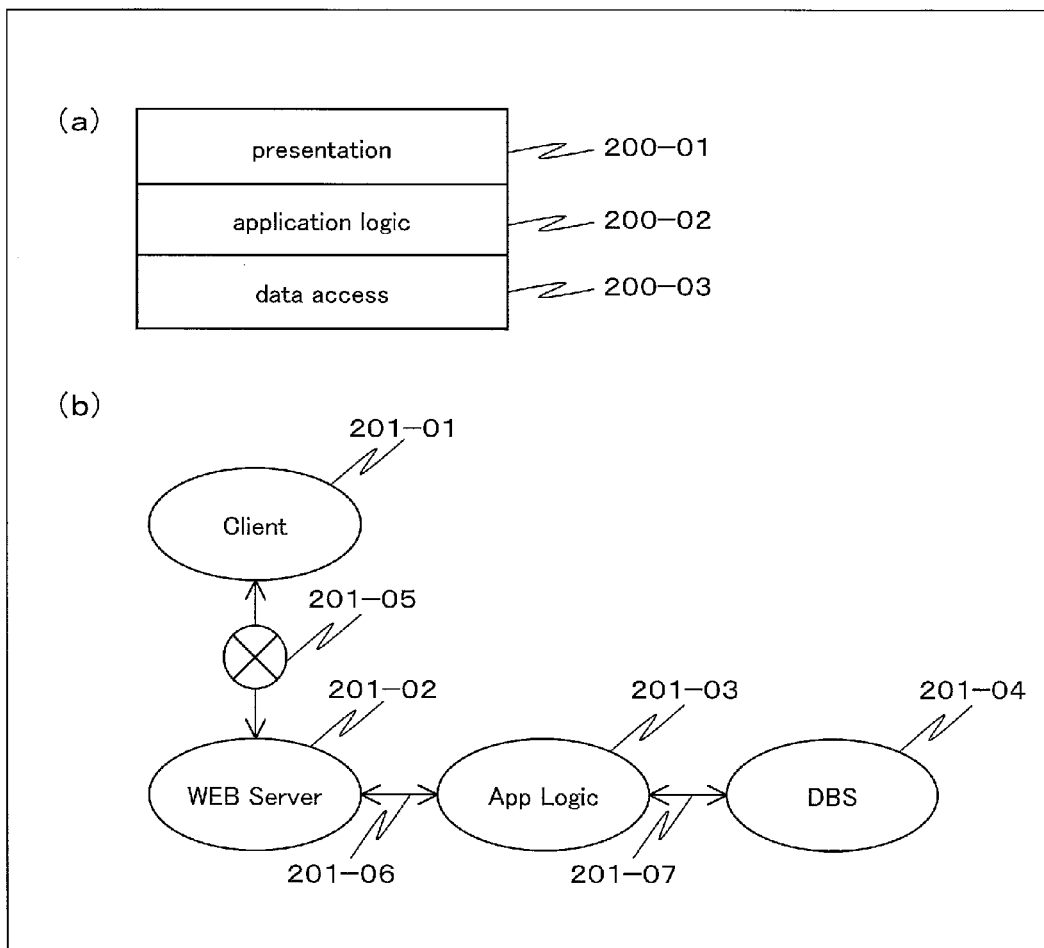
FIG. 4 is an explanatory view illustrating an example of an application processed in the dependability maintenance system illustrated in FIG. 1. (a) of FIG. 4 illustrates that the application has a three-layered structure model. (b) of FIG. 4 illustrates a configuration example of implementing the three-layered structure model.

FIG. 4 is an explanatory view illustrating an example of an application. Description as to the application will be provided below using a WEB application as an example.

(a) of FIG. 4 illustrates that the application has a three-layered structure model. A presentation layer 200-01 is in charge of displaying (and inputting) the application. A data access layer 200-03 stores and manages data required when the application is executed. An application logic layer 200-02 carries out a calculation process required as the application based on an input from a user, and supplies the result to the data access layer 200-03. Alternatively, the application logic layer 200-02 acquires data required by the application from the data access layer 200-03, processes the data, and supplies the processed data to the presentation layer 200-01 to present the data to the user.

(b) of FIG. 4 illustrates a configuration example of implementing the three-layered structure model. A WEB Server 201-02 corresponds to the presentation layer 200-01. A Client 201-01 is a user of the application, and uses the WEB Server 201-02 via a network 201-05. A combination of the Client 201-01, the network 201-05, and the WEB Server 201-02 may be considered as corresponding to the presentation layer 200-01. An App Logic 201-03 corresponds to the application logic layer 200-02. The App Logic 201-03 exchanges information with the WEB Server 201-02 via communications path 201-06, and exchanges information with a DBS 201-04 via a communications path 201-07. The DBS 201-04 is a database, and manages (e.g. stores, acquires) data processed by the App Logic 201-03 or data required for a process by the App Logic 201-03. The WEB Server 201-02, the App Logic 201-03, and the DBS 201-04 are executed on the runtime computer 102. The WEB Server 201-02, the App Logic 201-03, and the DBS 201-04 may be executed on a single computer or may be executed on respective computers.

Figure 5:
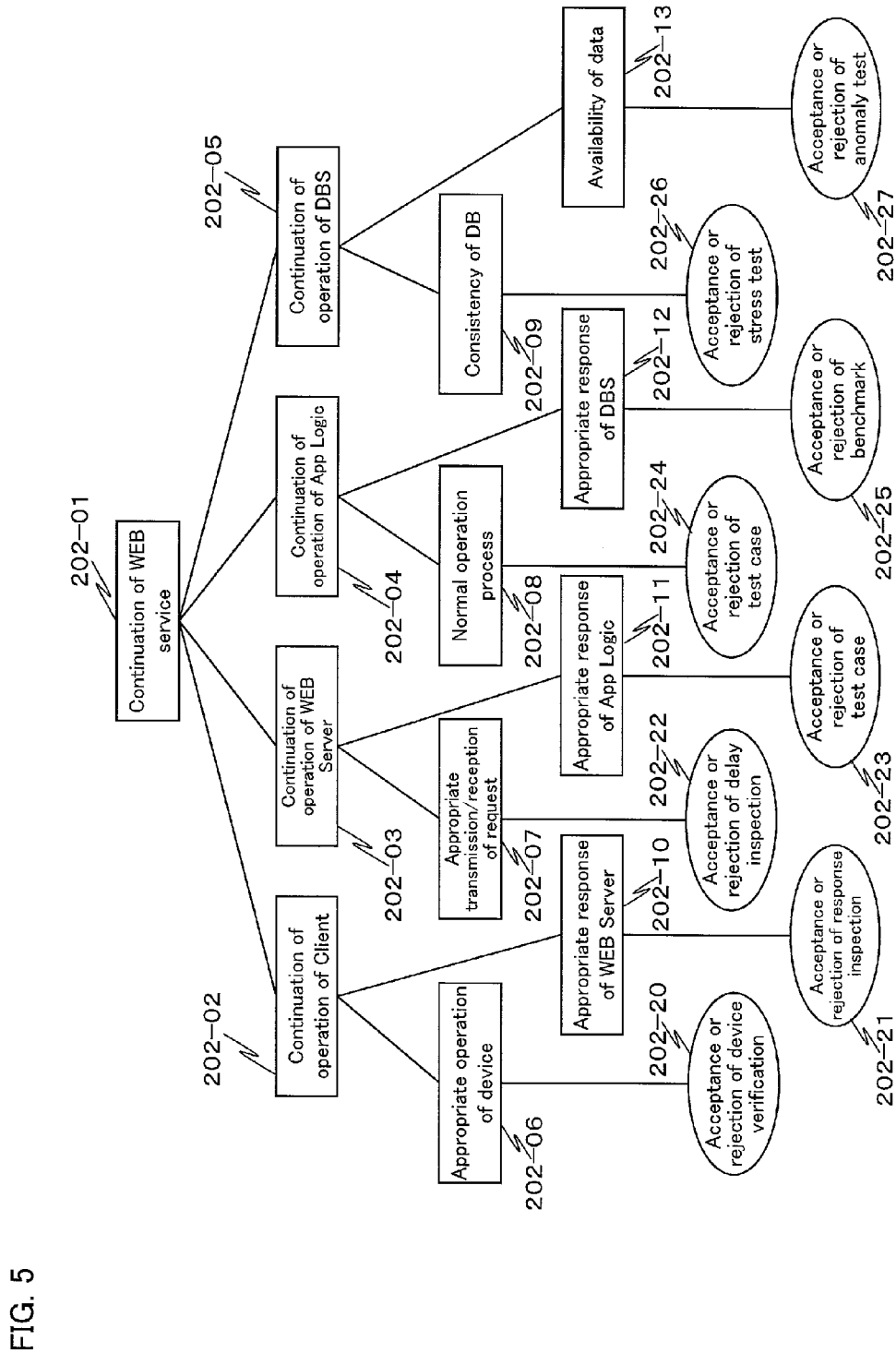
FIG. 5 is an explanatory view showing an example (in normal state) of dependability description data of an application processed in the dependability maintenance system in FIG. 1.

FIG. 5 illustrates an example of dependability description data of the application. This example is dependability description data described in terms of continuation of a service. The dependability description data is a model that describes requirements agreed among stakeholders on dependability of the application.

The following description will discuss the example illustrated in FIG. 5. "Continuation of a WEB service" (202-01) is a goal regarding dependability of the application, and indicates that the WEB service can be continued. In order to realize this goal (202-01), the dependability description data is required to meet four attributes of "continuation of operation of Client" (202-02), "continuation of operation of WEB Server" (202-03), "continuation of operation of App Logic" (202-04), and "continuation of operation of DBS" (202-05). The four attributes correspond to client 201-001, WEB Server 201-02, App Logic 201-03, and DBS 201-04, respectively.

The four attributes can be further broken down as follows. For "continuation of operation of Client" (202-02), it is necessary to meet two attributes of "appropriate operation of a device" (202-06) and "appropriate response of a WEB Server" (202-10). For "continuation of operation of WEB Server" (202-03), it is necessary to meet two attributes of "appropriate transmission/reception of request" (202-07) and "appropriate response of App Logic" (202-11). For "continuation of operation of App Logic" (202-04), it is necessary to meet two attributes of "normal operation process" (202-08) and "appropriate response of DBS" (202-12). For "continuation of operation of DBS" (202-05), it is necessary to meet two attributes of "consistency of DB" (202-09) and "availability of data" (202-13).

Whether these attributes are met or not can be grasped and determined by referring to the results of monitoring in runtime, including various verifications shown in elliptic nodes. For example, whether the attribute of "appropriate operation of a device" (202-06) is met or not can be determined according to "acceptance or rejection of device verification" (202-20) by an exhaustive test. Whether the attributes of "appropriate response of a WEB Server" (202-10) and "appropriate transmission/reception of request" (202-07) are met or not can be determined according to "acceptance or rejection of response inspection" (202-21) and "acceptance or rejection of delay inspection" (202-22) in log verification in runtime, including a benchmark of accessing the server. Whether the attributes of "appropriate response of App Logic" (202-11) and "ordinary operation process" (202-08) are met or not can be determined according to "acceptance or rejection of a test case" (202-23 and 202-24) similarly by an exhaustive test. Whether the attributes of "appropriate response of DBS" (202-12), "consistency of DB" (202-09), and "availability of data" (202-13) are met or not can be determined according to "acceptance or rejection of a benchmark" (202-25), "acceptance or rejection of a stress test" (202-26), and "acceptance or rejection of an anomaly test" (202-27) respectively by a benchmark, a stress test (overload test), and an anomaly test (anti-abnormality test) or by verification of database access log in runtime. In the present embodiment, verifications shown in these elliptic nodes are treated as grounds (evidences) which show that attributes of corresponding nodes are met. A measurement value measured by a later-mentioned monitor node is used as these evidences, too.

Figure 6:
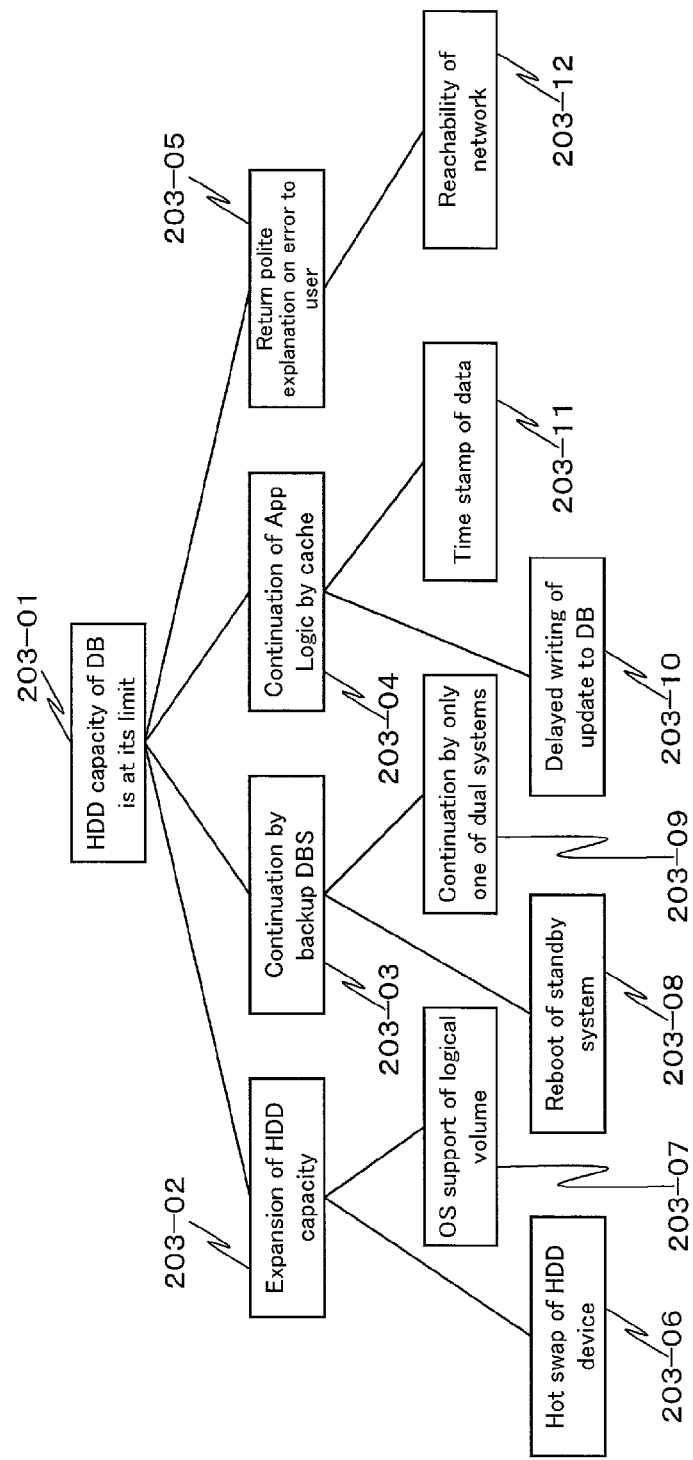
FIG. 6 is an explanatory view showing an example (on risk base) of dependability description data of an application processed in the dependability maintenance system in FIG. 1.

While FIG. 5 shows dependability description data regarding a system in normal state, FIG. 6 shows an example of dependability description data on a scenario base which takes a risk into consideration. That is, dependability description data is described according to a scenario of "if . . . occurs, is it possible to . . . ?". For instance, in the example of FIG. 6, a top node describes a risk that "HDD capacity of DB is at its limit (if the capacity of a hard disk constituting a database system reaches its margin, what response can be made?)" (203-01). Four countermeasures against the risk are described at next level nodes. "Expansion of HDD capacity" (203-02) describes that the capacity can be expanded by addition of a hard disk, replacement of the hard disk with a new one with larger capacity etc. "Continuation by backup DBS" (203-03) describes that a backup system is provided for a database system and a database function can be continued using the backup system. "Continuation of App Logic by cache" (203-04) describes that even if a database cannot be used, an application can be continued using data partially cached. "Return polite explanation on error to a user" (203-05) describes that even if an application cannot be continued any more, it is possible to provide a user with some explanation.

These nodes (203-02 to 203-05) describe functions supporting these capabilities by their respective sub-nodes. For example, "expansion of HDD capacity" (203-02) is made feasible by a function of "hot swap of HDD device (exchange of hard disk drives while they continue to operate) (203-06) or a function of "OS support of logical volume" (system function in which volume capacity is not limited by capacity of hard disk drive) (203-07). "Continuation by backup DBS" (203-03) is made feasible by a function of "reboot of standby system (a plurality of database systems are provided and when one system is aborted, a standby system is booted up to take over the function)" (203-08), or a function of "continuation by only one of dual systems (function realized by a two-system database system can be continued even when one system thereof is aborted) (203-09). "Continuation of App Logic by cache" (203-04) is made feasible by a function of "delayed writing of update to DB" (delay access to database until it is restored) (203-10) or a function of "time stamp of data (application logic can be continued with old data by referring to time stamp)" (203-11). "Return polite explanation on error to a user" (203-05) at the last is made feasible by reachability of network (network communications to users are possible)" (203-12).

Fulfillments of attributes of these edge nodes (203-06 to 203-12) are described by elliptic nodes (evidences) in FIG. 5. They are omitted in FIG. 6.

Either of the dependability description data in FIG. 5 and the dependability description data in FIG. 6 may be used as dependability description data agreed among stakeholders. Alternatively, the dependability description data in FIG. 5 and the dependability description data in FIG. 6 may be used as a normal system and a risk system, respectively, each of which is agreed among stakeholders and each of which is a part of dependability description data at a higher order.

Figure 7:
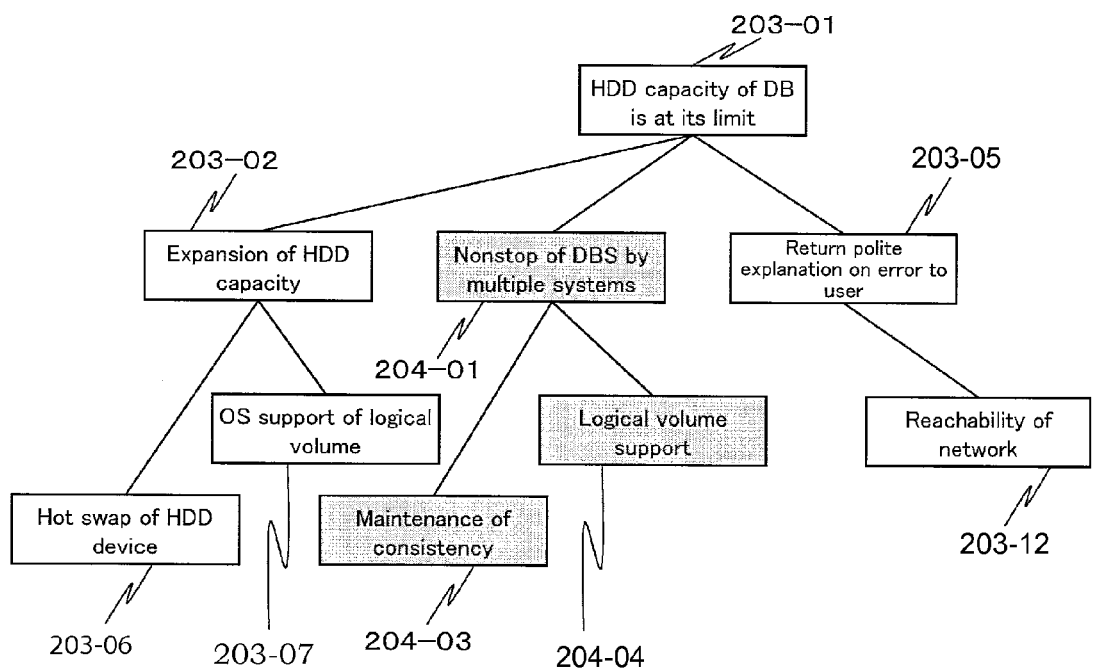
FIG. 7 is an explanatory view for illustrating a description example of dependability description data indicative of a difference between the dependability description data in FIG. 6 and dependability description data changed according to a change in stakeholder's requirements.

FIG. 7 is an explanatory view for illustrating a description example of dependability description data indicative of a difference between dependability description data changed according to a change in stakeholder's requirements and the dependability description data in FIG. 6.

In FIG. 6, the possibility of "expansion of HDD capacity" (203-02) is important for continuation of the application. In contrast thereto, FIG. 7 describes dependability description data at a time different from that of FIG. 6 in a case where a stakeholder determines to increase and enhance an amount of investment to a database system because of some environment change, such as business upturn. That is, in place of "continuation by backup DBS" (203-03) in FIG. 6, there is described a case where employment of a function of "non-stop of DBS by multiple systems" (204-01) is determined. Non-stop of a database unnecessitates "continuation of App Logic by cache" (203-04) in FIG. 6. Consequently, hatched nodes in FIG. 7 are differences from FIG. 6.

Figure 8:
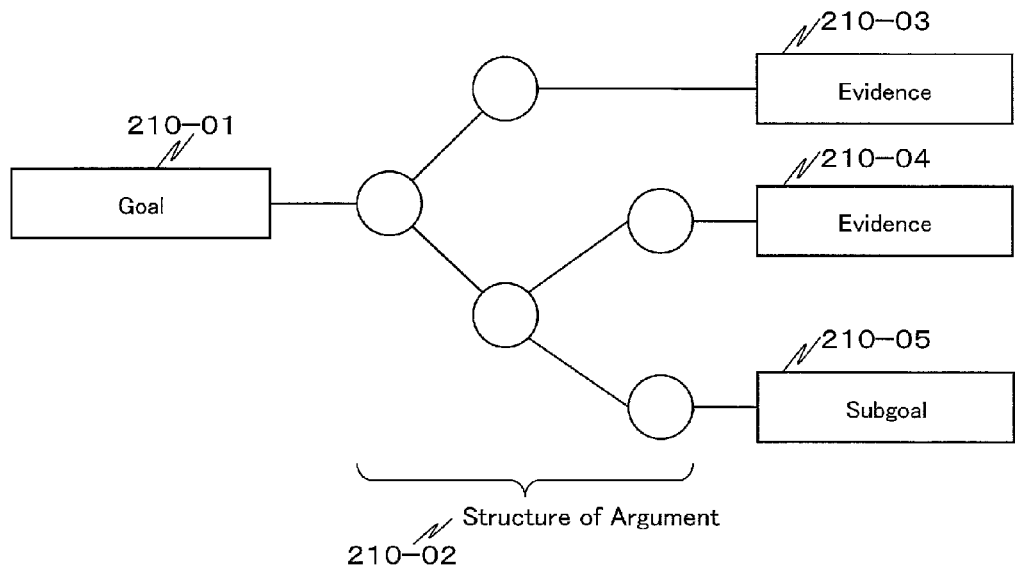
FIG. 8 is an explanatory view showing a basic structure of a D-Case used as dependability description data in the dependability maintenance system in FIG. 1 and the failure response system in FIG. 42.
Figure 9:
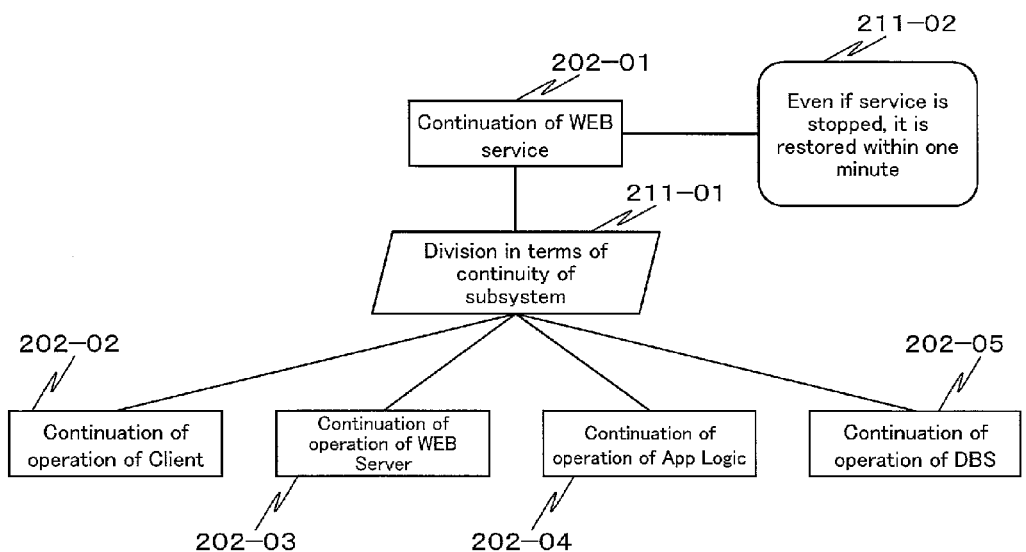
FIG. 9 is an explanatory view showing representation by a D-Case description which is a part of the dependability description data in FIG. 5.

The dependability description data illustrated in FIGS. 5 to 7 may be described using a Safety Case representation (Non-patent Literature 2) or may be described using a D-Case representation as illustrated in FIGS. 8 and 9.

With reference to FIG. 8, the following description will discuss a basic structure of a D-Case representation. A requirement from stakeholders, concerning dependability of a target system, is described as a top goal 210-01. A top goal indicates a proposition to be agreed among stakeholders in terms of the target system. An example of the proposition is "the target system meets Safety Integrity Level 3 defined in function safety standard IEC61508" etc. How the top goal is met is detailed by a tree structure, and a sub-goal 210-05 obtained as a result of the detailing is detailed similarly by a tree structure. A sub-goal indicates a proposition obtained by dividing a matter to show the top goal. A sub-goal is divided into smaller sub-goals. In the present embodiment, a top goal and sub-goals are generally referred to as goals. The process of the detailing is referred to as "structure of argument" 210-02.

In dividing the goal into sub-goals, there may be described a strategy indicative of a subsidiary explanation (reason, logic) on the dividing. For example, a part of the dependability description data in FIG. 5 can be expressed by a D-Case description as illustrated in FIG. 9. The goal is "continuation of WEB service" (202-01), and four items linking to the goal, i.e. "continuation of operation of Client" (202-02), "continuation of operation of WEB Server" (202-03), "continuation of operation of App Logic" (202-04), and "continuation of operation of DBS" (202-05) are sub-goals, respectively. The reason why the four items are sub-goals is indicated by a strategy "division in terms of continuity of a subsystem" (211-01).

A context may link to a goal or a strategy. A context is information which complements the content of a goal or a strategy. For example, in FIG. 9, to the goal "continuation of WEB service" (202-01) is given a context which is a complementary explanation on the "continuation", stating that "even if a service is interrupted, it is restored within one minute".

The goal is provided with evidences 210-03 and 210-04 which express validity of the goal. The evidences finally certify the goal having been divided and detailed. Validity of the evidences is based on agreement among stakeholders. A goal without any evidence has some problems.

In FIGS. 5 to 9, the dependability description data is expressed by a tree structure. Alternatively, the dependability description data may be expressed by a general graph structure indicative of dependency between nodes, or may be expressed by a table format. In the present embodiment, the dependability description data will be hereinafter described using the D-Case representation.

In the present embodiment, the value of dependability is measured and evaluated using a D value calculated from the dependability description data. In the workspace computer 101, the D value is calculated by a D value calculation section (dependability value determination means) 101-06 of the verification tool section 101-01, and in the runtime computer 102, the D value is calculated by a D value calculation section (dependability value determination means) 102-06 of the monitoring section 102-03. In the workspace computer 101, the D value is used for verification of the dependability description data, and is calculated every time the dependability description data is changed. In the runtime computer 102, the D value is used for monitoring a target system which operates in accordance with the dependability description data, and is calculated in real time while the target system operates.

Figure 10:
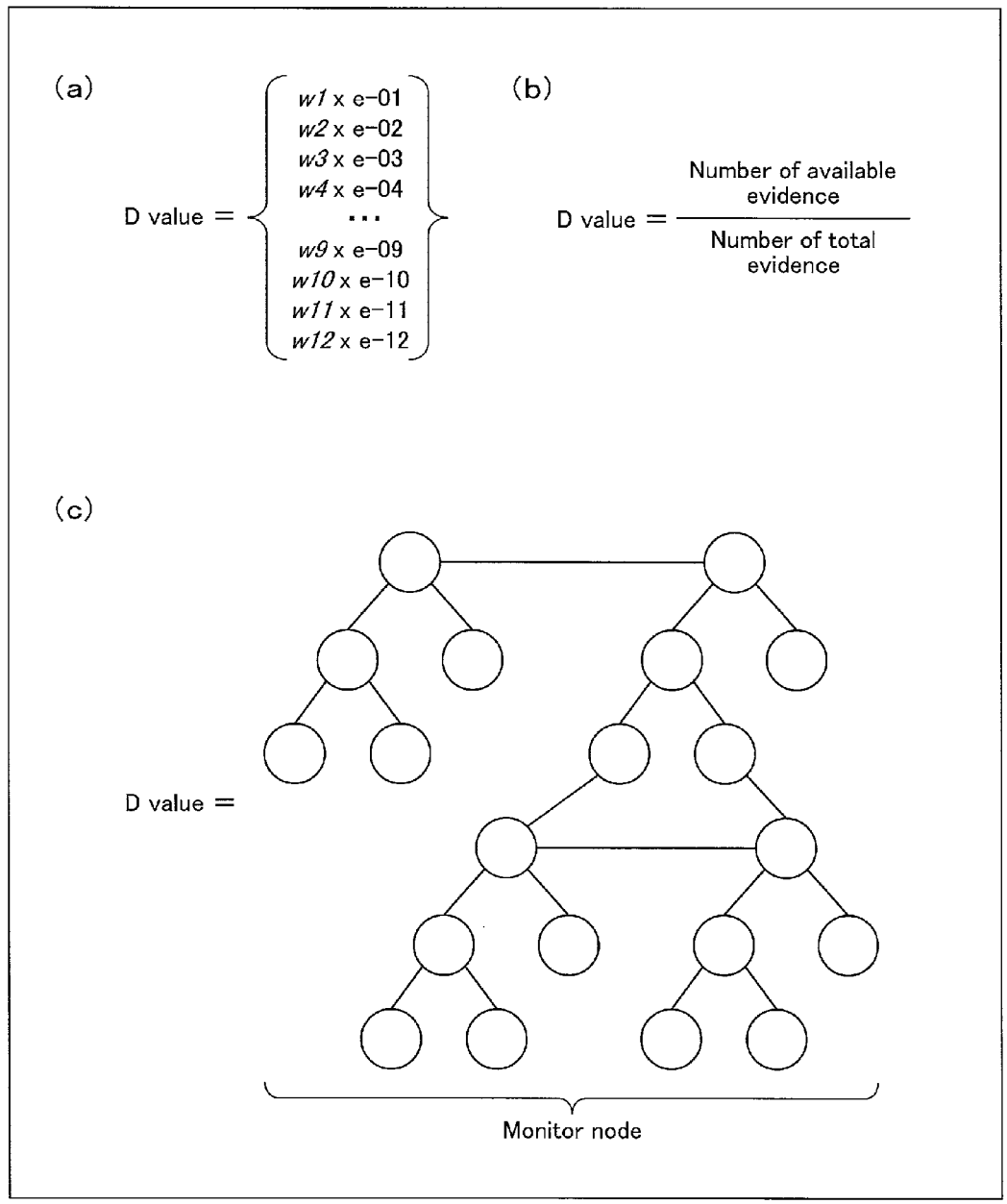
FIG. 10 is an explanatory view illustrating a method for measuring and evaluating the value of dependability of a system which dependability description data represents in the dependability maintenance system in FIG. 1. (a) of FIG. 10 shows a method in which a multidimensional vector whose elements are individual edges is considered as a D value. (b) of FIG. 10 shows a method in which a ratio of available evidences/total evidences is considered as a D value. (c) of FIG. 10 shows a method in which a graph structure itself is treated as a D value.

FIG. 10 illustrates a method for measuring and evaluating the value of dependability of a system which the dependability description data represents. The dependability maintenance system 100 includes a plurality of dependability description data. A top node can be defined as the value of dependability with respect to a particular attribute. For example, since "continuation of WEB service" (202-01) in FIG. 5 is indispensable and considered as an asset, "continuation of WEB service" (202-01) is defined as "value of dependability" in the present embodiment and referred to as "D value (evaluation value)".

Since the top node is broken down into a plurality of sub-nodes, it is possible to form a multidimensional vector whose elements are individual edges (links) ((a) of FIG. 10). In this case, individual edges may be weighted. In the example of FIG. 5, in a case where the node 202-05 is more important than the node 202-04 for example, the edge between the nodes 202-01 and 202-05 may be more weighted than the edge between the nodes 202-01 and 202-04. Alternatively, the number of sub-nodes of a certain node may be used as weight. This is because the number of sub-nodes being large indicates that countermeasures have been discussed sufficiently. A multidimensional vector value constituted by edges thus weighted can be treated as a D value. Since a multidimensional vector with larger number of dimensions is difficult to handle, the number of dimensions may be reduced using principal component analysis, Fisher's linear discriminant etc. Alternatively, evidence at the time of design is learned as teacher data and a change in a monitor node (mentioned later) is detected as an outlier in Mahalanobis distance calculation for example, thereby detecting abnormality.

This allows obtaining an evaluation value which adds the importance of an edge to a graph structure. The D value obtained here is a multidimensional vector value. However, it goes without saying that the D value obtained here can be converted into a scalar value by any conversion method corresponding to the purpose.

(b) of FIG. 10 shows an example in which a ratio of available evidences/total evidences with respect to the attribute is considered as a D value. The number of total evidences in FIG. 5 is 8. If the number of available evidences among the total evidences is 4, the D value is 4/8=0.5.

(c) of FIG. 10 shows an example in which nodes whose data acquired by a monitoring point in a monitor node out of a monitor node group is within a tolerable range of variation and nodes whose data is outside the tolerable range of variation are colored differently, so that the graph structure itself is treated as a D value. This example will be detailed later.

Thus, an evaluation value corresponding to the state of the evidence can be obtained. Since the evidence changes according to a change in requirement, the D value obtained here changes too according to the change in requirement. That is, checking the D value allows evaluating what influence the change in requirement has on dependability.

Alternatively, the technique described in Non-patent Literature 5 may be used. Non-patent Literature 5 reconstructs a D-Case description by items shown in FIG. 11. As shown in FIG. 11, by repositioning D-Case nodes on four layers "phase", "objective", "target", and "kind of abnormality", it is possible to treat weights of edges as values consistent at each layer, and thus to compare D values at each layer.

Dependability requirements for a system are different according to the objective of the system. Furthermore, at individual phases of the lifecycle of a system, it is necessary to facilitate a work for agreement among stakeholders. This requires quantitatively representing dependability requirements and degrees of their fulfillments. For this reason, dependability is quantitatively represented as a D value as described above, thereby realizing an index (dependability metrics) for argument.

As described above, use of a D value enables a system developer to quantify a requirement itself or a degree of fulfillment of the requirement while taking into account the weight for a specific dependability support for the system. Furthermore, if an incident happens in the system in operation, it is possible to quantify in real time dependability which can be met at that time. That is, by combining evidence derived from a benchmark and verification with a D value, it is possible to evaluate dependability description data. Furthermore, by obtaining in real time a D value from the system in operation, it is possible to reason the situation of the system.

Figure 12:
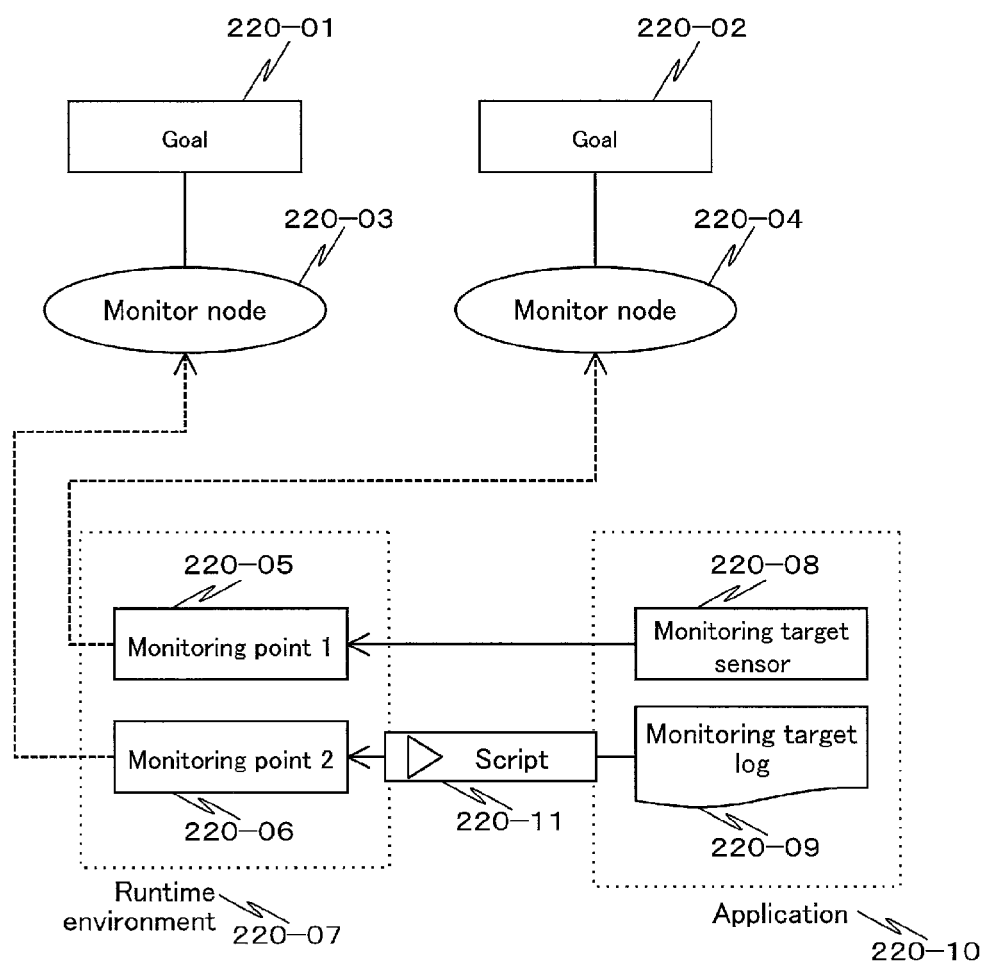
FIG. 12 is an explanatory view showing a configuration example of a D value calculation section in the dependability maintenance system in FIG. 1.

With reference to FIG. 12, the following description will discuss an example of the D value calculation section 102-06 of the monitoring section 102-03 in the runtime computer 102. In order to calculate a D value in the runtime computer 102 in operation based on agreement among stakeholders, there is deployed a D-Case monitor node which describes, in the D-Case in FIG. 8, which function inside the target system is monitored in what time and in what manner based on agreement among stakeholders (FIG. 12). A node representing a goal in the D-Case description is associated with a node representing evidence satisfying the goal. The node corresponding to the evidence may collect data from monitoring points in the target system and determine whether the data is in a tolerable range of variation.

The tolerable range of variation indicates a range within which data obtained from monitoring points is a reference value or in accordance with a reference value. For example, in a case of a network bandwidth, the tolerable range of variation can be defined as a range of 1 Mbps to 2 Mbps within which the network bandwidth is in ordinary operation. In a case of memory consumption of an application, the tolerable range of variation can be defined as a range of not more than 100 MB within which the memory consumption of the application is in ordinary operation. The tolerable range of variation is set based on agreement among stakeholders.

In FIG. 12, a monitor node 220-03 is linked to a goal 220-01, and a monitor node 220-04 is linked to a goal 220-02. The monitor node 220-04 acquires data from a monitoring point 1 (220-05) in a runtime environment 220-07. When the data is within the tolerable range of variation, the goal 220-02 is satisfied. The monitor node 220-03 acquires data from a monitoring point 2 (220-06) in the runtime environment 220-07. When the data is within the tolerable range of variation, the goal 220-03 is satisfied.

Data acquired by the monitoring point 1 (220-05) is acquired from a monitoring target sensor 220-08 inside an application 220-10. The sensor may be, for example, the capacity of memory consumed by the application or delay and a bandwidth when the application communicates with the outside. In contrast, data acquired by the monitoring point 2 (220-06) is acquired from a monitoring target log 220-09 inside the application 220-10. In general, in order to determine based on a log whether a monitoring target in a target system is within a tolerable range of variation, it is necessary to scrutinize the log. Accordingly, in the present example, a script is deployed and a log is scrutinized so as to determine whether the monitoring target is within the tolerable range of variation or not. The script is based on agreement among stakeholders.

Figure 13:
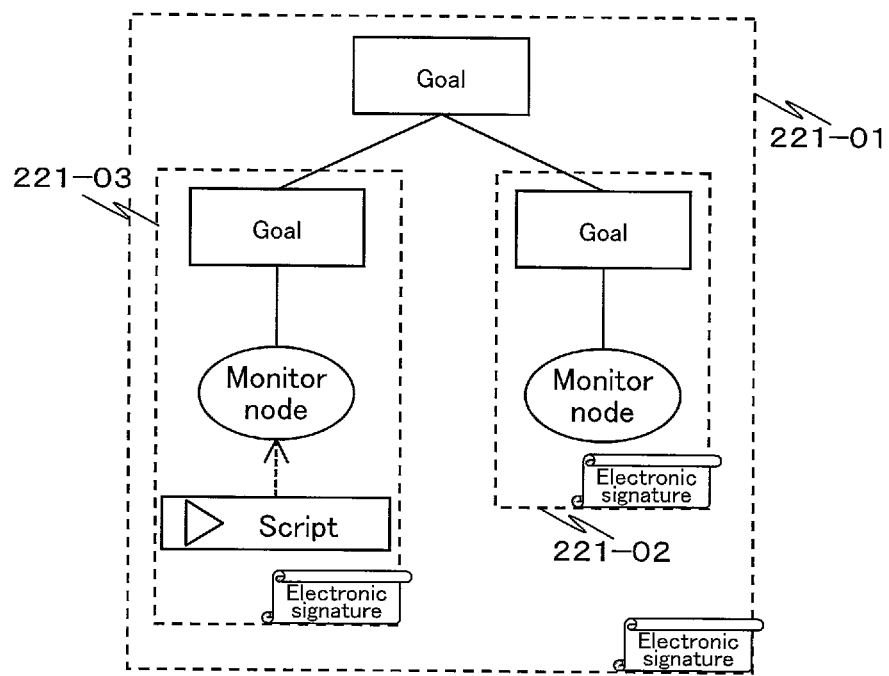
FIG. 13 is an explanatory view showing an example of giving an electronic signature to a D-Case description agreed among stakeholders, which is processed in the dependability maintenance system in FIG. 1.

In one example of the present invention, the agreement among stakeholders is represented by an electronic signature, and is confirmed in runtime. FIG. 13 shows such an example. An outline of the D-Case description in FIG. 12 can be represented as in FIG. 13. In FIG. 13, validated ranges of three electronic signatures are shown. A range 211-01 is an electronic signature valid for the whole, a range 221-02 is an electronic signature valid for a set of a goal and a monitor node, and a range 221-03 is an electronic signature valid for a set of a goal, a monitor node, and a script.

The electronic signature can be designed to set an expiration date/time. For example, an electronic signature which is valid only in development may be given to a D-Case description, or an electronic signature which is valid during a period depending on a situation may be given to a D-Case description. This improves reliability in acquirement of data by the monitor node, thereby further ensuring use of the data as evidence.

In an environment where both of a D-Case description with an electronic signature and a D-Case description without an electronic signature are present, a default operation may be set in advance for processing the D-Case description without an electronic signature. In general, such a default operation should be a process of rejection similarly with the case where an electronic signature is invalid. However, such a default operation may be designed such that confirmation to an operator or a user is made depending on a situation.

Data acquired at the D-Case monitor node may be used in calculation of a D value. (c) of FIG. 10 shows an example. In the present example, D-Case description can be presented with respect to each module. The D-Case description itself has a tree structure, and D-Case monitor nodes which are parts of the D-Case description have a tree structure, too. A structure of the D-Case monitor nodes as a whole can be a general graph structure as illustrated in (c) of FIG. 10. Here, a distance between nodes may be evaluated. An evaluation value for a direct link between node groups can be larger than that for a structure having plural links between nodes. A node whose data acquired by a monitoring point at a monitor node in the monitor node group is within a tolerable range of variation and a node whose data is outside the tolerable range of variation may be colored differently so that the graph structure itself is treated as a D value. In the coloring, Severity may be given to the tolerable range of variation. For example, in a case of a tolerable range of variation regarding a remaining capacity of a hard disk, it is desirable that a remaining capacity of 50% and a remaining capacity of 10% are given different severities. Since the graph structure reflects dependency between modules, using the graph structure as a D value allows treating a D value reflecting the dependency as a dependability value.

Figure 14:
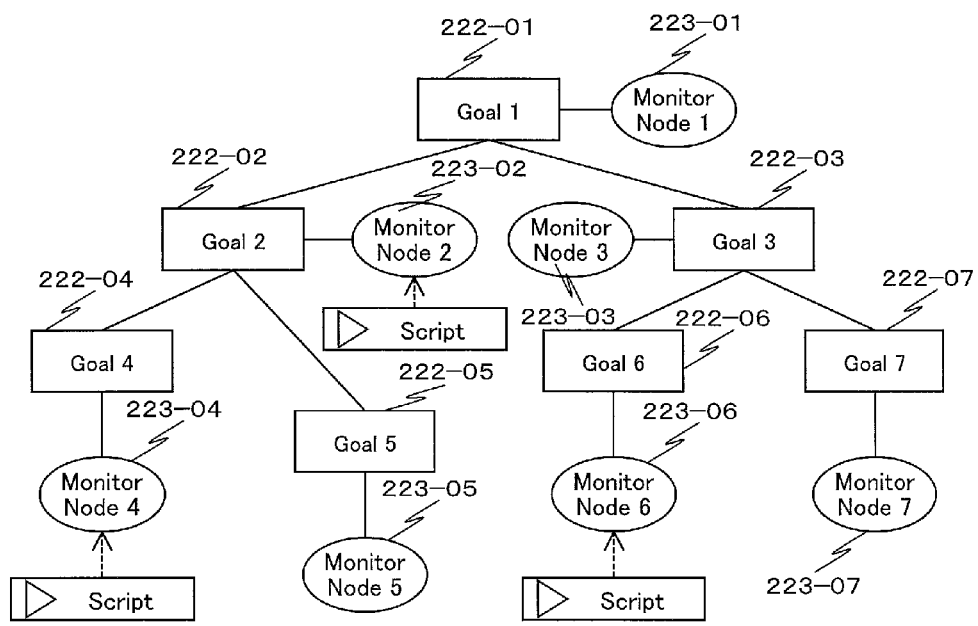
FIG. 14 is an explanatory view showing an example of a monitor node having a hierarchical structure, which is processed in the dependability maintenance system in FIG. 1.

Furthermore, as shown in FIG. 14, the monitor nodes may be linked to intermediate goals (222-01 to 222-03) other than edge goals (222-04 to 222-07). A relation between a monitor node linked to a certain goal and monitor nodes linked to sub-nodes of the goal is equal to a relation between corresponding monitoring points. For example, in a case where a goal 2 (222-02) is "continuation of service of merchandise purchase website", the goal 2 is divided into two sub-goals: a goal 4 (222-04) of "continuation of electronic payment system" and a goal 5 (222-05) of "continuation of merchandise DB". Monitor nodes are linked to the goals, respectively, as follows. A monitor node 2 (223-02) is linked to the goal 2 (222-02), and for example, executes a scenario of generic service continuation by a script, thereby confirming that the goal 2 is satisfied. A monitor node 4 (223-04) is linked to the goal 4 (222-04), and for example, confirms by a script that there is no abnormality in an electronic payment system, thereby confirming that the goal 4 is satisfied. A monitor node (223-05) is linked to the goal 5 (222-05), and for example, receives data from a vital (life-or-death) sensor provided in the merchandise DB, thereby confirming that the goal 5 is satisfied.

Alternatively, the present example may be arranged as follows. For example, in a case where the goal 3 (222-03) is "continuation of merchandise candidate display system", the goal 3 may be divided into two sub-goals: the goal 5 (222-05) of "ordinary operation with not more than predefined online traffic" and a goal 6 (222-06) of "ordinary operation within predefined delay". Monitor nodes are linked to the goals, respectively, as follows. A monitor node 6 (223-06) is linked to the goal 6 (222-06), and for example, confirms by a script that ordinary operation is made with not more than predefined online traffic, thereby confirming that the goal 6 is satisfied. A monitor node 7 (223-07) is linked to the goal 7 (222-07), and for example, confirms that ordinary operation is made within predefined delay by obtaining data of a sensor embedded in a WEB server of a target system, thereby confirming that the goal 7 is satisfied. In this case, the monitor node 3 (223-03) linked to the goal 3 (222-03) confirms that both of the goals 6 and 7 which are sub-goals are satisfied, thereby confirming that the goal 3 is satisfied. As described above, by designing monitor nodes to have a graph structure, the D value can be acquired by calculating the graph structure, allowing determination of the situation of the system.

The present invention may be arranged as follows.

The dependability maintenance device (dependability maintenance system 100, workspace computer 101, runtime computer 102) of the present invention may be arranged such that, in a system including dependability description data (whose data structure is a tree structure model for example) at a time changeable on a temporal axis regarding dependability, for the purpose of system development, system operation, and continuous maintenance of dependability in services provided by the system in an open environment with potential incompleteness and uncertainty, and for the purpose of responding to three problems: misunderstanding of a requirement among stakeholders; unableness to respond to an environment change; and unsuccess to respond to failure, the dependability maintenance device is capable of calculating the dependability description data, thereby measuring and evaluating a value of dependability of a system represented by the dependability description data.

As described above, the dependability maintenance device can measure and evaluate a value of dependability in a system including dependability description data at a time changeable on a temporal axis regarding dependability. This yields an effect of maintaining dependability by responding to the three problems: misunderstanding of a requirement among stakeholders; unableness to respond to an environment change; and unsuccess to respond to failure.

Furthermore, the present invention may be arranged as follows.

A dependability maintenance device (dependability maintenance system 100, workspace computer 101, runtime computer 102) of the present invention is a dependability maintenance device for maintaining dependability of a target system, comprising: description data acquiring means (dependability description data input section 901-01, software input section 902-01) for acquiring dependability description data indicative of a specification regarding the dependability of the target system; and dependability value determining means (D value calculation section 101-06, D value calculation section 102-06) for determining, based on the dependability description data acquired by the description data acquiring means, an evaluation value (D value) quantitatively indicative of a value of the dependability of the target system.

This allows quantitatively representing the value of the dependability of the target system. Therefore, for example, in a case where the dependability description data is changed according to a change in requirement or in a case where the state of the target system is confirmed when the target system is in operation, it is possible to present the value of the dependability of the target system in an intelligible and objective manner. This allows smoothly maintaining the dependability of the target system.

The dependability maintenance device (dependability maintenance system 100, workspace computer 101, runtime computer 102) of the present invention may be arranged such that the dependability description data is data having a tree structure or graph structure capable of weighting an edge between nodes, and the dependability value determining means (D value calculation section 101-06, D value calculation section 102-06) considers, as the evaluation value (D value), a multidimensional vector value whose element is a weight used for weighting the edge.

Therefore, it is possible to obtain an evaluation value obtained by adding importance of an edge to the tree structure or graph structure. This yields an effect that what influence a change in weighting an edge has on dependability can be evaluated by confirming the evaluation value. Although the evaluation value obtained here is a multidimensional vector value, the evaluation value can be converted into a scalar value by any conversion method according to the purpose.

The dependability maintenance device (dependability maintenance system 100, workspace computer 101, runtime computer 102) of the present invention may be arranged such that the dependability value determining means (D value calculation section 101-06, D value calculation section 102-06) calculates, as the evaluation value (D value), a ratio of the number of evidence whose monitor value acquired by monitoring the target system is satisfactory with respect to the tolerable range of variation to the total number of evidence included in dependability description data.

Therefore, the evaluation value according to the state of evidence can be obtained. Since evidence changes according to a change in requirement, the evaluation value obtained here also changes according to the change in requirement. This yields an effect that what influence a change in requirement has on dependability can be evaluated by confirming the evaluation value.

The dependability maintenance device (dependability maintenance system 100, workspace computer 101, runtime computer 102) of the present invention may be arranged such that the dependability description data is evaluated as a graph structure, and the dependability value determining means (D value calculation section 101-06, D value calculation section 102-06) calculates the graph structure while embedding, for example, a distance between nodes and severity in a calculation equation, thereby finding an evaluation value (D value).

Therefore, the evaluation value according to data from the monitor nodes can be obtained. Since the monitor nodes change according to the state of runtime of the target system, the evaluation value obtained here also changes according to the state of runtime of the target system. This yields an effect that what influence the state of runtime of the target system has on dependability can be evaluated by confirming the evaluation value.

The dependability maintenance system 100 of the present invention is a dependability maintenance system for maintaining dependability of a target system, comprising: a workspace device (workspace computer 101) for executing the change accommodation cycle P300 for changing the dependability description data in accordance with a change in specification during development or update of the target system; and a runtime device (runtime computer 102) for executing the failure response cycle P301 for avoiding abort of the target system based on the dependability description data when occurrence of failure or a sign of failure is detected during operation of the target system, at least one of the workspace device and the runtime device determining, based on the dependability description data, an evaluation value (D value) quantitatively indicative of a value of the dependability of the target system.

The dependability maintenance system 100 of the present invention may be connected with other dependability maintenance system 100 via a network. That is, a plurality of dependability maintenance systems 100 may be connected with each other via a network.

[3. Two Processes]

Figure 15:
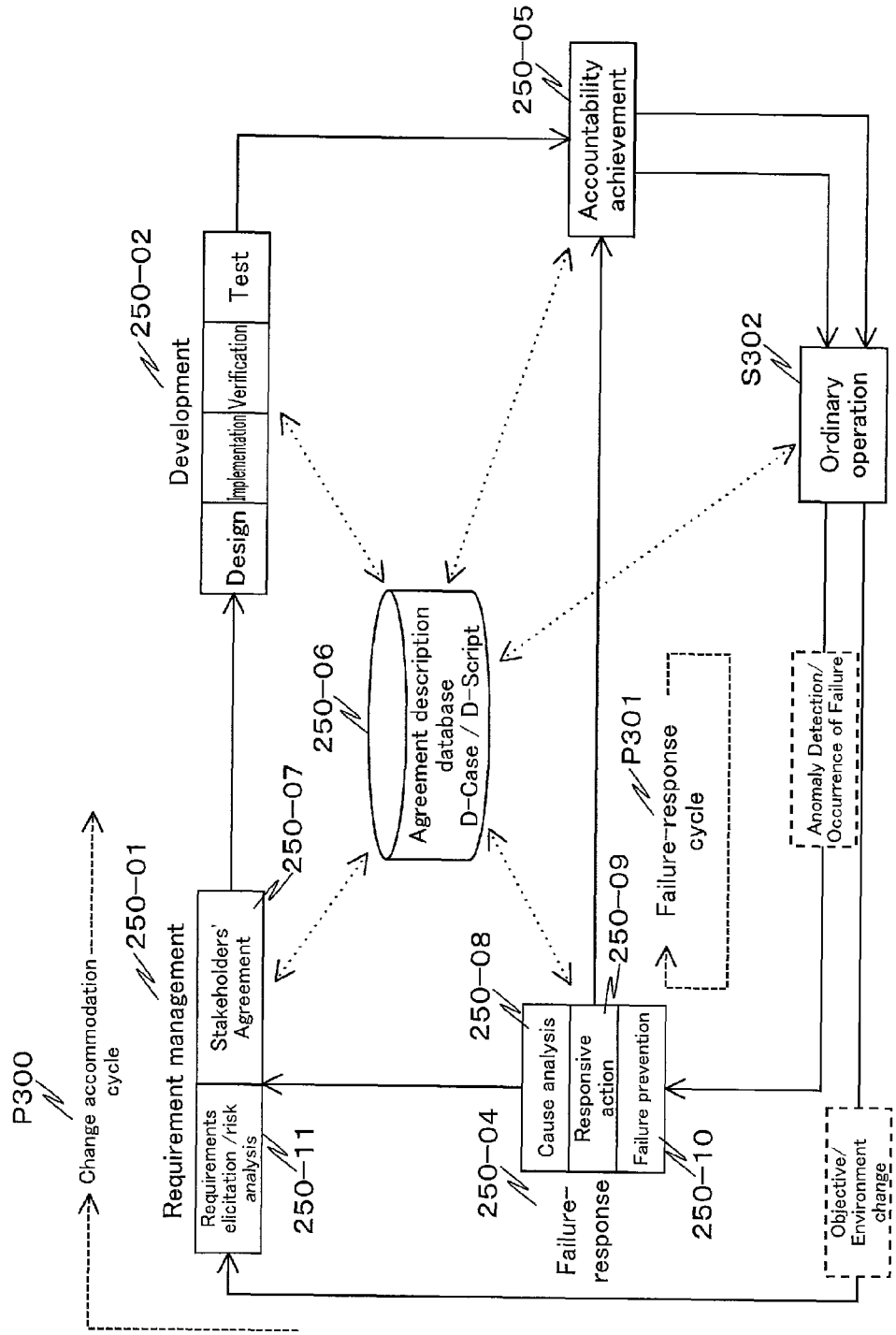
FIG. 15 is an explanatory view schematically showing a change accommodation cycle and a failure response cycle which are included in the dependability maintenance system in FIG. 1.
Figure 16:
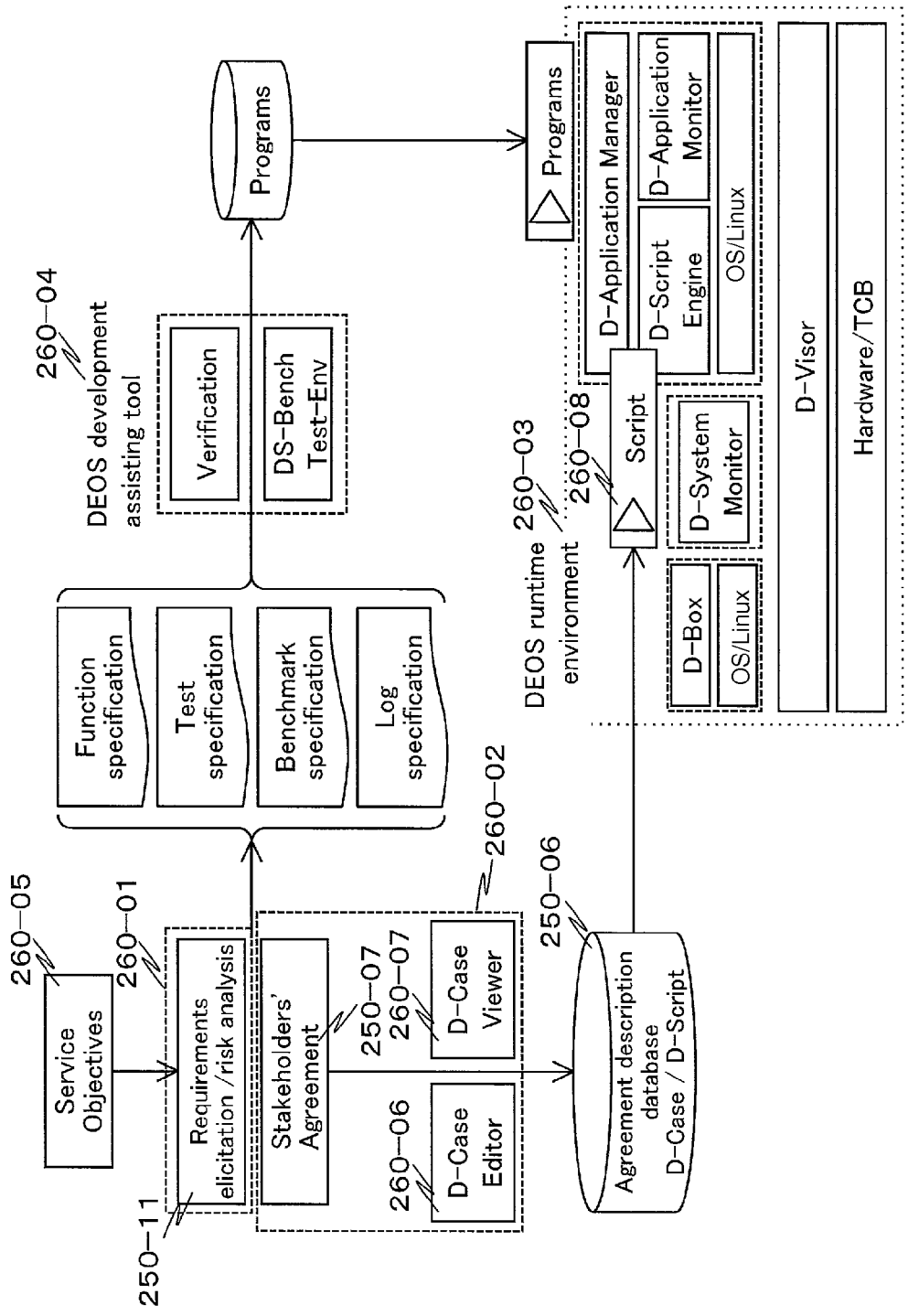
FIG. 16 is a block diagram showing architecture for realizing an iterative process, which is included in the dependability maintenance system in FIG. 15.

With reference to FIG. 15, the following description will discuss an iterative process of a dependability maintenance system 100. With reference to FIG. 16, the following description will discuss architecture for realizing the iterative process.

For realizing open systems dependability, i.e. dependability of a system whose function, structure, and system boundary change with time, an approach as an iterative process is essential. The iterative process is required to include a cycle for continuously changing the system according to changes in objectives and environments (change accommodation cycle P300) and a cycle for promptly responding to failure (failure response cycle 301). The iterative process is "process of processes" which includes, as members, a requirement management process 250-01, a development process 250-02, an ordinary operation process S302, a failure response cycle 250-04, an accountability achievement process 250-05 etc. These members of processes must be organically connected with each other. In the present embodiment, the iterative process is referred to as a DEOS process.

The interested parties concerning dependability of a target system are referred to as "stakeholders" in the DEOS process. Supposed examples of the stakeholders include 1) users of services and merchandises (customers, or society as a whole in case of social infrastructure), 2) providers of services and merchandises (business proprietors), 3) system providers (designers and developers, maintainers, hardware suppliers), and 4) permitters of services and merchandises (regulatory authority).

Stakeholders may change their respective objectives with time or according to an environment change, and change their requirements for functions or services. These changes are referred to as "objective/environment change". The stakeholders consider these changes and agree with each other on these changes, and require a change in system at appropriate time. The DEOS process includes a "change accommodation cycle" (P300) as a cycle for responding such a requirement.

The target system has extreme difficulty in completely avoiding failure due to incompleteness and uncertainty. When the target system detects a sign of a failure, it is necessary for the target system to avoid the failure before it occurs. When the failure has occurred unfortunately, it is necessary for the target system to promptly respond to the failure so as to minimize damage, investigate the cause, and fulfill accountability. In order to deal with such a situation, the DEOS process includes a "failure response cycle" (P301).

In a case of developing a new system and changing the system according to an objective and environment change, it is essential that the system includes an agreement description database 250-06 for recording in detail the reason for the change, the process of discussion made among the stakeholders, the content of agreement among the stakeholders. This will make the iterative process effective, fulfilling accountability. The database includes the D-Case which describes discussion or ground for achieving dependability, and a script which describes execution procedure for promptly responding to detection of a sign of failure or occurrence of failure in accordance with a scenario for continuing a service against the failure (this script is referred to as D-Script in the drawing, which will be detailed later). In accordance with these agreement descriptions, the development process 250-02, the failure response cycle 250-04, and the ordinary operation process S302 are executed, and the accountability achievement process S0-05 can be supported. The agreement description database 250-06 plays an important role of organically connecting these members of processes.

Features of the DEOS process are summarized as follows. 1) The DEOS process includes two cycles of the "change accommodation cycle (P300)" and the "failure response cycle (P301)" each of which starts from "ordinary operation" (S302). 2) The DEOS process has two phases of "stakeholders' agreement" (250-07) for requiring a system change and "accountability achievement" (250-05) concerning a system change or response to failure. 3) The DEOS process includes the agreement description database 250-06 including the "D-Case" which describes processes, grounds, results etc. of discussion for regulating stakes among stakeholders and achieving dependability, and the "script" which describes execution procedure for promptly responding to failure, and organically connects members of processes.

In FIG. 15, the ordinary operation S302 indicates that the dependability maintenance system 100 is in an ordinary operation state. The ordinary operation S302 is a state in which the system does not greatly deviate from a service level tolerable range of variation (In-Operation Range) agreed among stakeholders and continues to provide users with services. It is desirable that the change accommodation cycle P300 is executed along with ordinary operation and the system is changed while services continue to be provided. Similarly, it is desirable that the failure response cycle P301 is executed while continuing ordinary operation. In fact, there is a case where even when the system detects a sign of abnormality, an avoiding process is automatically carried out in a tolerable range of variation of service and function level which is described in the script, so that services continue to be provided. Alternatively, there is a case where services continue to be provided by degenerating a part of the functions. However, there is a case where services cease to be provided completely.

Processes to be executed in the ordinary operation state S302 include continuous activities for improving dependability, such as inspection of records of daily operations, regular reexamination and improvement of processes, and training/discipline/education of staffs. There is a possibility that recording a state of operation of the system and daily inspecting the record enables a maintenance staff and an operation staff to find some signs therefrom. Furthermore, always putting a memory resource of the system in a clean state is a very effective daily maintenance/improvement activity. Alternatively, it is effective to actively have a rehearsal. Failure occurs when a certain time has passed and the system reaches a certain state. Accordingly, by causing a time to pass in advance, it is possible to know occurrence of failure beforehand. This is a so-called rehearsal. It depends on the situation how appropriate the rehearsal is at the time of operation of a service provided by an information system.

The failure response cycle P301 is outlined below. The failure response cycle P301 is a cycle for promptly responding to failure and minimizing damage caused by the failure. In the DEOS process, "failure" is defined as a phenomenon of deviating from tolerable ranges of variations of service/function levels which have been agreed among stakeholders. Main phases of the failure response cycle are "failure prevention" (250-10), "responsive action" (250-09), and "cause analysis" (250-08), and "fulfillment of accountability" is essential when failure occurs. The three phases are not necessarily carried out separately and orderly. In many cases, these phases become a phenomenon/activity in which they are related to each other and are mingled with each other.

The failure prevention phase 250-10 is a phase of responding and operating so as to avoid failure when predicting occurrence of failure before actual occurrence of failure or detecting increase in the possibility of failure in operation of the system. By predicting failure well before an expected time of occurrence of failure, it is possible to take an effective countermeasure against the failure. Examples of the countermeasure include restricting a resource of the system and decreasing throughput so as to avoid system down or secure sufficient time before the system down. When failure is predicted just before the occurrence, the system tries hard to minimize the influence of the failure. Furthermore, it is possible to record information inside the system up to the occurrence of failure, which information is useful for analyzing a cause. A specific example of the method for predicting is determining a similar failure based on the past failure pattern. The failure prevention scenario is described as a script beforehand, so that failure prevention operation is carried out in combination with an operator and a system manager.

The responsive action phase 250-09 is a phase for, when failure occurs, minimizing the influence of the failure. It is desirable that a scenario for responsive action to failure is described beforehand as a script, and is executed automatically. However, there is a case which requires a response to unexpected failure. It is required that there is provided beforehand an emergency response plan (which describes a person in charge, a corresponding organization, procedure, escalation path etc.) for continuing services according to the objective of each corresponding field and each region, and the plan is agreed among stakeholders. In accordance with instructions of the plan, the influence of failure is promptly minimized in cooperation with the operator and the system manager. That is, failure is isolated so as to localize the influence, thereby avoiding abort of services as a whole. For this reason, operation of a component of application or system in which failure has occurred is ceased and reset, and then the operator or the system manager restores the application or the system.

The cause analysis phase 250-08 is a phase related to the failure response cycle P301 and the change accommodation cycle P300. Determinations with different depths are made depending on the cycle. In the failure response cycle P301, the cause of the failure is investigated in order to find what responsive action is possible. Depending on the result of the investigation, the change accommodation cycle P300 starts.

In the accountability achievement phase 250-05, a service provider, particularly a social infrastructure service provider and a provider of merchandises widely used in society, explains the status of failure, responsive action, prospect etc. to a service user, a merchandise user, and society. Such an explanation plays a very important role of maintaining reliance from users and society and building consensus on providing infrastructure service, resulting in protection of business benefit of the service provider. The agreement description database, particularly the D-Case description and system monitoring record are very useful for fulfilling accountability.

The change accommodation cycle P300 is outlined below. The change accommodation cycle P300 is a cycle for responding to a change in the objective of a stakeholder and a change in various external environments. Essential phases of this cycle include "requirements elicitation/risk analysis" (250-11) for changing a system, "stakeholders' agreement" (250-07), and "design/implementation/verification/test" (250-02). When responding to a great change, the phase of "accountability achievement" (250-05) is essential. In a case where a requirement for fundamentally improving a system occurs as a result of carrying out the cause analysis phase 250-08 in the failure response cycle P301, the change accommodation cycle P300 starts.

The requirements elicitation/risk analysis phase 250-11 starts in a case where a requirement from a stakeholder changes (including a new requirement) due to an objective/environment change, or in a case where a change in system is required as a result of investigation of the cause after promptly responding to the occurrence of failure. In either case, functional requirements of the system are elicited in consideration of user's requirements, system environments, and related laws and international standards based on the objective of a service of a business proprietor. At the same time, a scenario of continuing the service of the system is generated based on the objective of the service, risk analysis is carried out, and non-functional requirements including dependability requirements are elicited.

In the "stakeholders' agreement" phase 250-07, what is to be changed and how it is to be changed are described in such a manner as to be intelligible to all stakeholders without any misunderstanding, and after discussion among the stakeholders, the agreement among the stakeholders is described as D-Case. Furthermore, a scenario of continuing a service is made, and a script which is execution procedure of the scenario is made. "Requirements elicitation/risk analysis" phase 250-11 and the "stakeholders' agreement" phase 250-07 constitute the "requirement management process" (250-01).

The "design/demonstration/verification/test" phase 250-02 is a so-called design and development process. Many researches have been made with respect to this process, and many methods and tools have been conceived.

In the "accountability achievement" phase 250-05, in a case where the system is changed in order to respond to the change in requirements from the stakeholders due to the objective and environment change, an explanation is made as to the background and when the service or the function is improved (when the service or the function is changed). In a case where an explanation as to a daily service situation or a design development/maintenance and operation process is necessary, such an explanation is made in the "accountability achievement" phase 250-05. This plays very important roles of maintaining reliance from users and society and building consensus on providing infrastructure services, thereby protecting benefits of service providers in business fulfillment. D-Case description recorded in the agreement description database 250-06 is very useful for accountability achievement.

[4. DEOS Architecture]

The DEOS process provides an iterative process for realizing dependability of an extensive open system. In a case where the process is applied to a target system in more specific manner, it is necessary to conceive architecture for carrying out a process with respect to each target category. In the present embodiment, a description is provided as to architecture conceived to be applied to a modern large-scale and complicated software system including an embedded system (referred to as DEOS architecture). Comparison of the DEOS process with the DEOS architecture allows understanding how the DEOS process is carried out in a real system.

With reference to FIG. 16, a description is provided below as to the DEOS architecture. The architecture includes the following members: 1) a tool group 260-01 (101-06) for assisting the requirements elicitation/risk analysis phase; 2) a consensus-building assistance tool group 260-02 (101-05) for assisting the stakeholders' agreement phase; 3) the agreement description database 250-06 including the "D-Case" which is a description of agreement and the "script" (referred to as D-script in the drawing) which is execution procedure of a service-continuation scenario; 4) a DEOS runtime environment 260-03; 5) a DEOS development assisting tool 260-04 including a program verification tool and tools for benchmarking and fault-injection test.

In the requirements-elicitation/risk-analysis phase 250-11, in consideration of user's requirements, system environments, and related laws and international standards based on an service-objectives 260-05 of a business proprietor, functional requirements of the system are elicited, a scenario of continuing the service are generated in response to a supposed failure, risk analysis is carried out, and non-functional requirements including dependability requirements are elicited.

In the stakeholders' agreement phase 250-07, the content of the agreement is described as a D-Case in accordance with a method for forming agreement and syntax for describing agreement. Tools for this purpose are a D-Case Editor (260-06) and a D-Case Viewer (260-07). Furthermore, an execution procedure script 260-08 based on the service-continuation scenario is generated. The script dynamically links a D-Case description to execution of an application program in the DEOS architecture. In the script, a scenario to be executed by a later-mentioned script engine (D-Script Engine in the drawing) is described. The scenario instructs the DEOS runtime environment 260-03 1) when and what log information to collect and 2) how to respond to failure when the failure occurs. At that time, there is a case where the scenario requires an operator to intervene in accordance with an escalation rule. Thus, the script exchanges information dynamically and bidirectionally so as to flexibly control execution of the application program, thereby contributing to achievement of the open systems dependability.

The DEOS runtime environment 260-03 is a runtime environment for providing a service for realizing dependability based on the agreement among stakeholders, and includes the following sub-systems. A D-Visor provides a mechanism (System Container) for ensuring independence of individual components of the system. This mechanism prevents abnormality or failure in one System Container from having an influence on other System Container. A D-Application Manager provides a mechanism (Application Container) for ensuring independence of a plurality of applications, and manages and controls lifecycles (generation, start, update, shutdown, and deletion) of individual applications. A D-Application Monitor provides a function of surveying the operation of an application, collects evidence in accordance with the description of a D-Case monitor node, and causes the evidence to be stored in a D-Box. A D-System Monitor provides a function of monitoring the operation of a system (including an operating system and a runtime support). Similarly with the D-Application Monitor, the D-System Monitor collects evidence in accordance with the description of a D-Case monitor node, and causes the evidence to be stored in the D-Box. The D-Box safely and surely stores information useful for realizing OSD, such as evidence. A D-Script Engine safely and surely executes a D-Script, and controls the D-Application Manager, the D-Application Monitor, and the D-System Monitor.

The DEOS development assisting tool 260-04 is a group of development assisting tools for designing, developing, verifying, benchmarking, and testing programs in accordance with a function specification, a test specification, a benchmarking scenario, and a log specification which are determined based on the business objective and a business continuation scenario. Examples of the DEOS development assisting tool 260-04 include a software verification tool based on type theory and model verification, and a dependability test assisting tool having benchmarking and fault injection function.

The maximum advantage of applying the DEOS process is that a discussion for making agreement among stakeholders on a change in requirement can be made sufficiently, and the result of the agreement, the reason for reaching the conclusion, and the history of the discussion can be recorded in a D-Case. Use of the D-Case description in developing a system allows designing a system capable of suitably and promptly responding to failure in cooperation with the DEOS architecture. Furthermore, the D-Case description makes it easy to investigate the cause of failure and fulfill accountability.

Another advantage of the DEOS process is that the system is changed after requirements are elicited suitably and risks are discussed sufficiently. Individual stakeholders can know the state of the system at any time from their respective viewpoints. This allows managing and operating the system simply and powerfully. On the other hand, the number of requirements is large. Tools such as the D-Case Editor (260-06) and the D-Case Viewer (260-07) reduce work in the requirement management.

The DEOS runtime environment 260-03 which is a realization of the DEOS architecture has a monitoring function, and monitors and records, based on the D-Case, the runtime state of a system and an application necessary for analysis. The runtime environment executes a responsive action to failure in accordance with the monitoring record and the script. Furthermore, the runtime environment analyzes the cause and fulfills accountability by using information from the D-Case description and the monitoring record as evidence. The script and the script engine serve to bridge the D-Case and the runtime environment. This structure allows the system to automatically, or if necessary via an operator (based on D-Case description), make a flexible response.

Furthermore, the DEOS architecture provides a function of preventing failure in one module from being propagated to another module. Similarly, the DEOS architecture provides a function of detecting intrusion from the outside in order to secure the system. Furthermore, the DEOS architecture provides a tool for verifying a program before it is executed, a tool for measuring performance, a development tool for injecting fault so as to test the behavior in abnormality etc. for the purpose of achieving dependability.

Use of the above mechanism and the above function enables the DEOS process and the DEOS architecture to have an ability to continuously avoid failure, and to suitably and promptly respond to failure, so that the influence of the failure is minimized. Furthermore, use of the above mechanism and the above function enables the DEOS process and the DEOS architecture to continue a service and fulfill accountability. The DEOS process and the DEOS architecture are the first attempts to achieve the open systems dependability.

[5. Runtime Environment]

Figure 17:
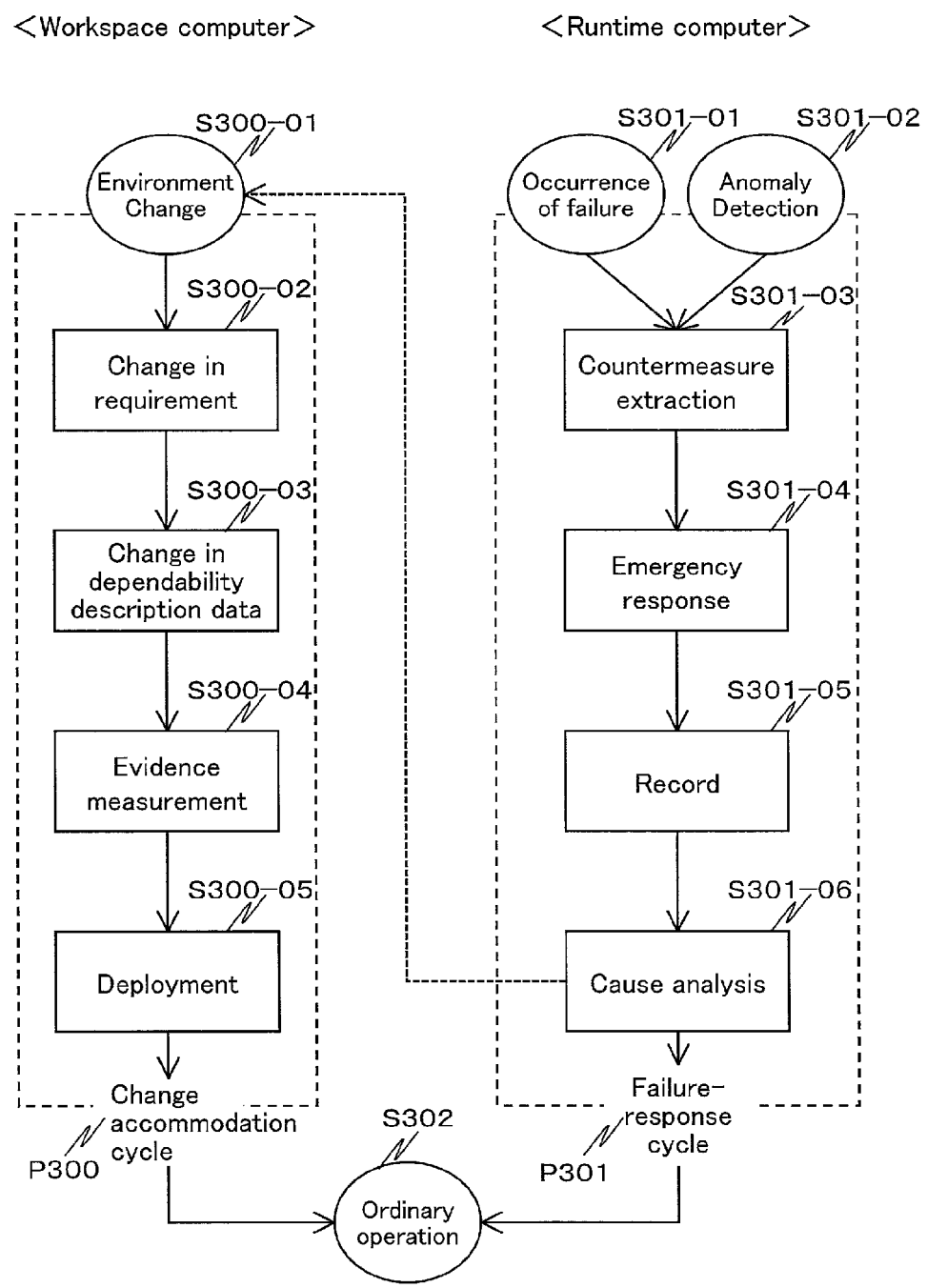
FIG. 17 is a flowchart showing a series of procedures of the change accommodation cycle and the failure response cycle included in the dependability maintenance system in FIG. 1.

With reference to FIG. 17, the following description will discuss a series of procedures of the change accommodation cycle P300 and the failure response cycle P301 which constitute the DEOS process in accordance with one embodiment of the present invention. Both of the change accommodation cycle P300 and the failure response cycle P301 are normally in the state of ordinary operation S302.

When in the change accommodation cycle P300 a change in requirement of a stakeholder, a change in requirement during development, and/or a change in requirement in system operation occurs due to an environment change such as a change in business environment, the process in the change accommodation cycle P300 transits to the state of an environment change S300-01.

Initially, a change in requirement S300-02 is made by using the analysis tool section 101-03 of the workspace computer 101 (see FIG. 1). Here, after extracting requirements from stakeholders, an influence of the change in requirement on the runtime computer 102 is analyzed, specific means to change is analyzed, and a portion to be changed is analyzed.

Next, a change-in-dependability-description-data S300-03 is made by using the editing tool section 101-02 and/or the developing tool section 101-04 based on the result of analysis in the change in requirement S300-02. Here, the result is reflected in software SW.

Next, it is confirmed in an evidence measurement S300-04 by the verification tool section 101-01 whether the change is in accordance with the requirement.

Lastly, software SW is deployed into the runtime computer 102 in a deployment S300-05. Thereafter, the change accommodation cycle P300 transits to the ordinary operation S302.

In a case where failure occurs in the runtime computer 102 (see FIG. 1) in the failure response cycle P301, the process in the failure response cycle P301 transits to the state of a failure occurrence S301-01. Initially, in a countermeasure extraction S301-03, a countermeasure against the failure is extracted without shutting down the runtime computer 102.

Next, in an emergency response S301-04, the countermeasure is executed, so that a process based on a model in the runtime computer 102 is continued.

Next, in a record S301-05, the emergency response is recorded by the recording section 102-02. Here, information regarding the failure is also recorded by the recording section 102-02. Although it is desirable that operation of the runtime computer 102 is continued at this point of time, there is case where the countermeasure cannot enable the operation of the runtime computer 102 to be continued due to the failure. In either case of continuation or discontinuation, a cause analysis S301-06 is executed. Consequently, the cause of the failure is investigated, or if the process based on model in the runtime computer 102 is not continued, the cause of the discontinuation is investigated. Depending on the result of the investigation, the process in the change accommodation cycle P300 is caused to transit to the state of an environment change S300-01 with a change in requirement.

On the other hand, in a case where malfunction (or a sign of malfunction) or a sign of failure is found in the failure response cycle P301, the process in the failure response cycle P301 transits to the state of a sign of failure S301-02. Malfunction (or sign of malfunction) is found by the monitoring section 102-03 of the runtime computer 102. A sign of failure is found also by the monitoring section 102-03. Specifically, such finding is possible by checking the history of consumption of various calculation resources in the binary execution section 110 of the runtime computer 102. For example, in a case where the capacity of remaining memory continues to be reduced within a certain period of time, it is found that calculation will stop in a near future due to shortage of the memory.

Initially, in the countermeasure extraction S301-03, a countermeasure against the malfunction (or a sign of the malfunction) or a sign of the failure is extracted without stopping a process in the runtime computer 102.

Next, in the emergency response S301-04, the countermeasure is executed, so that the operation of the runtime computer 102 is continued.

Next, in the record S301-05, the emergency response is recorded by the recording section 102-02. Here, information regarding the failure is also recorded by the recording section 102-02. Although it is desirable that the process based on a model in the runtime computer 102 is continued at this point of time, there is a case where the countermeasure cannot enable the operation of the runtime computer 102 to be continued due to the failure. In either case of continuation or discontinuation, the cause analysis S301-06 is executed. Consequently, the cause of the failure is investigated, or if the process based on model in the runtime computer 102 is not continued, the cause of the discontinuation is investigated. Depending on the result of the investigation, the process in the change accommodation cycle P300 is caused to transit to the state of the environment change S300-01 with a change in requirement.

As described above, the change accommodation cycle P300 and the failure response cycle P301 exist at the same time.

The present invention may be arranged as follows.

The dependability maintenance device (dependability maintenance system 100) of the present invention may be arranged such that, in a system including the dependability description data, the dependability maintenance device includes both of two means of a process for responding to a change in requirement from a stakeholder due to an environment change, a change in requirement during system development, and/or a change in requirement during system operation, and a process for continuing, even in occurrence of failure, services provided by the system in operation and/or detecting a sign of failure and preventing occurrence of the failure before it occurs so as not to stop services provided by the system in operation.

As described above, in an open environment with potential incompleteness and uncertainty, the dependability maintenance device includes both of two means of a process for responding to a change in requirement from a stakeholder due to a change in environment, a change in requirement during system development, and/or a change in requirement during system operation, and a process for continuing, even in occurrence of failure, services provided by the system in operation and/or detecting a sign of failure and preventing occurrence of the failure before it occurs, thereby removing a conventional barrier between a development phase and an operation phase, fulfilling accountability of a stakeholder, and maintaining dependability.

The present invention may be arranged as follows.

The dependability maintenance device (dependability maintenance system 100, workspace computer 101, runtime computer 102) of the present invention may be arranged such that there is executed at least one of the change accommodation cycle P300 for changing the dependability description data in accordance with a change in specification when the target system is developed or updated, and the failure response cycle P301 for avoiding abort of the target system based on the dependability description data when the target system is operated and occurrence of failure or a sign of failure is detected.

In the failure response cycle P301, a series of steps starting from transition to the state of the occurrence of failure S300-01 corresponds to a feedback process in control engineering, and a series of steps starting from transition to the state of a sign of failure S300-02 corresponds to a feedforward process in control engineering. Accordingly, by learning the result of the feedback process, it is possible to construct a corresponding model which contributes to the feedforward process. The model may be recorded as a change to the dependability description data. In the feedforward process, a corresponding model in other system may be described in the dependability description data, so that a sign of failure corresponding to the model is proactively avoided under agreement among stakeholders.

In order to continuously maintain dependability of the target system in an open environment, there are required both of the change accommodation cycle P300 which sufficiently discusses a change in requirement or an environment change and responds to the change and the failure response cycle P301 which promptly responds to occurrence of failure in operation.

With the above arrangement, in at least one of the change accommodation cycle P300 and the failure response cycle P301, it is possible to obtain an evaluation value indicative of a value of dependability of the target system. Accordingly, for example, in the change accommodation cycle P300, when the dependability description is changed according to a change in requirement, it is possible to determine whether a plan of changing the dependability description data is appropriate or not according to the evaluation value. Furthermore, for example, in the failure response cycle P301, it is possible to determine the state of the target system in operation according to the evaluation value. This allows smoothly maintaining dependability of the target system.

[6. Change Accommodation Cycle]

Figure 18:
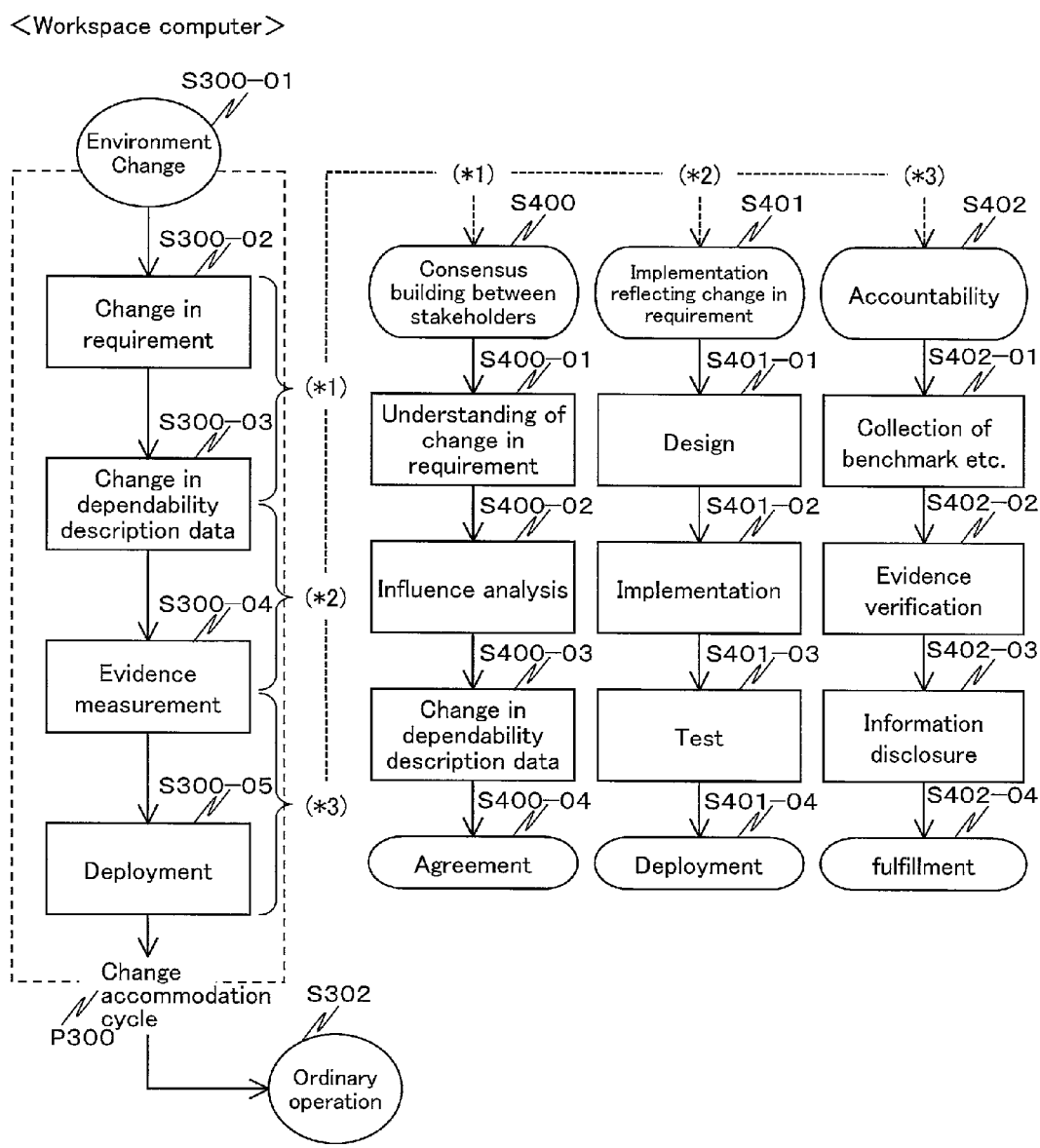
FIG. 18 is a flowchart showing three processes in the change accommodation cycle in FIG. 17.

FIG. 18 illustrates three steps of a consensus-building-among-stakeholders process S400, an implementation-reflecting-change-in-requirement process S401, and an accountability process S402 in the change accommodation cycle P300 executed in the workspace computer 101 which is illustrated in FIG. 17.

The consensus-building-among-stakeholders process S400 is related to the change in requirement S300-02 and the change-in-dependability-description-data S300-03. The consensus-building-among-stakeholders process S400 starts from a step of understanding the content of the change in requirement (understanding of change in requirement S400-01). For that purpose, for example, SRS (Software Requirements Specification) in accordance with "IEEE Std 830-1998 IEEE Recommended Practice for Software Requirements Specification" is analyzed.

Next, points of changes to existing dependability description data are enumerated in an influence analysis S400-02.

Lastly, the points of changes are reflected in the change-in-dependability-description-data S400-03 as changes in the dependability description data.

These steps are repeated until agreement S400-04 among stakeholders is built up.

The implementation-reflecting-change-in-requirement process S401 is related to the change-in-dependability-description-data S300-03 and the evidence measurement S300-04. The implementation-reflecting-change-in-requirement process S401 starts from a design S401-01. In the design S401-01, software for converting a change in requirement into an actual code is designed by the development tool section 101-04 in accordance with Capability Maturity Model Integration (CMMI) for example.

Next, in the implementation S401-02, the design in the design S401-01 is converted into software SW by using the development tool section 101-04.

Next, in the test S401-03, the software SW in all the steps is tested and verified by using the verification tool section 101-01.

These steps are repeated until all verifications in the test S401-03 are considered as OK. When all the verifications are considered as OK, the software SW is deployed into the runtime computer 102 in a deployment S401-04.

The accountability process S402 is related to the evidence measurement S300-04 and the deployment S300-05. The accountability S402 starts from the step of collection of a benchmark etc. S402-01. A benchmark may be executed and measured in the runtime computer 102 or in an environment that simulates the runtime computer 102.

Next, it is verified whether the collected benchmark data meets the requirement (evidence verification S402-02).

Lastly, the verified data is disclosed as evidence by stakeholders according to necessity (information disclosure S402-03). As a result of the information disclosure S402-03, the stakeholders can fulfill accountability (S402-04).

The present invention may be arranged as follows.

The dependability maintenance device (workspace computer 101) of the present invention may be arranged such that in a process which is for responding to a change in requirement from a stakeholder due to a change in the environment, a change in requirement during system development, and/or a change in requirement in system operation and which is constituted by a loop including a series of steps receiving these requirements and starting from occurrence of the change in requirement, the dependability maintenance device executes three steps of: building consensus among stakeholders on a change in requirement so as to surely implement the change in requirement, operate a system, and provide a service; implementing and verifying the change in requirement and operating the system; and the stakeholder fulfilling accountability by operation of the system and provision of the service in response to the change in requirement.

[7. Failure Response Cycle (Responsive Action)]

Figure 19:
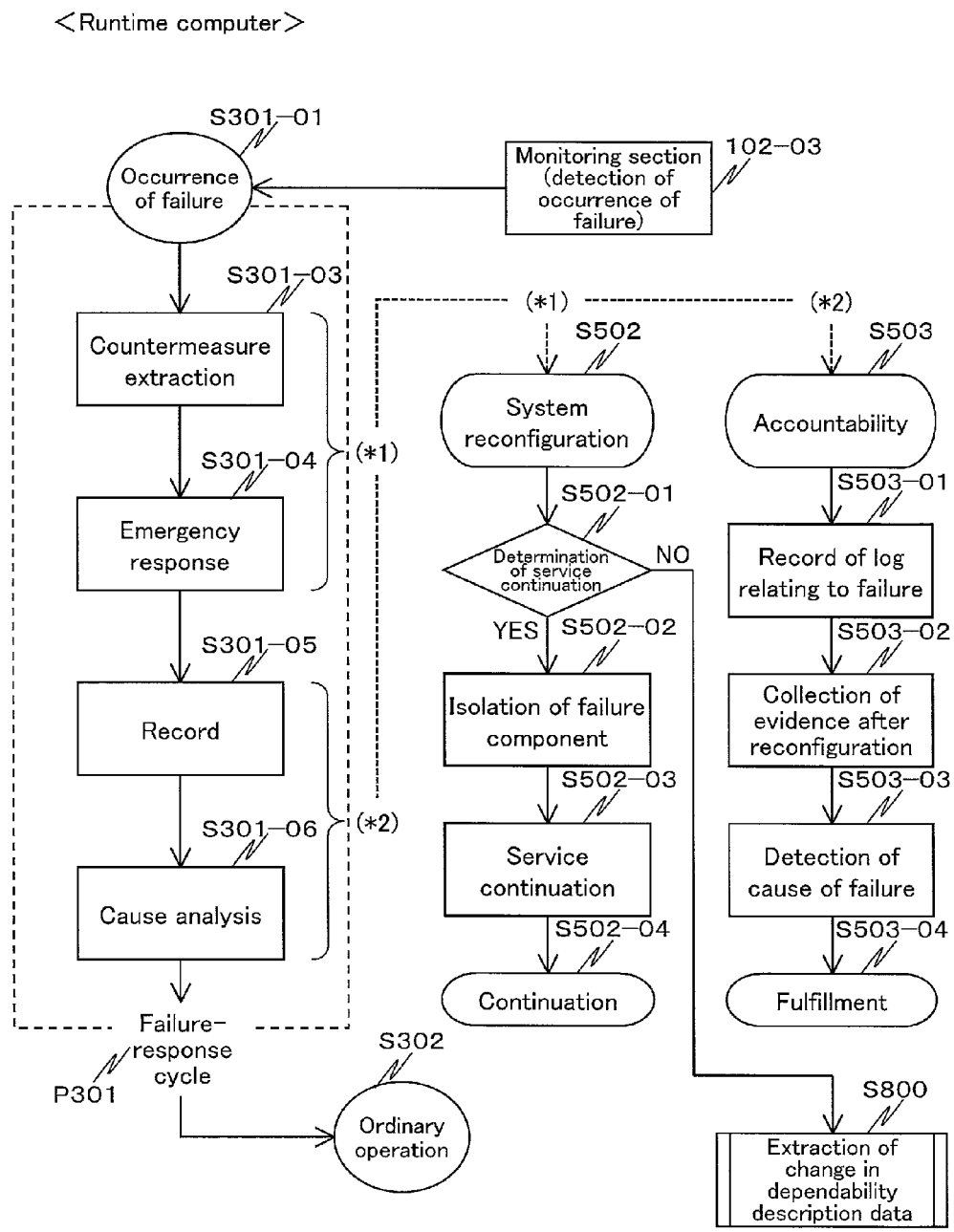
FIG. 19 is a flowchart showing two processes in the failure response cycle in FIG. 17 when detecting occurrence of failure.

FIG. 19 is a flowchart showing two processes in the failure response cycle P301 when detecting occurrence of failure. The failure response cycle P301 in FIG. 19 is the same as that in FIG. 17.

When the monitoring section (failure occurrence detection means) 102-03 detects occurrence of failure, the process transits to the failure occurrence S301-01. The monitoring section 102-03 detects occurrence of failure when a D value gets out of a predetermined tolerable range of variation for example. Two functions are related to the failure response cycle P301 when the occurrence of failure is detected. The two functions are a system reconfiguration process S502 and an accountability process S503.

The system reconfiguration process S502 is related to the countermeasure extraction S301-03 and the emergency response S301-04. The system reconfiguration process S502 starts from a determination of service continuation S502-01. Here, dependability description data corresponding to the failure is extracted. In a case where a system reconfiguration scenario can be extracted from the dependability description data (YES in S502-01), the process goes to the next step. In a case where the system reconfiguration scenario cannot be extracted from the dependability description data (NO in S502-01), it is determined that continuation is impossible, and a change-in-dependability-description-data extraction process S800 (FIG. 27) is executed.

A typical case of the system reconfiguration scenario may be embedded in a system beforehand when the system is designed. An example is a scenario to restart a later-mentioned application container or system container. In the reconfiguration scenario, similarly with a later-mentioned case, an executable program may be related to a node of dependability description data. In either way, when the reconfiguration scenario cannot be extracted, there is prepared execution of the change accommodation cycle P300 in order to change the dependability description data. Alternatively, the reconfiguration scenario may be described as a later-mentioned script and be related to dependability description data.

Next, in isolation of a failure component S502-02, a failure component is isolated according to the extracted scenario, a difference in dependability description data is reflected in the runtime computer 102, and the process goes to the next step.

Next, in the service continuation S502-03, an alternative function for the component isolated according to the scenario is started up by the scenario and a service is continued (S502-04).

On the other hand, the accountability process S503 is related to the record S301-05 and the cause analysis S301-06. The accountability process S503 starts from recordation of a log relating to the failure (S503-01).

Next, evidence of the runtime computer 102 reconfigured according to the scenario is collected (S503-02). The evidence herein is a record that as a result of the system reconfiguration, the runtime computer 102 operates appropriately according to the dependability description data.

Next, the process goes to cause-of-failure detection S503-03. This is a collection of the log (S503-01) regarding the failure, the evidence (S503-02), and dependability description data regarding the failure. In the present embodiment, the collection is regarded as achievement of accountability by stakeholders. These steps (S503-01 and S503-02) may be processed in parallel.

Figure 20:
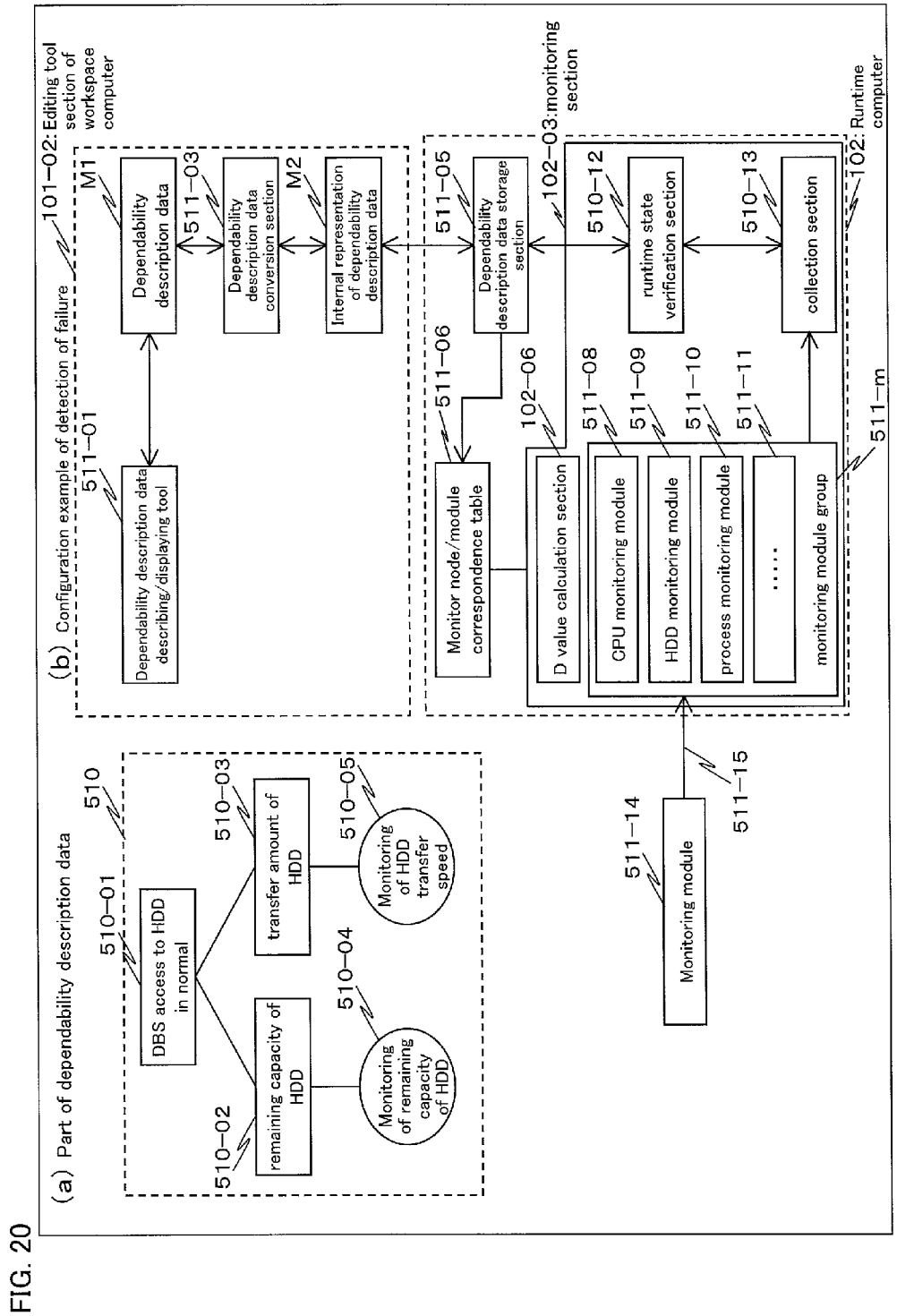
FIG. 20 is a view showing an example of the failure-occurrence detection process in FIG. 19. (a) of FIG. 20 shows a part of dependability description data. (b) of FIG. 20 is a block diagram showing a configuration example of a dependability maintenance system for detecting failure by using a monitor node.

FIG. 20 illustrates an example of the failure occurrence detection process carried out by the monitoring section 102-03.

(a) of FIG. 20 shows a part (510) of dependability description data. In preparing the dependability description data, it is explicitly indicated that data whose status changes in runtime requires to be monitored by a monitor node in the runtime.

The node (510-01) relates to "DBS access to HDD in normal". The node is diverged into two nodes. That is, a state where a database normally accesses a HDD device is broken down into two nodes, and the condition is described. Specifically, a node (510-02) relates to "remaining capacity of HDD", and a node (510-03) relates to "transfer capacity of HDD".

In the present example, the monitor nodes are deployed as evidences of the two nodes. In (a) of FIG. 20, a node (510-04) and a node (510-05) are monitor nodes. The node (510-04) monitors the remaining capacity of HDD. The node (510-05) monitors HDD transfer speed.

In a case where the target system can be monitored from the outside, the monitor node in the dependability description data monitors the target system by using monitoring modules (mentioned later) of the monitoring section 102-03. On the other hand, in a case where the target system cannot be monitored from the outside, the target system is monitored by sending a monitoring module into the target system in accordance with a later-mentioned procedure in deploying a program into the target system.

By comparing the result of monitoring in runtime with description of the dependability description data, a difference beyond a tolerable range of variation is specified as abnormality which is a behavior different from a standard at the time of designing. Furthermore, by referring to a superior node in the dependability description data, it is possible to grasp a state where dependability of the superior node is not satisfied due to multiple abnormalities. Furthermore, by comparing failure components in a single system or failure components among a plurality of systems, it is possible to narrow down a component where failure occurs.

(b) of FIG. 20 shows a configuration example of the dependability maintenance system 100 for detecting failure by using monitor nodes. The monitor nodes can be classified according to pattern. For example, two monitor nodes (510-04, 510-05) in (a) of FIG. 20 can have the form of "monitoring that '$2' of HDD '$1' is '$3'". By preparing in advance monitoring modules corresponding to patterns of these monitor nodes and preparing in advance a table showing correspondences between the patterns of the monitor nodes and monitoring modules, it is possible to monitor the state in runtime.

For example, correspondences between the two monitor nodes (510-04, 510-05) in (a) of FIG. 20 and modules can be shown as in FIG. 21. FIG. 21 shows that in a case of a monitor node having a pattern of "monitoring that '$2' of HDD '$1' is '$3'", when $2 indicates "disk capacity", a HDD monitoring module is used as a monitoring module, and $1 (=HDD identification number) and $3 (=tolerable range of variation) are designated as arguments.

The editing tool section 101-02 of the workspace computer 101 describes dependability description data M1, and converts the dependability description data M1 into internal representation of dependability description data M2 which is internal representation in the runtime computer 102. To be more specific, in the editing tool section 101-02 of the workspace computer 101, a dependability description data describing/displaying tool 511-01 describes the dependability description data M1, and then a dependability description data conversion section 511-03 converts the dependability description data M1 into the internal representation of dependability description data M2.

In the runtime computer 102, the update section 102- causes the internal representation of dependability description data M2 acquired from the workspace computer 101 to be stored in a dependability description data recording section (dependability description data storage section) 511-05. Furthermore, in accordance with the internal representation of dependability description data M2, the update section 102-01 causes correspondences between monitor nodes and monitoring modules (monitoring module group 511-*m*) in the monitoring section 102-3 to be stored in a monitor node/module correspondence table 511-06. In (b) of FIG. 20, monitoring modules included in the monitoring module group 511-*m* are a CPU monitoring module 511-08, a HDD monitoring module 511-09, and a process monitoring module 511-10. Other monitoring module 511-11 may be included in the monitoring module group 511-*m*.

Data (monitor value) obtained by the monitoring module in the monitoring section 102-03 is collected by a collection section 510-13, and recorded by a runtime state verification section 510-12 as a value of a monitor node in the dependability description data, based on the monitor node/module correspondence table 511-06. For example, a tolerable range of variation of the monitor value is described in such a manner as to correspond to individual monitor nodes of the dependability description data, and a node whose monitor value is outside the tolerable range of variation is detected as a node where failure occurs. Furthermore, a monitor value from the monitoring module group 511-*m* is used for calculation of a D value for a node in the D value calculation section 102-06. Accordingly, in the part 510 of the dependability description data in (a) of FIG. 20, monitor values acquired from two monitor nodes (510-04, 510-05) are compared with the tolerable range of variation and the D value is calculated based on the monitor values.

A CPU utilization ratio, memory usage, process creation or termination etc. are provided in advance as OS functions, and some of them can be monitored from the outside. However, functions such as "a process X in a system A has terminated normally" are difficult to monitor from the outside. They are mainly information unique to applications, and are embedded as a monitoring module 511-14 in the runtime computer 102. That is, in a case where a monitoring module for monitoring a monitoring target is not provided inside, there may be provided outside a monitoring module such as the monitoring module 511-14. Such embedding may be made in system architecture or in runtime of the runtime computer 102. This allows specifying abnormality per node of the dependability description data when the result of monitoring in runtime exceeds the tolerable range of variation.

Furthermore, by collecting the results of monitoring from individual monitoring modules in runtime (510-04, 510-05), it is possible to determine which monitor node on the dependability description data exceeds the tolerable range of variation. That is, it is possible to grasp occurrence of a problem in terms of dependability. In other words, by investigating the dependability description data from the monitor node to a superior node, it is possible to determine at which range dependability cannot be maintained. For example, in a situation where both of the node (510-04) and the node (510-05) exceed the tolerable range of variation, it is considered that unableness to maintain dependability is derived from a cause other than HDD, and a more superior node in the dependability description data is investigated. Furthermore, in a situation where a plurality of systems interact with each other, descriptions of not only dependability description data regarding individual systems but also dependability description data regarding interactions among the individual systems allows narrowing down or specifying a portion of behavior that exceeds the tolerable range of variation between systems.

The monitoring module group 511-*m* is a monitoring group embedded in a system beforehand. In a case where a new monitoring module is embedded during the operation, or in a case where determination of a tolerable range of variation must be made in consideration of data from a plurality of sensors or by analyzing data from a long, a monitoring module may be constituted by a script.

A schematic configuration of a script is explained below with reference to FIG. 22. A script is constituted by at least one basic operation 550-01 (D-Task in FIG. 22) and at least one control operation 550-02 (D-Control in FIG. 22). The control operation 550-02 classifies a tolerable range of variation by the degree of severity, and executes a basic operation (D-Task) with a corresponding degree of severity. For example, in a case of remaining capacity of a hard disk, the degree of severity equal to remaining capacity of 50% is regarded as "low", the degree of severity equal to remaining capacity of 75% is regarded as "middle", and the degree of severity equal to remaining capacity of 90% is regarded as "high", constituting the control operation 550-02 (D-Control). In this case, when the degree of severity is "high", D-Task 1 (550-03) is executed, and when the degree of severity is "middle", D-Task 2 (550-04) is executed, and when the degree of severity is "low", D-Task 3 (550-05) is executed.

The present invention may be arranged as follows.

The dependability maintenance device (runtime computer 102) of the present invention may be arranged such that in a process which is for allowing continuation of a service provided by a system in operation including the dependability description data in response to occurrence of failure and which includes means for detecting occurrence of failure (monitoring function), means for separating a failure component (separating function), means for continuing the service at a component other than the separated failure component, means for detecting cause of the failure (cause questioning function), and means for determining continuity of the service provided by the system in operation (continuity determining function) and which is constituted by a loop including a series of steps starting from occurrence of the failure, the dependability maintenance device executes two steps of: reconfiguring a target system including the dependability description data so as to minimize a term to stop the service in response to occurrence of the failure; and a stakeholder fulfilling accountability by operation of the system and provision of the service as a result of the reconfiguration.

The present invention may be arranged as follows.

The dependability maintenance device (runtime computer 102) of the present invention may be arranged such that out of the change accommodation cycle P300 for changing the dependability description data in accordance with a change in specification when the target system is developed or updated, and the failure response cycle P301 for avoiding abort of the target system based on the dependability description data when the target system is operated and occurrence of failure or a sign of failure is detected, at least the failure response cycle P301 is executed, and the dependability maintenance device further comprises reconfiguration means (reconfiguration section 102-04) for, when the occurrence of the failure is detected, reconfiguring the target system based on the dependability description data.

Consequently, when the runtime computer 102 which executes the failure response cycle P301 detects occurrence of failure of the target system, the runtime computer 102 can reconfigure the target system based on dependability description data, so that the operation of the target system can be continued.

The runtime computer 102 may detect occurrence of failure of the target system based on the D value. For example, occurrence of failure may be detected when the D value is less than a predetermined tolerable range of variation.

[8. Failure Response Cycle (Failure Prevention)]

Figure 23:
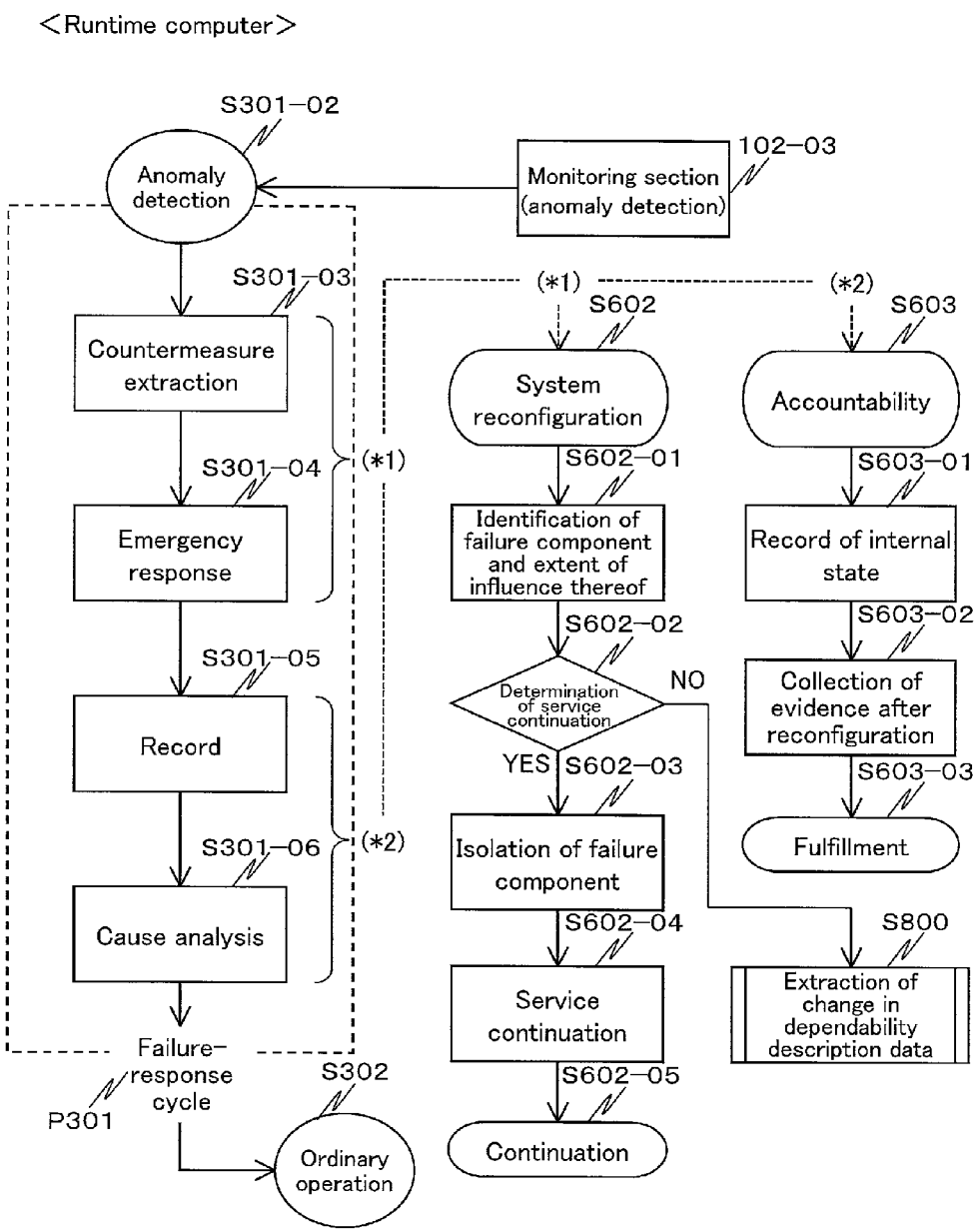
FIG. 23 is a flowchart showing two processes of the failure response cycle in FIG. 17 when a sign of failure is detected.

FIG. 23 is a flowchart showing two processes of the failure response cycle P301 when a sign of failure is detected. The failure response cycle P301 in FIG. 23 is the same as that in FIG. 17.

When the monitoring section (sign-of-failure detection means) 102-03 detects a sign of failure or malfunction (or a sign of malfunction), the process transits to the state of the sign of failure S301-02. A sign of failure can be detected by combining various methods. For example, a hard disk drive device can detect a sign of failure by using a mechanism of S.M.A.R.T. The monitoring section 102-03 detects a sign of failure when inclination of a temporal change in D value is worsened from a predetermined standard. The monitoring section 102-03 detects a sign of failure when inclination of a temporal change in data monitored by the monitor node is out of a tolerable range of variation. Two functions are related to the failure response cycle P301 in detection of a sign of failure; a system reconfiguration process S602 and an accountability process S603.

The system reconfiguration process S602 is related to the countermeasure extraction S301-03 and the emergency response S301-04. The system reconfiguration process S602 starts from identification-of-failure-component-and-extent-of-influence-thereof S602-01. Here, for convenience, a sign of failure is also considered as failure. Initially, which component of dependability description data is failure is identified. The range of influence of the component is identified based on the dependability description data. The range of influence of the component is identified by investigating nodes of the dependability description data. For example, in a case where there are a plurality of nodes corresponding to a failure component, a node common to the plurality of nodes can be identified as being within the scope of influence. When dependency between nodes is described in a node, the dependency may be used.

Next, in a continuation-of-service determination S602-02, it is determined whether a corresponding scenario extracted from the dependability description data can continue a service while the scenario sufficiently coverts the tolerable range of variation. In a case where the service can be continued (YES in S602-02), the process goes to isolation of failure component S602-03. In a case where a corresponding scenario cannot be extracted from dependability description data (NO in S602-02), it is determined that the service cannot be continued, and the change-in-dependability-description-data extraction process S800 (FIG. 27) is executed. Even in a case where it is determined in the continuation-of-service determination S602-02 that the service can be continued, there is a situation where the change-in-dependability-description-data extraction process S800 is preferably executed depending on a sign of failure. Accordingly, for such a situation, there may be employed an example that the change-in-dependability-description-data extraction process is executed.

Next, in the isolation of failure component S602-03, the failure component is isolated in accordance with the extracted corresponding scenario.

Next, the process goes to a service continuation S602-04, and the system reconfiguration process S602 is terminated. At this point of time, the service by the runtime computer 102 is continued (S602-05).

On the other hand, the accountability process S603 is related to the record S301-05 and the cause analysis 5301-06.

The accountability process S603 starts from a record-of-internal-state 5603. Here, dependability description data related to the failure and the internal state of the runtime computer 102 which is related to the dependability description data are recorded.

Next, evidence after the system reconfiguration process S602 is collected (S603-02). The evidence herein is a record that as a result of the system reconfiguration, the runtime computer 102 operates appropriately in accordance with the dependability description data. In the present embodiment, collection of the evidence is regarded as fulfillment of accountability by stakeholders (S603-03).

Figure 24:
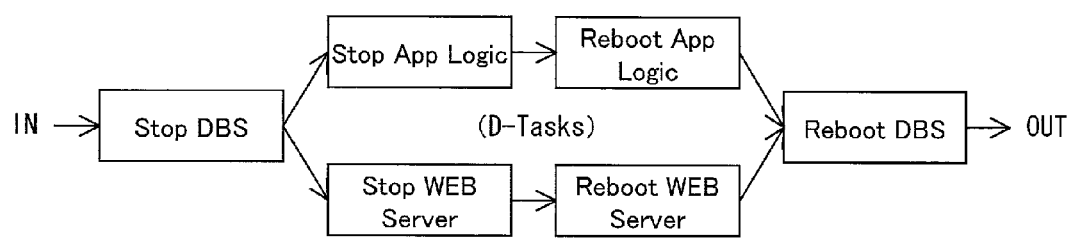
FIG. 24 is an explanatory view showing an example of a script used in the failure-occurrence detection process in FIG. 19.

The emergency response S301-04 may be carried out by using the aforementioned script (D-Script). An example thereof is shown in FIG. 24. The script (D-Script) is an example of a scenario for restarting the WEB service shown in (b) of FIG. 4, and is constituted by six basic operations (D-Task). The scenario is derived from a service continuation scenario in the requirements elicitation/risk analysis phase 250-11 in the DEOS process. The stakeholders agree with the scenario. The service continuation scenario is described in the form shown in FIG. 24 by using the tool group 260-01 for assisting a requirements elicitation/risk analysis phase, and converted into a script, to which an electronic signature is put as a result of agreement among the stakeholders.

When the script is executed in a script engine section 710 (102-07) (mentioned later) in the runtime computer 102, an electronic signature attached to the script is verified. When the electronic signature is invalid, the script is not executed. In execution of the script, an authority to execute the script may be confirmed. That is, the present invention may be arranged so as to confirm who is capable of executing which script. In this case, when there is no authority to execute the script, the script is not executed. The script itself may be encrypted and stored in the runtime computer 102. These measures for security allow preventing security breach due to the script.

Figure 25:
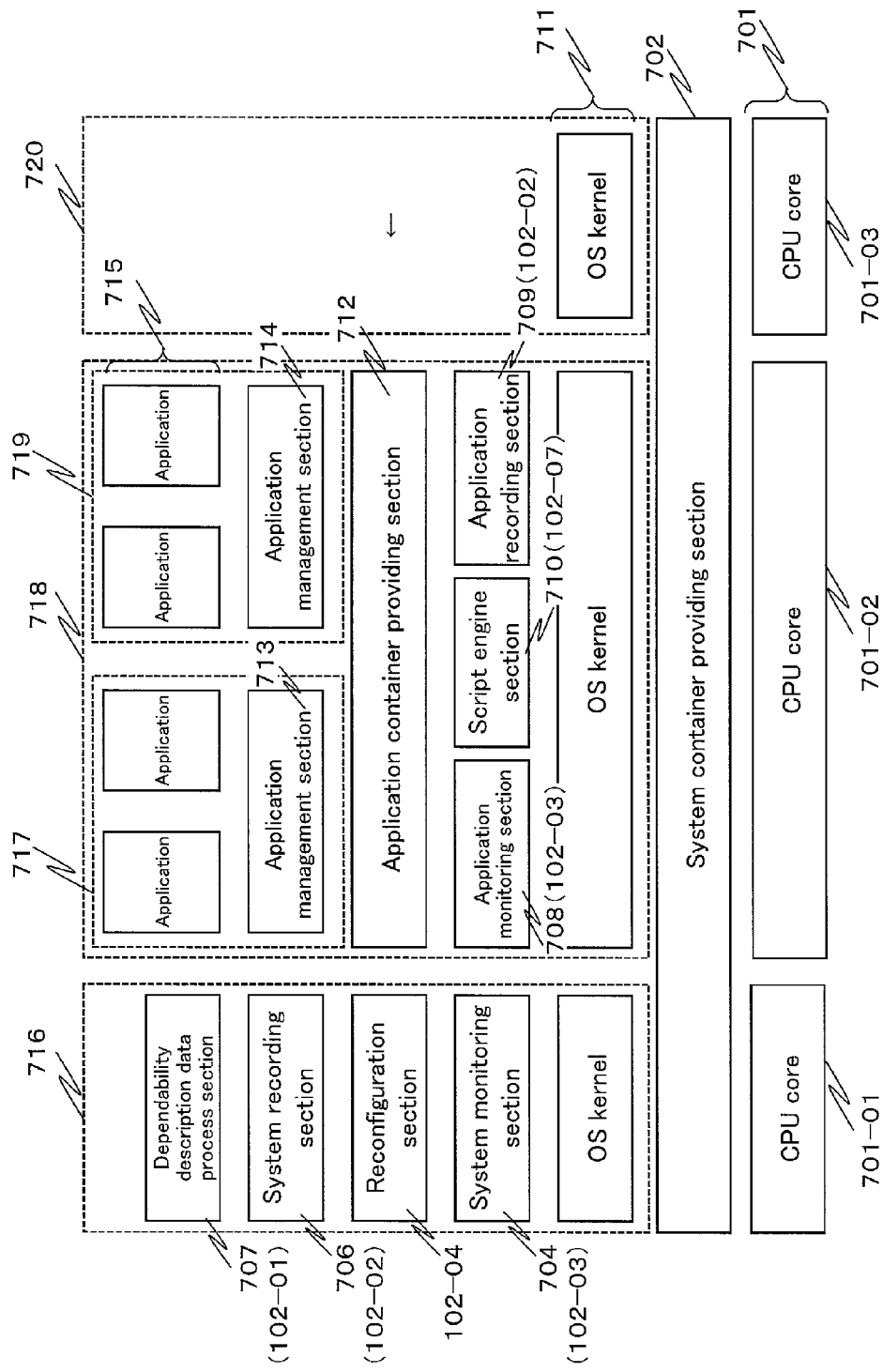
FIG. 25 is an explanatory view showing an example of a software hierarchy of the runtime computer in the dependability maintenance system in FIG. 1.

With reference to FIG. 25, the following description will discuss an example of a hierarchical structure of software for the runtime computer 102.

FIG. 25 shows a configuration example of a multi-core including three CPU cores 701 (701-01 to 701-03). In FIG. 25, peripheral devices are not shown. A system container providing section 702 exists at an upper layer of the CPU core. The system container providing section 702 is a part of the isolation section 102-05 (FIG. 1), and provides an isolated container which enables upper layers to operate a plurality of OS kernels 711. In FIG. 25, System containers 716, 718, and 720 are assigned to the CPU cores 701, respectively. Alternatively, a plurality of system containers may be assigned to one CPU core 701, or one system container may be assigned to a plurality of CPU cores 701.

The system container 716 is assigned to the CPU core 701-01, where a system monitoring section 704, a reconfiguration section 102-04, a system recording section 706, a dependability description data process section 707 are provided on the OS kernel 711.

One system container 716 exists for the runtime computer 102. The system monitoring section 704 is a part of the monitoring section 102-03 (FIG. 1), and monitors a system function of the runtime computer 102. In particular, the system monitoring section 704 monitors the OS kernels 711 of other system containers (the system containers 718 and 720 in FIG. 25). The system monitoring section 704 may be arranged to have a learning function. For example, in a case where the system monitoring section 704 is arranged to monitor a system function of the target system in such a manner as to monitor whether the system function is in consistency with a data structure of the target system, the system monitoring section 704 may automatically generate conditions for the consistency from the specification and source code corresponding to the system function. By learning the conditions in runtime, it is possible to continue a monitoring function without monitoring the whole of the data structure or without changing the structure of the monitor if the data structure is changed.

The reconfiguration section 102-04 reconfigures other system containers. Specifically, the reconfiguration section 102-04 stops and destructs an existing system container, creates a system container with a new structure, and reconfigures functions such as OS kernels according to the new structure and starts the reconfigured functions. When the system container is destructed, the internal state of the system container may be recorded by the system recording section 706. The system recording section 706 is a part of the recording section 102-02 (FIG. 1), and records the internal state of the runtime computer 102.

The dependability description data process section 707 is a part of the update section 102-01 (FIG. 1), and incorporates dependability description data inside the software SW generated in the workspace computer 101 into dependability description data of the runtime computer 102 as a whole, and extracts a scenario for processing the dependability description data, thereby reconfiguring the runtime computer 102 by using the reconfiguration section 102-04.

On the other hand, the system container 718 is assigned to the CPU core 701-02, where an application monitoring section 708, an application recording section 709, the script engine section 710, the application container providing section 712, application management sections 713 and 714, and an application group are provided on the OS kernel 711.

Here, at least one application container exists with respect to each system container mentioned above. The application container groups at least one application, realizes independency of an address space, independency of a name space, and independency of CPU scheduling. The application container is provided by the application container providing section 712. In FIG. 25, two application containers, i.e. the application containers 717 and 719 are provided for the system container 718.

The application monitoring section 708 is a part of the monitoring section 102-03 (FIG. 1), and monitors the inside of the application container. The application recording section 709 is a part of the recording section 102-02 (FIG. 1), and records the internal state of the application container.

In the application container 717, there is provided the application management section 713, which is used by at least one application. Similarly, in the application container 719, there is provided the application management section 714, which is used by at least one application.

The internal structure of the system container 720 is the same as that of the system container 718, and accordingly an explanation thereof is omitted and is not shown in FIG. 25.

FIG. 26 shows examples of functional requirements for individual isolation items realized by the isolation section 102-05 (FIG. 1) in the runtime computer 102. These isolation items may be partially selected so that only necessary functional requirements are realized. For example, in a case of the system container, all of these items are realized, and in a case of the application container, three items of the address space, the name space, and the CPU scheduling are realized.

The present invention may be arranged as follows.

The dependability maintenance device (runtime computer 102) of the present invention may be arranged such that in a process which is for detecting a sign of failure and avoiding occurrence of the failure before it occurs so as not to stop a service provided by a system in operation including the dependability description data and which includes means for recording an internal state of the system (logging), means for detecting a sign of failure of the system based on the recorded internal state, means for identifying a part corresponding to the detected failure of the system, and means for determining continuity of a service provided by the system in operation when the failure is detected and which is constituted by a loop including a series of steps starting from detection of occurrence of the failure, the dependability maintenance device executes two steps of: reconfiguring the system so as to avoid abort of the service due to the detected occurrence of the failure or the detected sign of the failure; and a stakeholder fulfilling accountability by operation of the system and provision of the service as a result of the reconfiguration.

Furthermore, the present invention may be arranged as follows.

The dependability maintenance device (runtime computer 102) of the present invention may be arranged such that out of the change accommodation cycle P300 for changing the dependability description data in accordance with a change in specification when the target system is developed or updated, and the failure response cycle P301 for avoiding abort of the target system based on the dependability description data when the target system is operated and occurrence of failure or a sign of failure is detected, at least the failure response cycle P301 is executed, and the dependability maintenance device further comprises reconfiguration means (reconfiguration section 102-04) for, when the sign of the failure is detected, reconfiguring the target system based on the dependability description data.

Consequently, when the runtime computer 102 which executes the failure response cycle P301 detects occurrence of failure of the target system, the runtime computer 102 can reconfigure the target system based on dependability description data, so that the operation of the target system can be continued.

The runtime computer 102 may detect a sign of failure of the target system based on a D value. For example, the runtime computer 102 may detect a sign of failure when inclination of a temporal change in D value is worsened from a predetermined standard.

The runtime computer 102 may detect a sign of failure of the target system based on monitoring data of the monitor node. For example, the runtime computer 102 may detect a sign of failure when inclination of a temporal change in the monitoring data is worsened from a predetermined standard and is out of a tolerable range of variation.

[9. Start of Change Accommodation Cycle from Failure Response Cycle]

Figure 27:
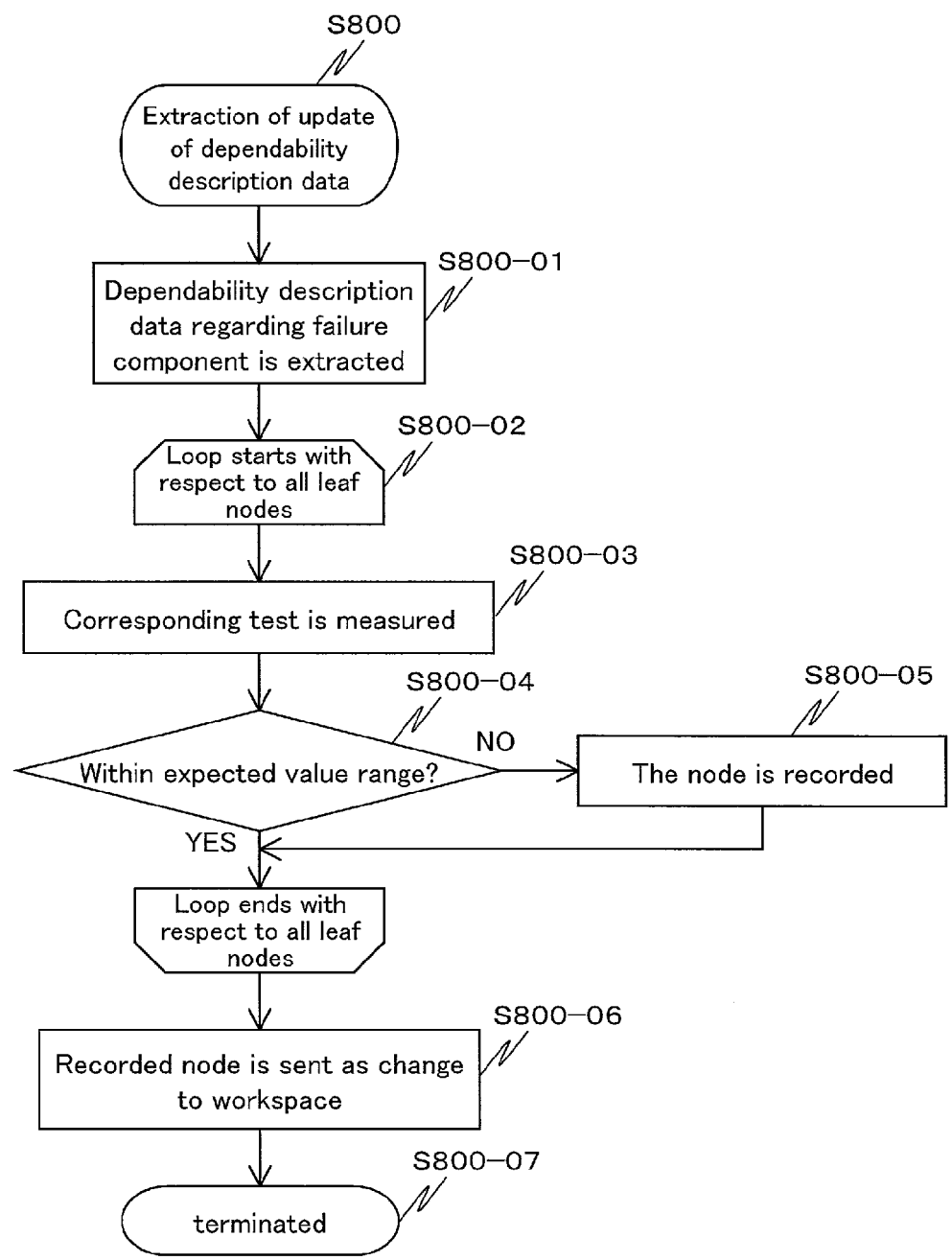
FIG. 27 is a flowchart showing a procedure of a process of extracting a change in dependability description data in the dependability maintenance system in FIG. 1.

FIG. 27 is a flowchart showing a procedure of a process of extracting a change in dependability description data in the dependability maintenance system 100.

In the determination of service continuation S502-01 (FIG. 19) or in the determination of service continuation 602-02 (FIG. 23), when the determination of service continuation indicates "NO", i.e. when the service is considered as unable to be continued, the change-in-dependability-description-data extraction process S800 is executed.

Initially, dependability description data regarding a failure component is extracted (S800-01). Next, with respect to all leaf nodes in the dependability description data which nodes are related to tests, processes of S800-03 to S800-05 are executed (S800-02).

For example, in FIG. 5, the node group (202-06 to 202-13) falls into such nodes. Accordingly, tests corresponding to the node group (202-06 to 202-13) are executed and measured (S800-03). Since the result as evidence has been already present, comparison of the result as evidence with the result of measurement allows determining whether a difference from the evidence is within a tolerable range of variation or not (S800-04). In a case where the difference is outside the tolerable range of variation (NO), identification information of the node (e.g. node number) is recorded as abnormal (S800-05).

Upon completion of the process on all the nodes, an instruction to change a node whose identification information has been recorded is sent to the workspace computer 101 (S800-06), and the process is terminated (S800-07).

The present invention may be arranged as follows.

The dependability maintenance device (runtime computer 102) of the present invention may be arranged such that in a case where it is determined in the failure response cycle P301 that a service provided by a system having the dependability description data in operation of the system cannot be continued, the dependability maintenance device carries out a step of supplying, as a requirement to the failure response cycle P301, a change in dependability description data of the system, based on information recorded or detected in the failure response cycle P301, in order to continue the service provided by the system in the change accommodation cycle P300.

The present invention may be arranged as follows. The dependability maintenance device (dependability maintenance system 100, runtime computer 102) of the present invention may be arranged to further comprise change request transmission means (change transmission section 902-02) for, when the occurrence of the failure or the sign of the failure is detected and abort of the target system is unavoidable, transmitting a request for changing the dependability description data to a device executing the change accommodation cycle P300 (workspace computer 101).

The dependability maintenance device (dependability maintenance system 100, workspace computer 101) of the present invention may be arranged such that out of the change accommodation cycle P300 for changing the dependability description data in accordance with a change in specification when the target system is developed or updated, and the failure response cycle P301 for avoiding abort of the target system based on the dependability description data when the target system is operated and occurrence of failure or a sign of failure is detected, at least the change accommodation cycle P300 is executed, and when the dependability maintenance device receives a request for changing the dependability description data from a device executing the failure response cycle P301 (runtime computer 102), the dependability description data is changed.

With the arrangement, in the runtime computer 102 executing the failure response cycle P301, when it is determined that the occurrence of the failure of the target system or the sign of the failure of the target system is detected and abort of the target system is unavoidable, it is possible to transmit a request for changing the dependability description data to the workspace computer 101 executing the change accommodation cycle P300. The runtime computer 102 may determine whether abort of the target system by the occurrence of failure or the sign of failure is unavoidable or not according to the D value.

Upon reception of a request to change dependability description data from the runtime computer 102, the workspace computer 101 changes the dependability description data in accordance with the request.

This enables the runtime computer 102 and the workspace computer 101 to collaborate with each other to smoothly carry out a process of detecting occurrence of failure or a sign of failure of the target system, and changing dependability description data if abort of the target system is unavoidable. This makes it possible to continuously maintain dependability of the target system in open environment.

The aforementioned configuration may be arranged such that even in a case where abort of the target system is avoidable, there is carried out the aforementioned procedure of changing dependability description data depending on a sign of failure.

[10. Collaboration of Failure Response Cycle and Change Accommodation Cycle]

Figure 28:
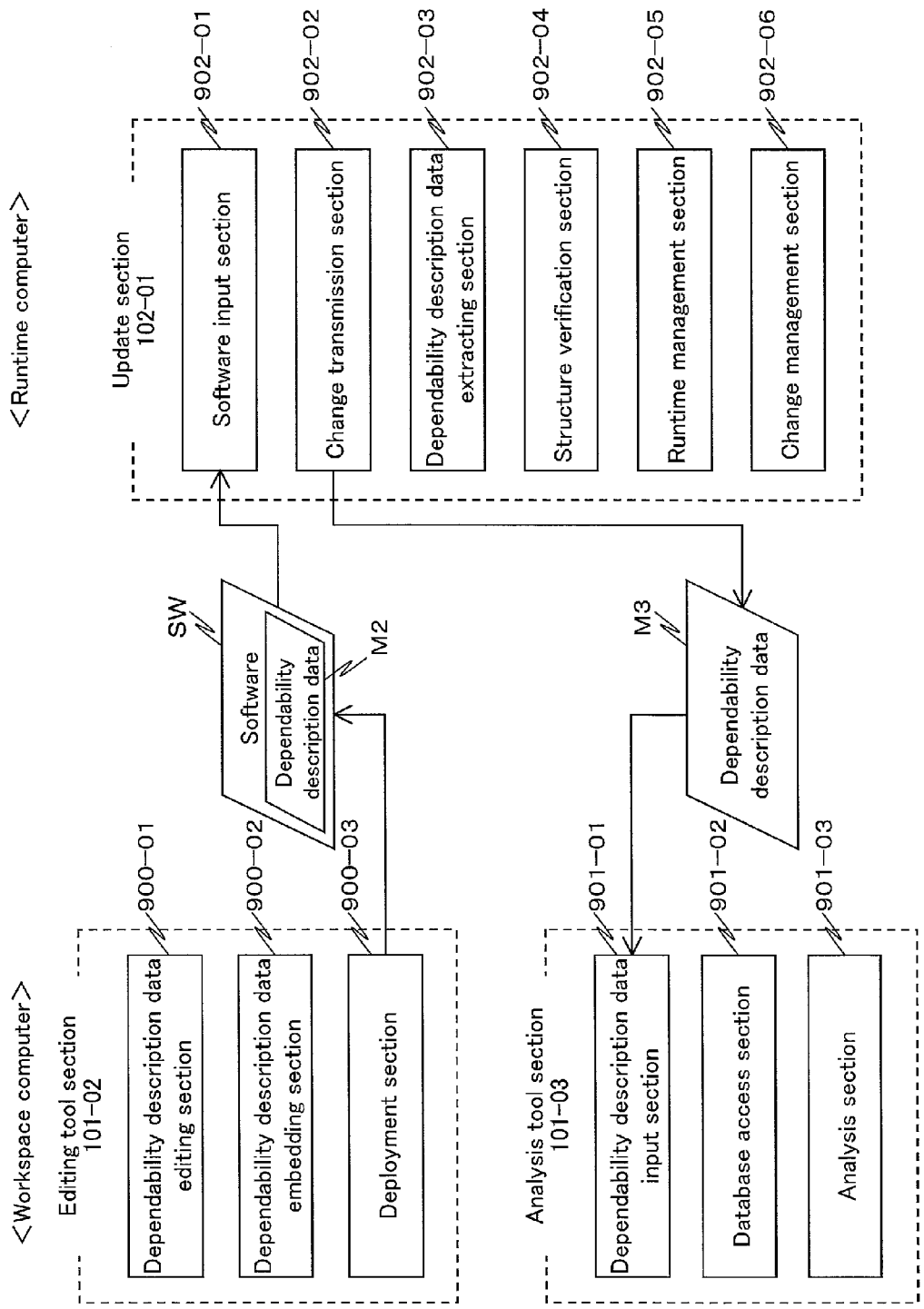
FIG. 28 is a functional block diagram showing collaboration between a workspace computer and a runtime computer via dependability description data in the dependability maintenance system in FIG. 1.

FIG. 28 is a functional block diagram showing information exchange between the workspace computer 101 and the runtime computer 102 via dependability description data.

The editing tool section 101-01 in the workspace computer 101 mainly has three constituents. A dependability description data editing section 900-01 describes, edits, and records dependability description data. The dependability description data editing section 900-01 may be a D-Case Editor (260-06) shown in FIG. 16. The dependability description data editing section 900-01 may be a tool described in Japanese Patent Application No. 2010-263681. In this application, dependability description data is described in a requirement base in such a manner that a node of interest is positioned at the center of display, thereby simplifying the flow of detailing.

A dependability description data embedding section 900-02 converts dependability description data M1 generated in the dependability description data editing section 900-01 into an internal representation so as to generate dependability description data M2 (to be specific, internal representation of dependability description data M2; corresponding to dependability description data 104-02 in FIG. 3). Then, the dependability description data embedding section 900-02 embeds, in software SW, the dependability description data M2 corresponding to (or regarding) the software SW. A deployment section 900-03 deploys the software SW into the runtime computer 102.

In the dependability description data M2, tolerable ranges of variations of monitor values to be monitored are recorded by the dependability description data editing section 900-01 with respect to each evidence node. Consequently, the monitoring section 102-03 of the runtime computer 102 can confirm the state of a monitor value. On the other hand, in the dependability description data M3, all or a part of monitor values to be monitored are recorded by the recording section 102-02 with respect to each evidence node. Consequently, an analysis section 901-03 of the workspace computer 101 can analyze the cause of failure in the system.

The analysis tool section 101-03 of the workspace computer 101 mainly includes three constituents. The dependability description data input section (description data acquiring means) 901-01 receives dependability description data M3 as an input from the runtime computer 102. The database access section 901-02 accesses a plurality of dependability description data regarding software as a whole deployed into the runtime computer 102. The database may be provided in the workspace computer 101, or in the runtime computer 102, or in other device communicable with the workspace computer 101. Here, dependability description data M4 related to the dependability description data M3 having been inputted is extracted from the database. The dependability description data M4 is an original model, and the dependability description data M3 is a model in which a change is described. The dependability description data M4 extracted from the database is searched for using the dependability description data M3 as a key. Alternatively, dependability description data with a wider range may be extracted, which makes the process in the analysis section 901-03 easier. The analysis section 901-03 analyzes the dependability description data M3 having been inputted and the dependability description data M4 acquired via the database access section 901-02, searches for the cause of failure etc., and causes the process to transit to the state of the environment change S300-01 (FIGS. 17 and 18) if necessary, thereby executing the change accommodation cycle P300. On the other hand, in the runtime computer 102, the update section 102-01 includes six constituents. The software input section (description data acquiring means) 902-01 receives software SW as an input from the deployment section 900-03 of the workspace computer 101. The software SW is installed by the update section 102-01 into the runtime computer 102 and operated therein. A dependability description data extracting section 902-03 extracts dependability description data M2 (to be specific, internal representation of dependability description data M2; corresponding to dependability description data 104-02 in FIG. 3) included in the software SW. A structure verification section 902-04 verifies validity of the extracted dependability description data M2 as computational representation. Furthermore, the structure verification section 902-04 confirms whether a necessary function (e.g. library) is provided in the runtime computer 102. An execution management section 902-05 makes a necessary preparation for deploying the software SW into the runtime computer 102. For example, in a case where the software SW is a new service application, the execution management section 902-05 estimates and assigns a necessary computing resource, generates an application container (application container 717 etc. in FIG. 25), and configures an application image in the application container.

Furthermore, the change transmission section (change request transmission means) 902-02 transmits, to the dependability description data input section 901-01 of the runtime computer 102, a changed part of the dependability description data M2 installed to the runtime computer 102 (dependability description data M3). At that time, the change transmission section 902-02 may transmit, together with the changed part, a request for changing the dependability description data. In the runtime computer 102, a change management section 902-06 manages the change in the dependability description data shown in FIG. 27.

In the above description, the workspace computer 101 and the runtime computer 102 exchange information via computer representation of dependability description data. When the former supplies information to the latter, the dependability description data M2 serves as means therefor. When the latter supplies information to the former, the dependability description data M3 serves as means therefor. The dependability description data M2 is a model corresponding to agreement among stakeholders, and the dependability description data M3 is a difference due to unsatisfaction of the agreement among stakeholders in the runtime computer 102, and is a notice to the stakeholders.

The present invention may be arranged as follows.

The dependability maintenance device (dependability maintenance system 100, workspace computer 101, runtime computer 102) of the present invention may have means for exchanging information between the change accommodation cycle P300 and the failure response cycle P301 for the purpose of continuing a service provided by a system having the dependability description data.

[11. Collaboration with Dependability Description Data]

FIG. 29 shows a part of a list of the dependability description data in FIG. 5 which is described in XML as an example of computer representation. The dependability description data M2 embedded in the software SW or the dependability description data M3 in FIG. 28 can be described in XML.

Figure 30:
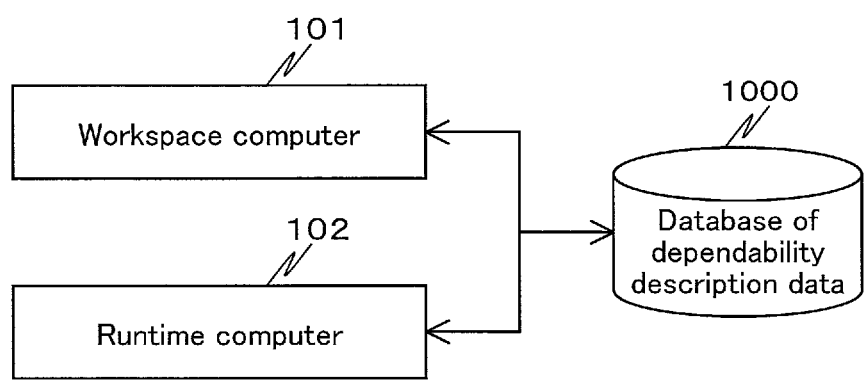
FIG. 30 is an explanatory view of a configuration example of the dependability maintenance system in FIG. 1, showing a relation among a dependability description data database, the workspace computer, and the runtime computer.

FIG. 30 is an explanatory view of a configuration example of the dependability maintenance system 100, showing a relation among the dependability description data database, the workspace computer, and the runtime computer.

As shown in FIG. 30, the present invention may be arranged such that the dependability description data M2 embedded in the software SW is stored in a dependability description data database 1000 different from the workspace computer 101 and the runtime computer 102 so that the dependability description data M2 can be used by the workspace computer 101 and the runtime computer 102. The database may be the agreement description database 250-06 shown in FIG. 15.

The present invention may be arranged as follows.

The dependability maintenance device (dependability maintenance system 100, workspace computer 101, runtime computer 102) of the present invention may be arranged so as to include means for causing a system having dependability description data to manage data in a computer-processable format which is converted from the dependability description data, so that a result of the step of agreement on a change in requirement among stakeholders in the change accommodation cycle P300 is surely reflected on the system.

[12. Command Process in Runtime Computer]

Figure 31:
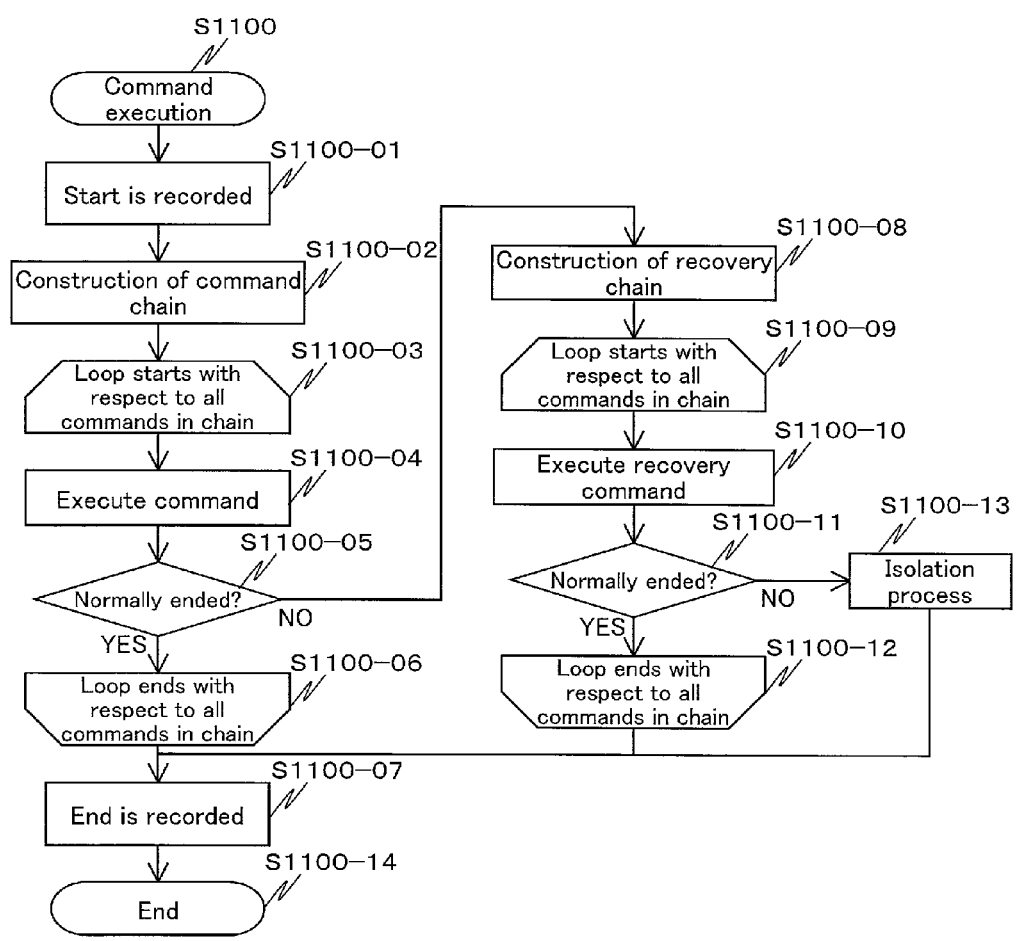
FIG. 31 is a flowchart showing a procedure of command execution in the runtime computer in the dependability maintenance system in FIG. 1.

FIG. 31 shows a procedure of command execution in the runtime computer 102. A command in the present embodiment may be a series of processes which are embedded in the runtime computer 102 beforehand and which are executable by the runtime computer 102, or may be a program which is associated with a node of dependability description data (mentioned later) and which is executable by the runtime computer 102.

Initially, when starting a command execution process S1100, start of the process is recorded (S1100-01). Next, the process is broken into one or more command sequences, which constitute a chain (S1100-02). Next, all the commands in a command chain are subjected (S1100-03) to processes of S1100-04 and S1100-05 described below.

That is, a command in the chain is executed (S1100-04), and it is determined whether the command is terminated normally or abnormally (S1100-05). In a case where all the commands are ended normally (YES in S1100-05), the end is recorded (S 1100-07), and the process is terminated (S1100-14).

On the othe hand, in a case where a command in the command chain is ended abnormally (NO in S1100-06), a recovery chain is constructed (S1100-08) in order to cancel the effect of the executed command. Thereafter, all the commands in a recovery chain are subjected (S1100-09) to execution of recovery command (S1100-10), and it is determined whether execution of the recovery command is ended normally or abnormally (S1100-11). In a case where all the recovery commands are ended normally (YES in S1100-11), the normal end is recorded (S1100-07), and the process is terminated (S1100-14).

On the other hand, in a case where execution of the recovery command is terminated abnormally (NO in S1100-11), a necessary isolation process (S1100-13) is carried out, a container (application container or system container) including the process is isolated, and the isolation is recorded (S1100-07), and the process is terminated (S1100-14). Thereafter, the reconfiguration process is carried out.

The aforementioned procedure may be arranged such that the basic operation shown in FIG. 24 serves as a command chain. This allows surely executing the script as an atomic operation.

The present invention may be arranged as follows.

The dependability maintenance device (dependability maintenance system 100, workspace computer 101, runtime computer 102) of the present invention may be arranged so as to include means for assuring that means described in [A], [B], and [C] below are surely executed for the purpose of continuing a service provided by a system having the dependability description data. [A] Means for, in a case where it is determined in the failure response cycle P301 that a service provided by a system having the dependability description data in operation of the system cannot be continued, supplying, as a requirement to the change accommodation cycle P300, a change in dependability description data of the system, based on information recorded or detected in the failure response cycle P301, in order to continue the service provided by the system in the change accommodation cycle P300. [B] Means for exchanging information between the change accommodation cycle P300 and the failure response cycle P301 in order to continue a service provided by a system having the dependability description data. [C] Means for causing a system having dependability description data to manage data in a computer-processable format which is converted from the dependability description data, so that a result of agreement on a change in requirement among stakeholders in the change accommodation cycle P300 is surely reflected on the system.

[13. Association of Executable Program with Node]

Figure 32:
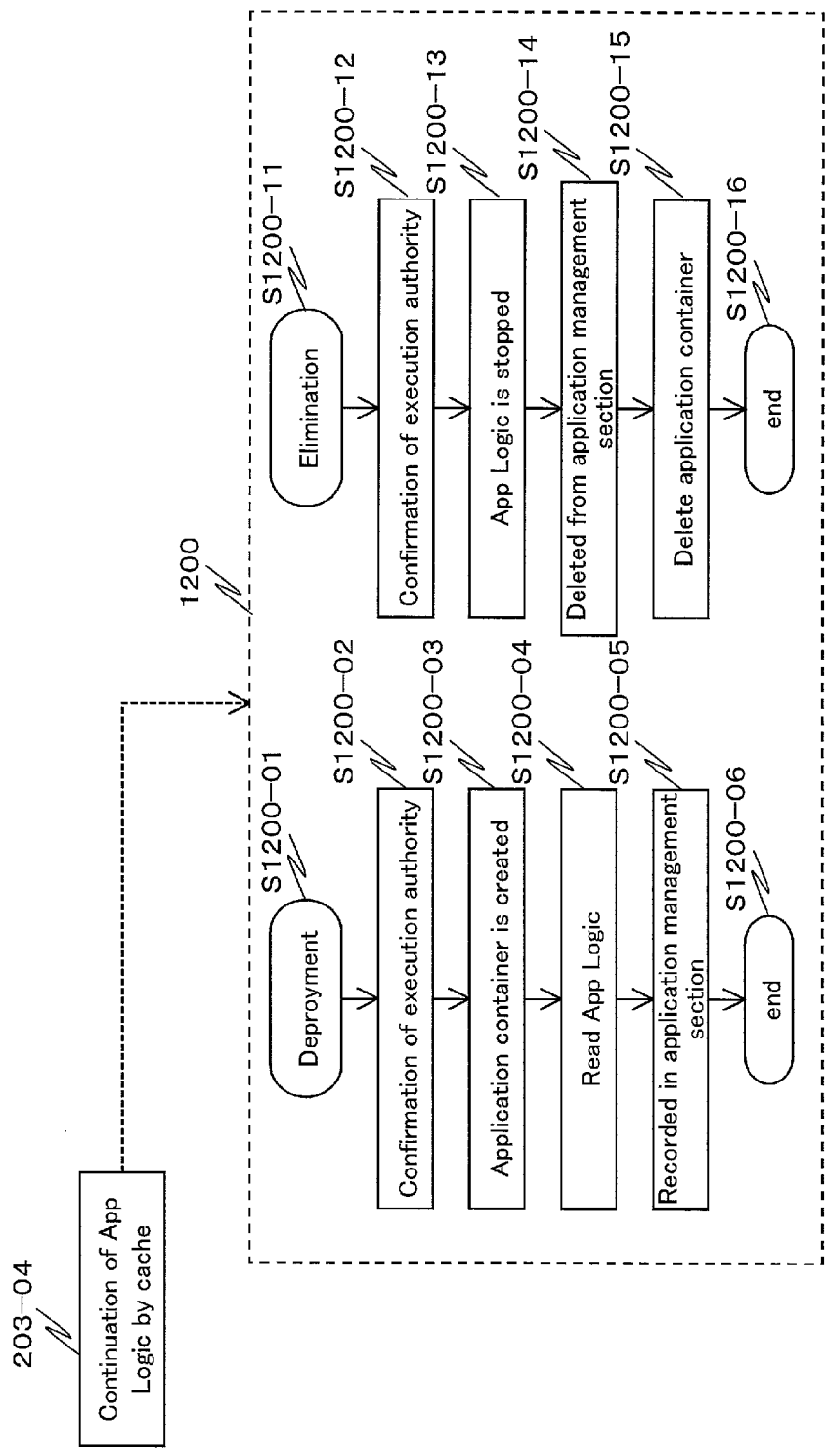
FIG. 32 is a flowchart showing an example of a process of a program associated with dependability description data in the dependability maintenance system in FIG. 1.

FIG. 32 is a flowchart showing an example of a process of a program associated with dependability description data.

The node (203-04) shown in FIG. 32 is the same as the node shown in FIG. 6. The node relates to "continuation of App Logic by cache". In the present embodiment, the dependability description data is deployed in accordance with an embedding procedure to the runtime computer 102. At that time, a program executable by a binary execution section 110R of the runtime computer 102 may be associated with individual nodes of the dependability description data. Furthermore, the dependability description data is deployed into the runtime computer 102 while an executable program is associated with a monitor node. Association of a program with a node can be described in the external reference information 104-04. In FIG. 32, the process of the program is represented by a flowchart. The process of the program may be represented by a script language or a program code directly executable by the binary execution section 110R.

In a program 1200, two process procedures: a deployment process S1200-01 and an elimination process S1200-11 are defined.

In the deployment process S1200-01, after confirmation of execution authority (S 1200-02), an application container is created (S 1200-03) using the function of the application container providing section 712 (FIG. 25). Next, an application corresponding to the App Logic 201-03 ((b) of FIG. 4) is read, and the program code is stored in the application management section 714 (FIG. 25).

On the other hand, in the elimination process S1200-11, after confirmation of execution authority (S1200-12), the application corresponding to the App Logic 201-03 is terminated (S1200-13), the record of the program code is deleted from the application management section 714, and the application container is deleted using the function of the application container providing section 712.

Figure 33:
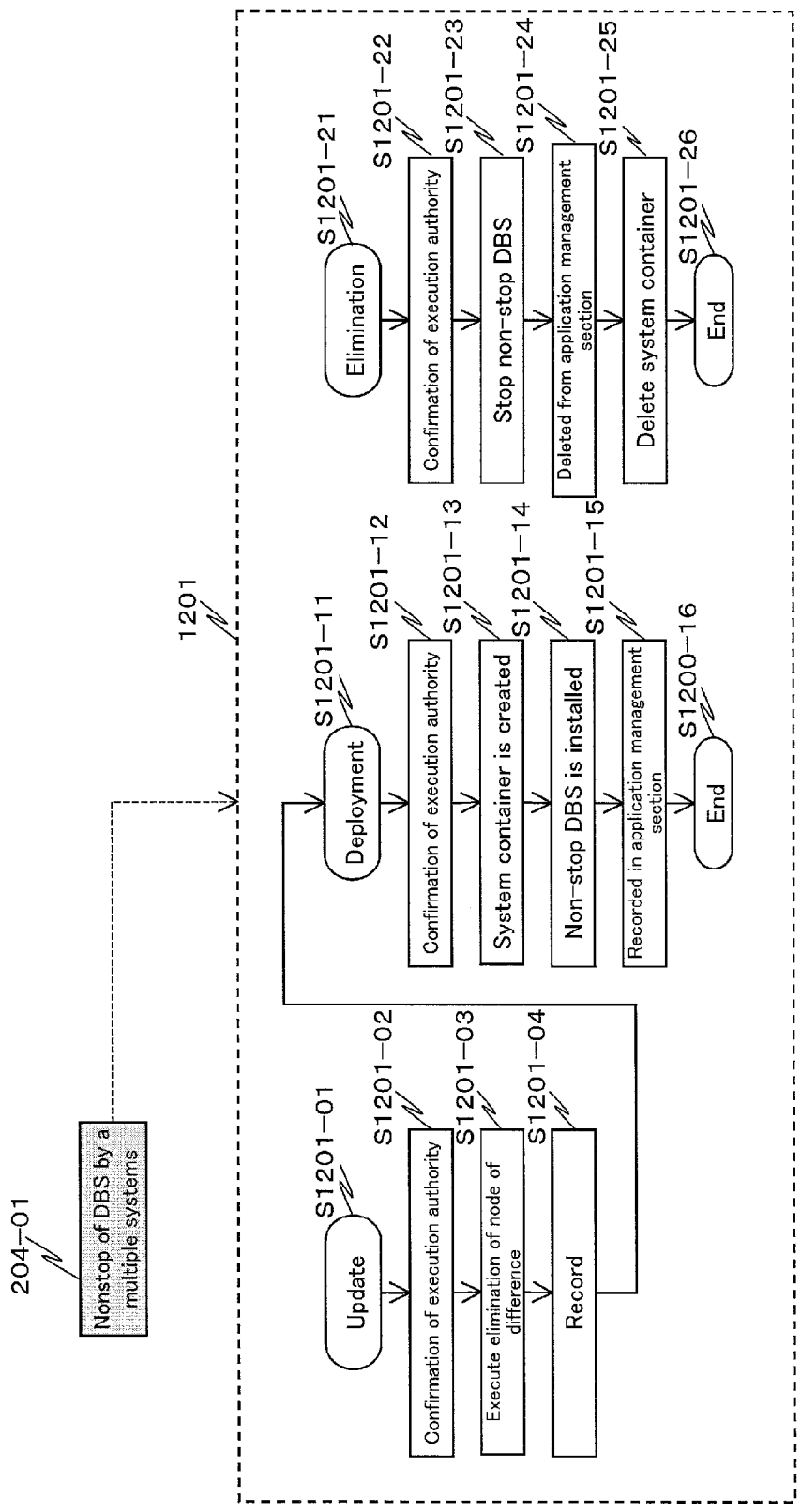
FIG. 33 is a flowchart showing another example of the process of the program associated with dependability description data in the dependability maintenance system in FIG. 1.

FIG. 33 is a flowchart showing another example of the process of the program associated with dependability description data.

The node (204-01) shown in FIG. 33 is the same as the node shown in FIG. 7. The node relates to "non-stop of DBS by multiple systems". That is, the node is a part of dependability description data regarding a multiple-system database in which a plurality of database systems with a backup system are operated at the same time.

In a program 1201, three process procedures of an update process S1201-01, a deployment process S1201-11, and an elimination process S1201-21 are defined. In a case where a node in the dependability description data is replaced with another one, when a program is associated with the node, an update process defined in the program is executed.

Specifically, in FIG. 33, a node (203-04) is replaced with a node (204-01), and so an update process of the node is executed. The update process S1201-01 is executed in such a manner that execution authority is confirmed (S1201-01) and then the elimination process S1200-11 associated with a node to be replaced (in case of FIG. 33, node (203-04) shown in FIG. 32) is executed. In the execution, the result is recorded (S1201-04) in accordance with a flowchart of the command execution process S1100 in FIG. 31.

Next, the deployment process S1201-11 is executed in such a manner that execution authority is confirmed (S1201-12) and then a system container is created using the function of the system container providing section 702 (FIG. 25), and then a non-stop DBS is installed (S1201-14) and the DBS is recorded in the application management section 714 (FIG. 25).

On the other hand, the elimination process S1201-21 is executed in such a manner that execution authority is confirmed (1201-21) and then the non-stop DBS is shutdown (S1201-23), the record of the DBS is deleted from the application management section 714 (S1201-24), and the system container of the DBS is deleted using the function of the system container providing section 702 (S1201-25).

The present invention may be arranged as follows.

The dependability maintenance device (runtime computer 102) of the present invention may be arranged so as to further comprise representation means for processing the following means groups [A] and [B] by a computer. [A] In a process for allowing continuation of a service provided by a system in operation including the dependability description data in response to occurrence of failure, means for detecting occurrence of failure (monitoring function), means for separating a failure component (separating function), means for continuing the service at a component other than the separated failure component, means for detecting cause of the failure (cause questioning function), and means for determining continuity of the service provided by the system in operation (continuity determining function). [B] In a process for detecting a sign of failure and avoiding occurrence of the failure before it occurs so as not to stop a service provided by a system in operation including the dependability description data, means for recording an internal state of the system (logging), means for detecting a sign of failure of the system based on the recorded internal state, means for identifying a part corresponding to the detected failure of the system, and means for determining continuity of a service provided by the system in operation when the failure is detected.

The present invention may be arranged as follows.

The dependability maintenance device (runtime computer 102) of the present invention may be arranged such that the dependability description data describes a procedure of the reconfiguration, and the reconfiguration means (reconfiguration section 102-04) reconfigures the target system in accordance with the procedure of the reconfiguration.

Consequently, the runtime computer 102 can reconfigure the target system in accordance with the procedure of the reconfiguration described in the dependability description data. Since the procedure of the reconfiguration can be described in the dependability description data in the step of designing the dependability description data, it is unnecessary to prepare the procedure at the time of the reconfiguration.

[14. Association with Consensus-Building Tool]

Figure 34:
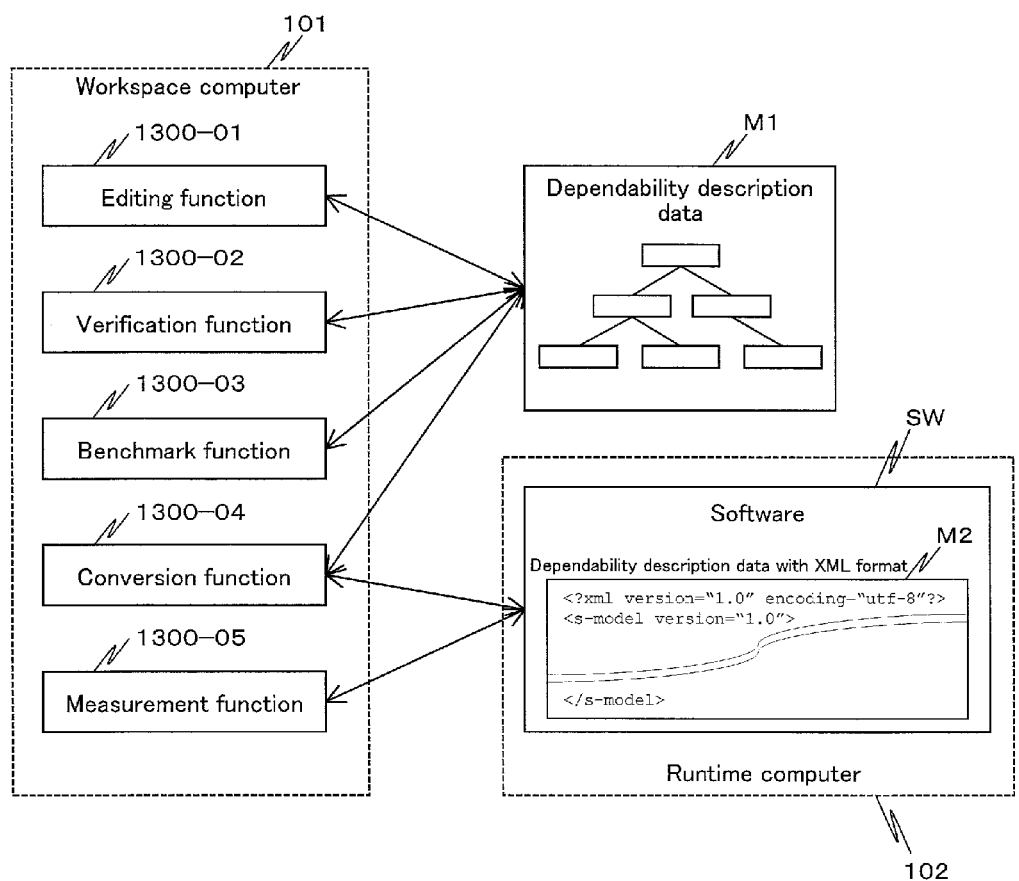
FIG. 34 is an explanatory view showing a relation between dependability description data and functions of a tool group included in the workspace computer in the dependability maintenance system in FIG. 1.

FIG. 34 shows a relation among dependability description data M1, dependability description data with XML format M2 (to be specific, internal representation of dependability description data M2. Since a case of selecting internal representation in XML format is explained here, a term "dependability description data with XML format M2" is used), and functions of a tool group included in the workspace computer 101.

An editing function 1300-01 (function of editing tool section 101-02 in FIG. 1) inputs/modifies/records dependability description data M1. A verification function 1300-02 (function of verification tool section 101-01 in FIG. 1) verifies validity of the dependability description data M1. A benchmark function 1300-03 (function of verification tool section 101-01 in FIG. 1) confirms evidence in the dependability description data M1. A conversion function 1300-04 (function of editing tool section 101-02 and development tool section 101-04 in FIG. 1) converts a differential verification model M1 into the dependability description data with XML format M2 which is in a format for embedding into the software SW. The present example may be arranged such that in the conversion, a monitor node part is extracted from the dependability description data, and the dependability description data is converted while maintaining the structure of the monitor node part. A measurement function 1300-05 (function of verification tool section 101-01 in FIG. 1) accesses the monitor node of the dependability description data with XML format M2 so as to measure and extract data.

Figure 35:
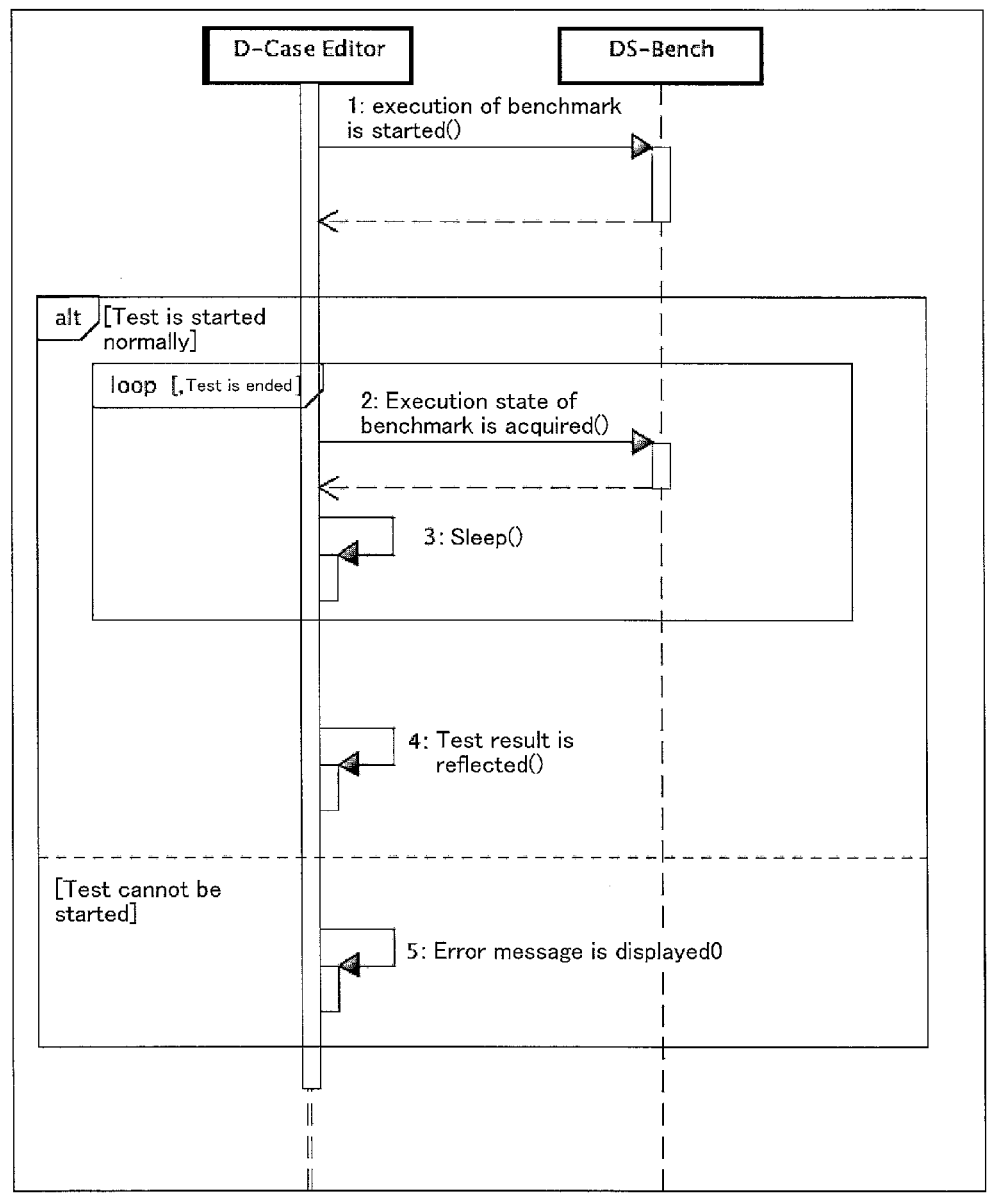
FIG. 35 is an explanatory view showing collaboration between a benchmark function and a D-Case Editor in the dependability maintenance system in FIG. 1.

FIG. 35 shows collaboration between a benchmark function (referred to as DS-Bench in FIG. 35) and a D-Case Editor in FIG. 16. The D-Case Editor is designed such that a benchmark to be executed can be designated to a monitor node on the D-Case Editor. An actual benchmark is executed based on a benchmark execution instruction from the D-Case Editor, and the result of the execution is reflected, which is recorded as evidence. The result of the benchmark can be used for calculation of a D value. Furthermore, a benchmark having an influence on a D value can be prepared. In this case, as the benchmark has a larger influence on the D value, the benchmark is more effective.

The benchmark may include a benchmark for verifying attributes which are other than an attribute regarding a performance of a system and which may cause failure. Examples of such a benchmark include a benchmark regarding behavior of a system when CPU load is changed, a benchmark regarding behavior of a system when a bandwidth of a network is changed or when delay is changed, a benchmark regarding behavior of a system when excess memory is changed, a benchmark regarding behavior of a system when a load is wholly put on the system by simulating excessive access, and a benchmark regarding behavior of a system when a component of the system is intentionally aborted.

Furthermore, in a case of employing the D-Case description in FIG. 8 for example, the dependability description data may be arranged to employ Agda theorem prover (http:// wiki.portal.chalmers.se/agda/pmwiki.php). This allows automatically removing a typographical error in the D-Case description.

The present invention may be arranged as follows.

The dependability maintenance device (dependability maintenance system 100, workspace computer 101) of the present invention may be arranged so as to further comprise means for describing, in a step of building consensus among stakeholders in the change accommodation cycle P300 for the purpose of continuing a service provided by a system including the dependability description data, a change in requirement from a stakeholder in a computer-processable representation format, and means for logically verifying the representation format.

[15. Collaboration Between Dependability Maintenance Systems]

The dependability maintenance system 100 in accordance with the present embodiment includes the workspace computer 101, the dependability description data M1, and the runtime computer 102. Dependability which can be calculated by the dependability maintenance system 100 is represented by the dependability description data M1.

Figure 36:
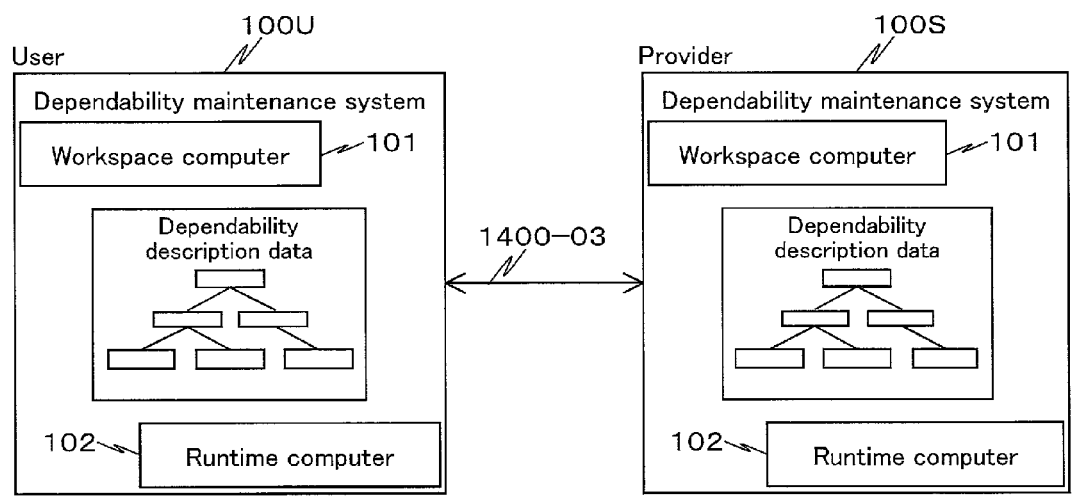
FIG. 36 is a block diagram showing a configuration example in which two dependability maintenance systems in FIG. 1 are connected with each other.

FIG. 36 is a block diagram showing a configuration example in which two dependability maintenance systems 100 are connected with each other.

As shown in FIG. 36, there can be configured a complex system in which a dependability maintenance system 100S of a provider who provides a dependability maintenance system 100U of a user with a function based on dependability description data is connected via a network 1400-03 with the dependability maintenance system 100U of the user.

Figure 37:
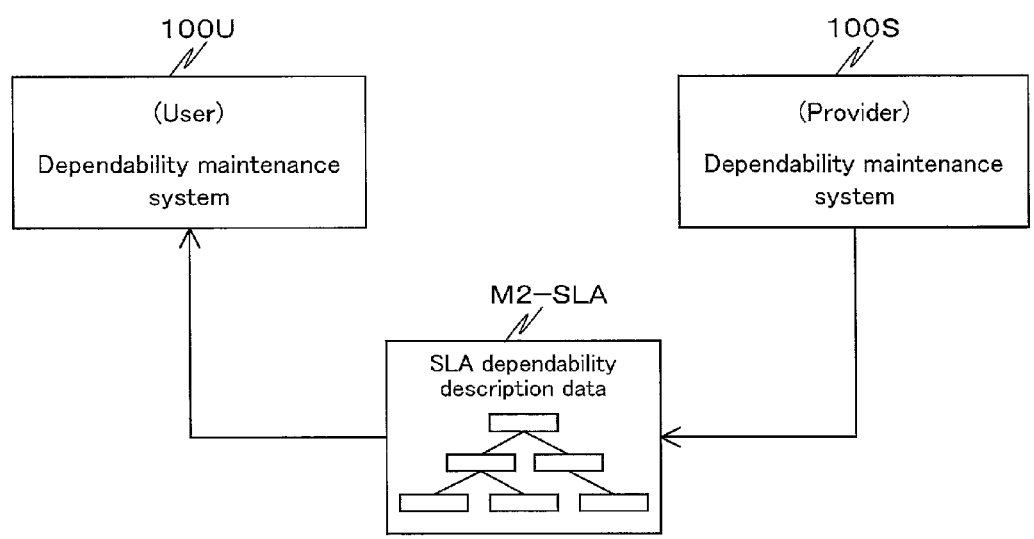
FIG. 37 is an explanatory view showing an example of collaboration between the two independent dependability maintenance systems in the FIG. 36 configuration in which the dependability maintenance systems are connected with each other.

FIG. 37 is an explanatory view showing an example of collaboration between the two independent dependability maintenance systems 100U and 100S in the FIG. 36 configuration in which the dependability maintenance systems 100U and 100S are connected with each other.

From the dependability maintenance system 100 of the provider, SLA dependability description data M2-SLA including SLA (Service Level Agreement) is presented to the dependability maintenance system 100U of the user. The SLA dependability description data M2-SLA is the same as the internal representation of dependability description data M2 except that the SLA dependability description data M2-SLA includes information of SLA.

In SLA included in the SLA dependability description data M2-SLA, only the dependability of an interface published in the dependability maintenance system 100S is described. This is information provided by the provider, and can be considered as commitment regarding dependability of the provider to the interface. The dependability description data allows calculation of a D value, and the user can confirm whether the dependability regarding the public interface of the provider is in accordance with the user's standard or not by calculating the D value.

The dependability maintenance device (dependability maintenance system 100, workspace computer 101) of the present invention may be arranged to include, in an environment where two or more of systems including the dependability description data are connected with each other via a network in order to continue a service provided by the system, the aforementioned means that can be provided in an environment where the two or more of systems are not connected with each other.

[16. Supply Chain]

Figure 38:
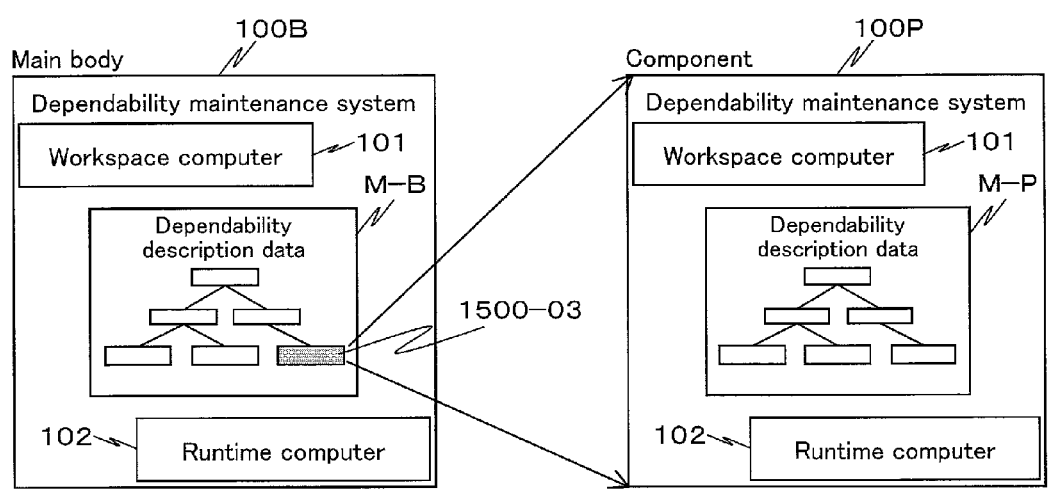
FIG. 38 is a block diagram showing a configuration example in which two of the dependability maintenance systems in FIG. 1 are integrated with each other in such a manner that one of the dependability maintenance systems is at the main body side and the other is at the component side.

FIG. 38 is a block diagram showing a configuration example in which two of the dependability maintenance systems 100 shown in FIG. 1 are integrated with each other in such a manner that one of the dependability maintenance systems 100 is at the main body side and the other is at the component side.

As shown in FIG. 38, with respect to a dependability maintenance system 100B at the main body side which executes the main body of the function, a dependability maintenance system 100P at the component side can provide a part of the function as a component. FIG. 38 shows an example in which one node (1500-03) of dependability description data M-B is provided as a component. Dependability description data M-P in the dependability maintenance system 100P at the component side is dependability description data of the node (1500-03) serving as a component.

Figure 39:
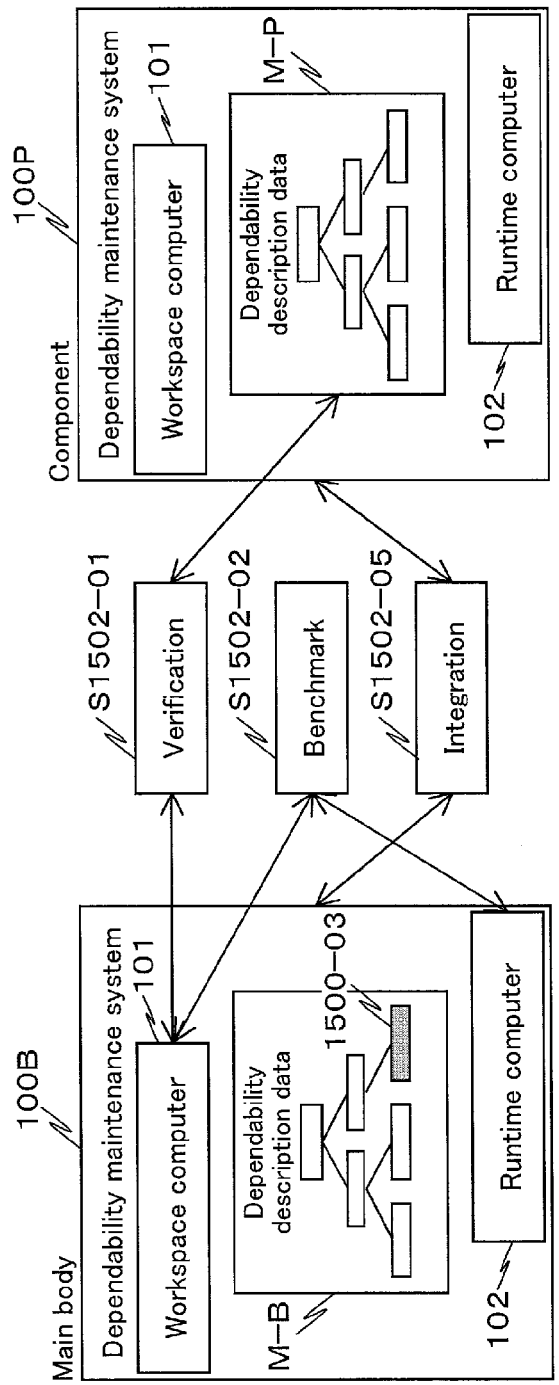
FIG. 39 is an explanatory view showing an example of collaboration between the two independent dependability maintenance systems in the FIG. 38 configuration in which the two dependability maintenance systems are integrated with each other in such a manner that one of the dependability maintenance system is at the main body side and the other is at the component side.

FIG. 39 is an explanatory view showing an example of collaboration between the two independent dependability maintenance systems 100B and 100P in a configuration in which the two dependability maintenance systems 100B and 100P are integrated with each other in such a manner that the dependability maintenance system 100B is at the main body side and the dependability maintenance system 100P is at the component side.

A workspace computer 101 in the dependability maintenance system 100B at the main body side verifies dependability description data M-P of the component 1500-03 (S1502-01). In a case where the dependability description data M-P of the component 1500-03 is valid, a runtime computer 102 in the dependability maintenance system 100B at the main body side measures a benchmark of the component 1500-03 (S1502-02). In a case where evidence obtained as a result of the measurement is sufficient, the workspace computer 101 in the dependability maintenance system 100B at the main body side integrates the component 1500-03 with the dependability description data M-B at the main body side (S1502-05).

Figure 40:
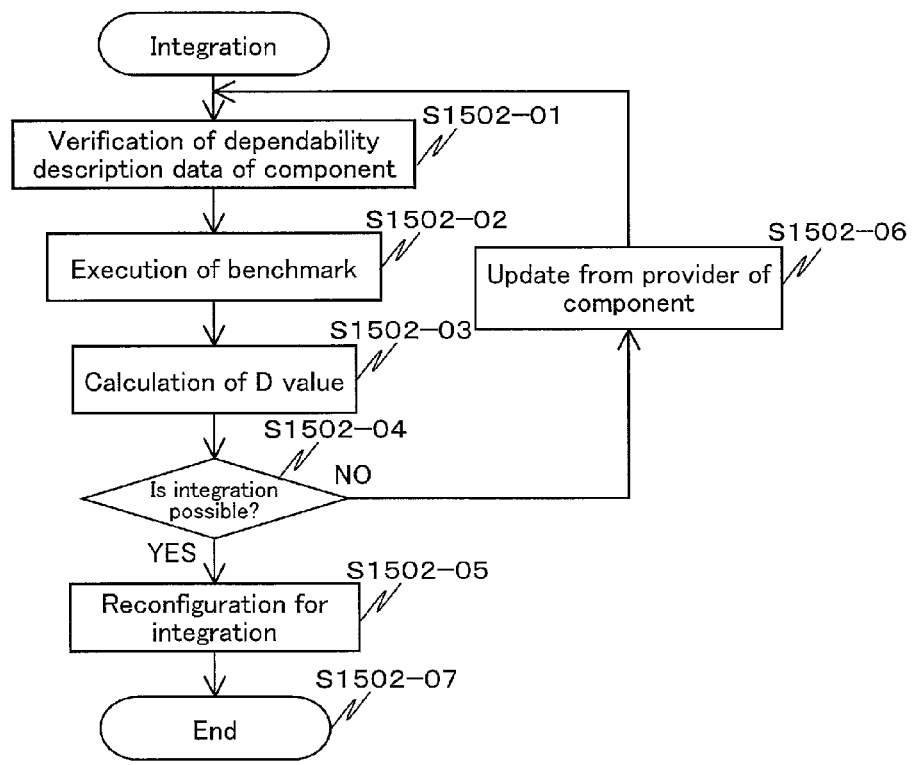
FIG. 40 is a flowchart showing a procedure of a process for integrating components in a main body in the FIG. 38 configuration in which the two dependability maintenance systems are integrated with each other in such a manner that one of the two dependability maintenance systems is at the main body side and the other is at the component side.

FIG. 40 shows in detail a procedure of a process for integrating components. Initially, the dependability description data M-P of the component 1500-03 is verified (S1502-01). Next, a benchmark is executed to measure evidence (S1502-02), and then a D value is calculated (S1502-03). As a result, in a case where the D value is satisfactory, it is possible to integrate components (YES in S1502-04), and reconfiguration for the integration is executed (S1502-05). On the other hand, in a case where the D value is not satisfactory (NO in S1502-04), a provider of the component is required to update the component (i.e. dependability description data M-P) (S1502-06). The same procedure is repeated thereafter.

The dependability maintenance device (dependability maintenance system 100, workspace computer 101) of the present invention may be arranged such that, in a case where the system including the dependability description data is constituted by one or a plurality of hardware or software components of a third party for the purpose of continuing services provided by the system, each of said one or a plurality of hardware or software components includes dependability description data, and there is provided means for verifying compatibility between the dependability description data of each of said one or a plurality of hardware or software components and the dependability description data of the system.

[17. Display of Dependability Description Data]

Figure 41:
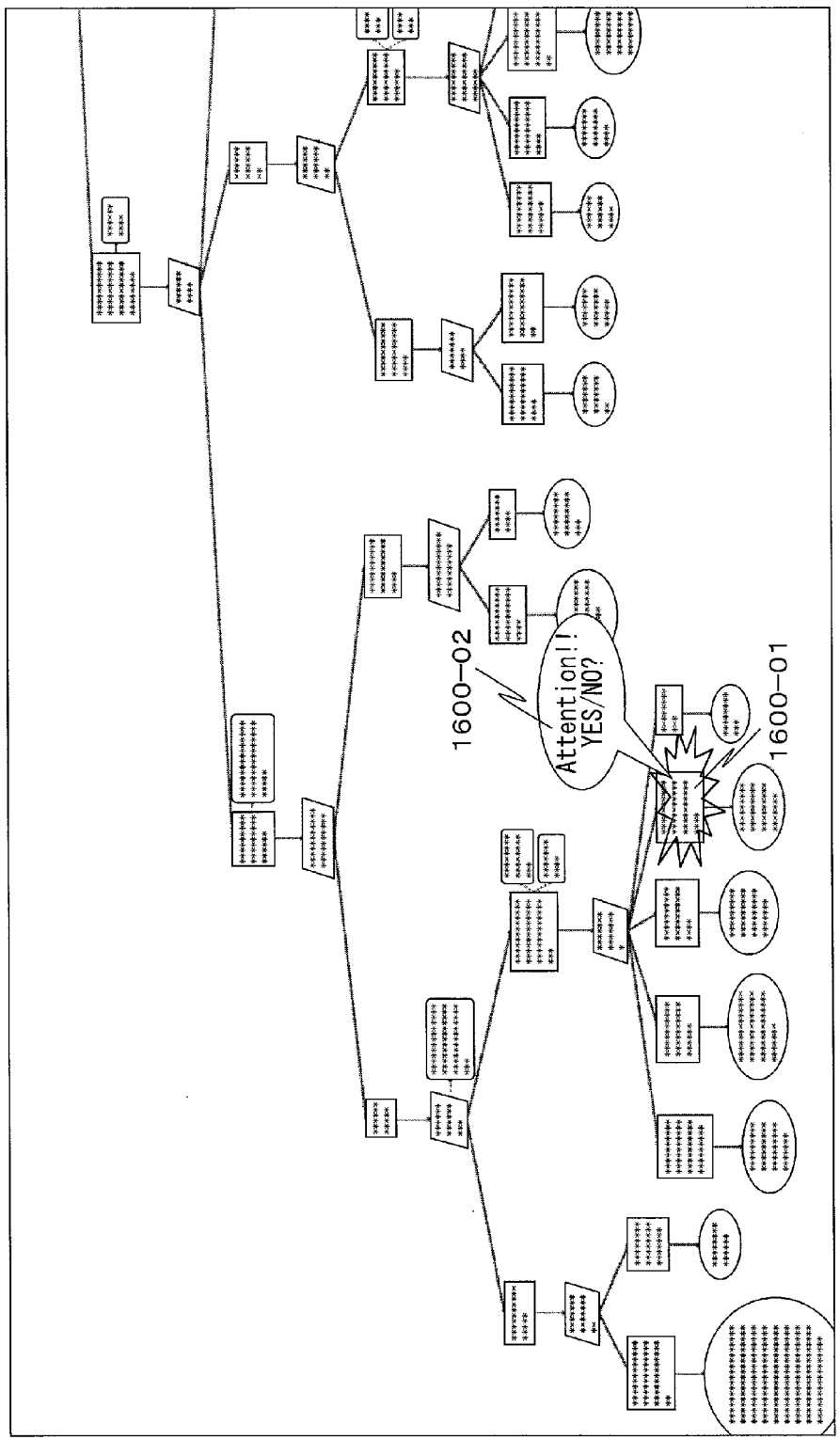
FIG. 41 is an explanatory view showing an example of displaying dependability description data by the workspace computer in the dependability maintenance system in FIG. 1.

FIG. 41 shows an example in which under a condition that a part of goals of the dependability description data stored in the runtime computer 102 is not satisfied, a D-Case Viewer (260-07) (FIG. 16) on the workspace computer 101 displays the condition. In FIG. 41, the goal which is not satisfied is flashed (1600-01), and an operator is required to attention according to necessity (1600-02). Although FIG. 41 shows an example of a D-Case description, what is described does not matter in this explanation and so only the structure of the D-Case description is shown.

Lastly, each block of the dependability maintenance system 100, particularly each block of the workspace computer 101 and the runtime computer 102, may be realized by hardware logic or by software by using CPUs as described below.

In the latter case, the dependability maintenance system 100 or the workspace computer 101 and the runtime computer 102 include: CPUs (central processing unit) for executing a program for realizing functions of each block; ROMs (read only memory) that store the program; RAMs (random access memory) that deploy the program; storage devices (storage mediums) such as memories that store the program and various data; and the like. The objective of the present invention can be realized in such a manner that the dependability maintenance system 100 or the workspace computer 101 and the runtime computer 102 are provided with a computer-readable storage medium for storing program codes (such as executable program, intermediate code program, and source program) of programs of the dependability maintenance system 100 or the workspace computer 101 and the runtime computer 102 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a floppy disc(registered trademark) and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the dependability maintenance system 100 or the workspace computer 101 and the runtime computer 102 may be arranged so as to be connectable to a communication network so that the program code is supplied to the dependability maintenance system 100 or the workspace computer 101 and the runtime computer 102 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth(registered trademark), 802.11, HDR, mobile phone network, satellite connections, and terrestrial digital network. Note that the present invention can be also realized by the program codes in the form of a computer data signal embedded in a carrier wave, which is the program that is electrically transmitted.

(1) A dependability maintenance device of the present invention is a dependability maintenance device for maintaining dependability of a target system, comprising: description data acquiring means for acquiring dependability description data indicative of a requirement and specification (agreed among stakeholders) regarding the dependability of the target system; and dependability value determining means for determining, based on the dependability description data acquired by the description data acquiring means, an evaluation value quantitatively indicative of a value of the dependability of the target system.

(12) A method of the present invention for controlling a dependability maintenance device is a method for controlling a dependability maintenance device for maintaining dependability of a target system, comprising the steps of: (i) acquiring dependability description data indicative of a requirement and specification (agreed among stakeholders) (agreed among stakeholders) regarding the dependability of the target system; and (ii) determining, based on the dependability description data acquired in the step (i), an evaluation value quantitatively indicative of a value of the dependability of the target system.

With the arrangements, it is possible to determine, based on the dependability description data indicative of a requirement and specification (agreed among stakeholders) regarding the dependability of the target system, an evaluation value quantitatively indicative of a value of the dependability of the target system.

This allows quantitatively representing the value of the dependability of the target system. Therefore, for example, in a case where the dependability description data is changed according to a change in requirement or in a case where the state of the target system is confirmed when the target system is operated, it is possible to show the value of the dependability of the target system in an intelligible and objective manner.

This yields an effect that the dependability of the target system can be maintained smoothly. That is, this yields an effect that in an open environment with potential incompleteness and uncertainty, it is possible to assist maintenance of the dependability of the target system.

(2) The dependability maintenance device of the present invention in the arrangement (1) is arranged such that there is executed at least one of a change accommodation cycle for changing the dependability description data in accordance with a change in requirement and specification (agreed among stakeholders) when the target system is developed or updated, and a failure response cycle for avoiding abort of the target system based on the dependability description data when the target system is operated and occurrence of failure or a sign of failure is detected.

With the arrangement, it is possible to determine an evaluation value indicative of a value of the dependability of the target system in at least one of the change accommodation cycle and the failure response cycle. Therefore, for example, in the change accommodation cycle, when the dependability description data is changed according to a change in requirement, it is possible to determine whether a plan of changing the dependability description data is appropriate or not according to the evaluation value. Furthermore, for example, in the failure response cycle, when the target system is operated, it is possible to determine the state of the target system according to the evaluation value. This yields an effect that the dependability of the target system can be maintained smoothly.

(3) The dependability maintenance device of the present invention in the arrangement (1) is arranged such that out of a change accommodation cycle for changing the dependability description data in accordance with a change in requirement and specification (agreed among stakeholders) when the target system is developed or updated, and a failure response cycle for avoiding abort of the target system based on the dependability description data when the target system is operated and occurrence of failure or a sign of failure is detected, at least the failure response cycle is executed, and the dependability maintenance device further comprises reconfiguration means for, when the occurrence of the failure or the sign of the failure is detected, reconfiguring the target system based on the dependability description data.

With the arrangement, in the dependability maintenance device executing the failure response cycle, when occurrence of failure of the target system or a sign of failure of the target system is detected, it is possible to reconfigure the target system based on the dependability description data and continue operation of the target system. Occurrence of failure of the target system or a sign of failure of the target system may be detected according to the evaluation value. For example, occurrence of failure of the target system may be detected when the evaluation value is worsened from a predetermined tolerable range of variation or when an inclination of a temporal change in the evaluation value is worsened from a predetermined standard.

(4) The dependability maintenance device of the present invention in the arrangement (3) is arranged such that the dependability description data describes a procedure of the reconfiguration, and the reconfiguration means reconfigures the target system in accordance with the procedure of the reconfiguration.

With the arrangement, the dependability maintenance device can reconfigure the target system in accordance with the procedure of the reconfiguration described in the dependability description data. Therefore, since the procedure of reconfiguration can be described in dependability description data at the stage of designing the dependability description data, it is unnecessary to form the procedure at the time of the reconfiguration.

(5) The dependability maintenance device of the present invention in the arrangement (3) or (4) is arranged to further comprise change request transmission means for, when the occurrence of the failure or the sign of the failure is detected and abort of the target system is unavoidable, transmitting a request for changing the dependability description data to a device executing the change accommodation cycle.

With the arrangement, in the dependability maintenance device executing the failure response cycle, when it is determined that the occurrence of the failure or the sign of the failure is detected and abort of the target system is unavoidable, it is possible to transmit a request for changing the dependability description data to a device executing the change accommodation cycle. Whether abort of the target system by the occurrence of failure or the sign of failure is unavoidable or not may be determined according to the evaluation value.

On the other hand, when the device executing the change accommodation cycle receives the request for changing the dependability description data from the dependability maintenance device, the device executing the change accommodation cycle changes the dependability description data in accordance with the request.

Therefore, the dependability maintenance device executing the failure response cycle and the device executing the change accommodation cycle collaborate with each other to smoothly execute a series of processes of detecting occurrence of failure of the target system or a sign of failure of the target system in the failure response cycle, and when abort of the target system is unavoidable, changing the dependability description data in the change accommodation cycle. This yields an effect that the dependability of the target system can be maintained continuously in an open environment.

(6) The dependability maintenance device of the present invention in the arrangement (1) is arranged such that out of a change accommodation cycle for changing the dependability description data in accordance with a change in requirement and specification (agreed among stakeholders) when the target system is developed or updated, and a failure response cycle for avoiding abort of the target system based on the dependability description data when the target system is operated and occurrence of failure or a sign of failure is detected, at least the change accommodation cycle is executed, and when the dependability maintenance device receives a request for changing the dependability description data from a device executing the failure response cycle, the dependability description data is changed.

With the arrangement, when the dependability maintenance device executing the change accommodation cycle receives a request for changing the dependability description data from the device executing the failure response cycle, the dependability description data can be changed in accordance with the request.

Therefore, the device executing the failure response cycle and the dependability maintenance device executing the change accommodation cycle collaborate with each other to smoothly execute a series of processes of detecting occurrence of failure of the target system or a sign of failure of the target system in the failure response cycle, and when abort of the target system is unavoidable, changing the dependability description data in the change accommodation cycle. This yields an effect that the dependability of the target system can be maintained continuously in an open environment.

(7) The dependability maintenance device of the present invention in any of the arrangements (1) to (6) is arranged such that the dependability description data is data defining a set of a goal node and a monitor node which are related to each other, the goal node is a node in which a requirement and specification (agreed among stakeholders) is described in goal form, the monitor node is evidence which shows that a goal described in the goal node is met and which corresponds to a monitoring point of the target system, and the dependability value determining means calculates the evaluation value based on a monitor node whose data acquired from a corresponding monitoring point is satisfactory with respect to a tolerable range of variation.

With the arrangement, the evaluation value can be determined as a multidimensional vector value from data defining a set of a goal node and a monitor node which are related to each other, e.g. data of a tree structure or data of a graph structure.

The dependability maintenance device of the present invention in any of the arrangements (1) to (6) is arranged such that the dependability description data is data which is capable of making a set of a goal node and a monitor node and which has a tree structure or a graph structure including at least one set of a goal node and a monitor node, the goal node is a node in which a requirement and specification (agreed among stakeholders) is described in goal form, the monitor node is evidence which shows that a goal described in the goal node is met, the monitor node includes means for allowing acquisition of data from a corresponding monitoring point in the target system and thereafter determining whether the data is satisfactory with respect to a tolerable range of variation, and the dependability value determining means calculates the monitor node whose evidence is satisfactory in the tree structure or the graph structure so as to obtain the evaluation value.

The dependability maintenance device may be arranged such that the dependability description data is data having a tree structure or graph structure capable of weighting an edge between nodes, and the dependability value determining means considers, as the evaluation value, a multidimensional vector value whose element is a weight used for weighting the edge.

With the arrangement, the multidimensional vector value whose element is a weight used for weighting the edge of the tree structure or graph structure can be obtained as the evaluation value.

Therefore, it is possible to obtain an evaluation value obtained by adding importance of an edge to the tree structure or graph structure. This yields an effect that what influence a change in weighting an edge has on dependability can be evaluated by confirming the evaluation value. Although the evaluation value obtained here is a multidimensional vector value, the evaluation value can be converted into a scalar value by any conversion method according to the purpose.

(8) The dependability maintenance device of the present invention in any of the arrangements (1) to (6) is arranged such that the dependability value determining means calculates the evaluation value based on evidence whose monitor value acquired by monitoring the target system is satisfactory with respect to a tolerable range of variation.

With the arrangement, the evaluation value can be calculated based on evidence whose monitor value acquired by monitoring the target system is satisfactory with respect to a tolerable range of variation (standard value). The evaluation value may be calculated, for example, in such a manner that a ratio of the number of evidence whose monitor value is satisfactory with respect to the tolerable range of variation (standard value) (the number of available evidence) to the total number of evidence included in dependability description data (the total number of evidence) is calculated as the evaluation value.

Therefore, the evaluation value according to the state of evidence can be obtained. Since evidence changes according to a change in requirement, the evaluation value obtained here also changes according to the change in requirement. This yields an effect that what influence a change in requirement has on dependability can be evaluated by confirming the evaluation value.

(9) The dependability maintenance device of the present invention in the arrangement (1) is arranged such that out of a change accommodation cycle for changing the dependability description data in accordance with a change in requirement and specification (agreed among stakeholders) when the target system is developed or updated, and a failure response cycle for avoiding abort of the target system based on the dependability description data when the target system is operated and occurrence of failure or a sign of failure is detected, at least the failure response cycle is executed, the dependability maintenance device further comprises script process means for, when the occurrence of the failure or the sign of the failure is detected, executing a script included in the dependability description data, and the script includes a scenario for restoring the target system to be in a state defined by a tolerable range of variation.

With the arrangement, when the occurrence of the failure or the sign of the failure is detected, execution of the script included in the dependability description data enables the target system to be restored to a state defined by the tolerable range of variation.

It is preferable that the script is agreed among stakeholders. The script is executed by a script engine embedded in the target system. The script may determine whether the target system is in a state defined by the tolerable range of variation by referring to a log acquired in the target system. When executing the scenario for restoring the target system to be in a state defined by the tolerable range of variation, the scenario may be operated by an operator via GUI.

(10) A dependability maintenance system of the present invention is a dependability maintenance system for maintaining dependability of a target system, comprising: a workspace device for executing a change accommodation cycle for changing the dependability description data in accordance with a change in requirement and specification (agreed among stakeholders) when the target system is developed or updated; and a runtime device for executing a failure response cycle for avoiding abort of the target system based on the dependability description data when the target system is operated and occurrence of failure or a sign of failure is detected, at least one of the workspace device and the runtime device determining, based on the dependability description data, an evaluation value quantitatively indicative of a value of the dependability of the target system.

(11) The dependability maintenance system of the present invention in the arrangement (10) is connected with other dependability maintenance system via a network.

The dependability maintenance device may be realized by a computer. In this case, the scope of the invention also encompasses a program of the dependability maintenance device for causing a computer to function as the means of the dependability maintenance device, and a computer-readable storage medium storing the program.

[Second Embodiment]

A dependability maintenance device 20 in accordance with the present embodiment makes it easy to maintain consistency between requirement and specification and update of a system. For this purpose, as mentioned later, the dependability maintenance device 20 in accordance with the present embodiment includes a D-Case conversion section 21 for (i) reading out, from a D-Case storage section 10, a D-Case in which the specification regarding dependability of a monitoring control target system 2 is described, (ii) generating, from the D-Case thus read out, monitoring control data which controls the operation of a failure monitoring control section 30 that monitors the state of the monitoring control target system 2 and takes a countermeasure if necessary, and (iii) supplying the monitoring control data to a failure monitoring control section 30.

With reference to FIGS. 42 to 56 and FIG. 8, the following description will discuss an embodiment of the present invention in detail.

Figure 42:
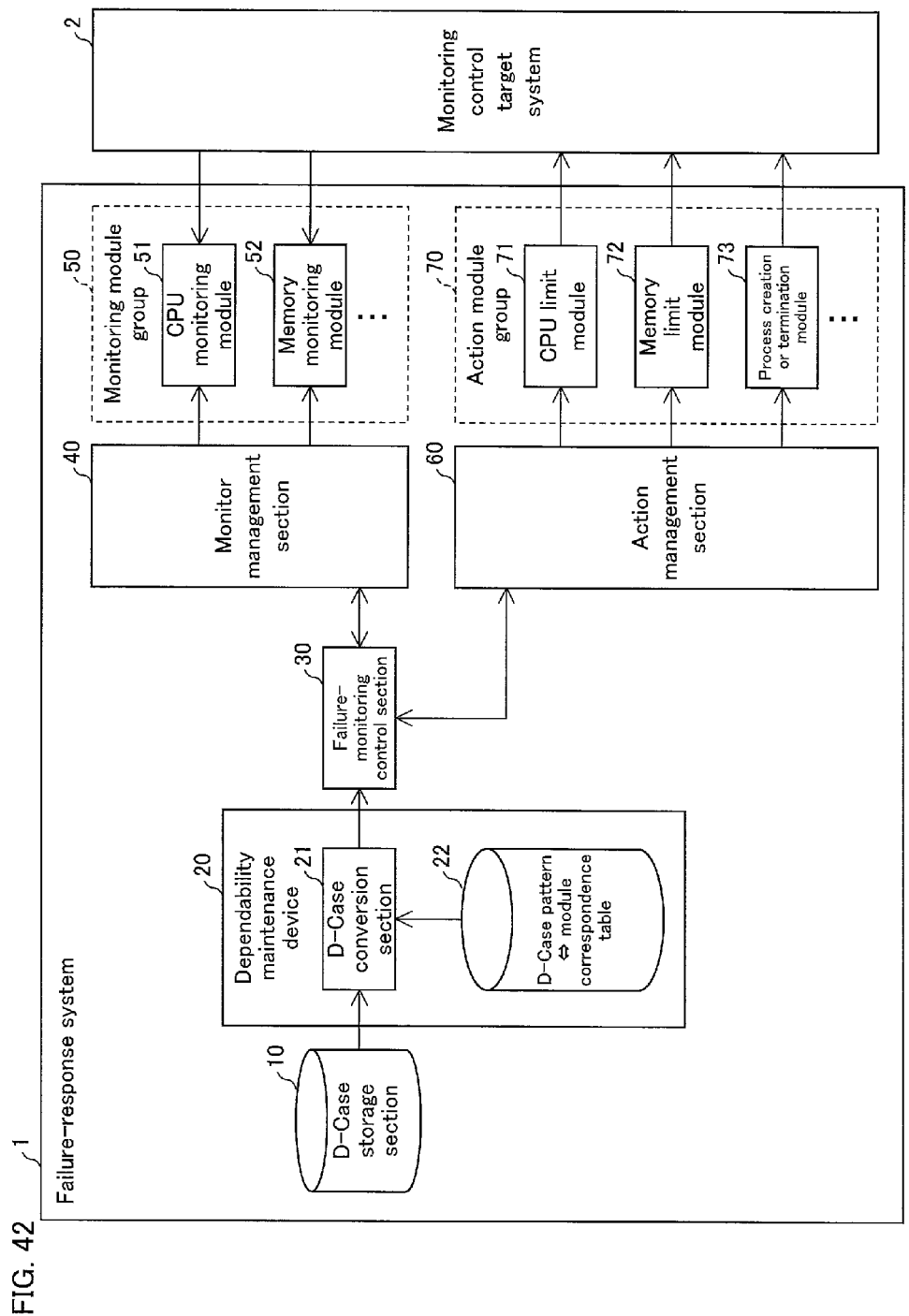
FIG. 42 is a functional block diagram schematically showing a configuration of a failure response system in accordance with another embodiment of the present invention.

FIG. 42 is a functional block diagram schematically showing a configuration of a failure response system 1 in accordance with the present embodiment.

The failure response system 1 in accordance with the present embodiment monitors the operation of the monitoring control target system 2, and when failure occurs, the failure response system 1 takes a necessary countermeasure. The monitoring control target system 2 is applicable to any computer system. In particular, the monitoring control target system 2 is preferably applicable to not a single system but a system for which a plurality of stakeholders exist and which requires advanced and complex dependability. Specifically, the monitoring control target system 2 is preferably applicable to a computer system serving as a base of a social infrastructure system, such as a monitoring system, an electronic payment system, a traffic/flight control system, and a cloud system including these systems.

In particular, the failure response system 1 in accordance with the present embodiment makes it easy to describe agreement among stakeholders involved in the monitoring control target system 2, and in a case of partial update of the monitoring control target system 2, the failure response system 1 updates an agreement description and an implement module for monitoring control while maintaining consistency between the agreement description and the implement module. That is, the failure response system 1 allows developing and updating the specification on the dependability of the monitoring control target system 2 represented by the dependability description data and control of the monitoring module and action module for monitoring and controlling the monitoring control target system 2 while maintaining consistency between the specification and the control.

For this purpose, the failure response system 1 describes dependability of the monitoring control target system 2 by using, as dependability description data, a D-Case which allows easy description of agreement among stakeholders. Furthermore, the failure response system 1 manages correspondence between a pattern of a D-Case (D-Case pattern) and a monitoring module and an action module each for monitoring and controlling the monitoring control target system 2. Consequently, even when the monitoring module and the action module are added or changed according to a change etc. in the monitoring control target system 2, it is possible to maintain correspondence between the dependability description and the monitoring module and the action module.

(D-Case)

Figure 43:
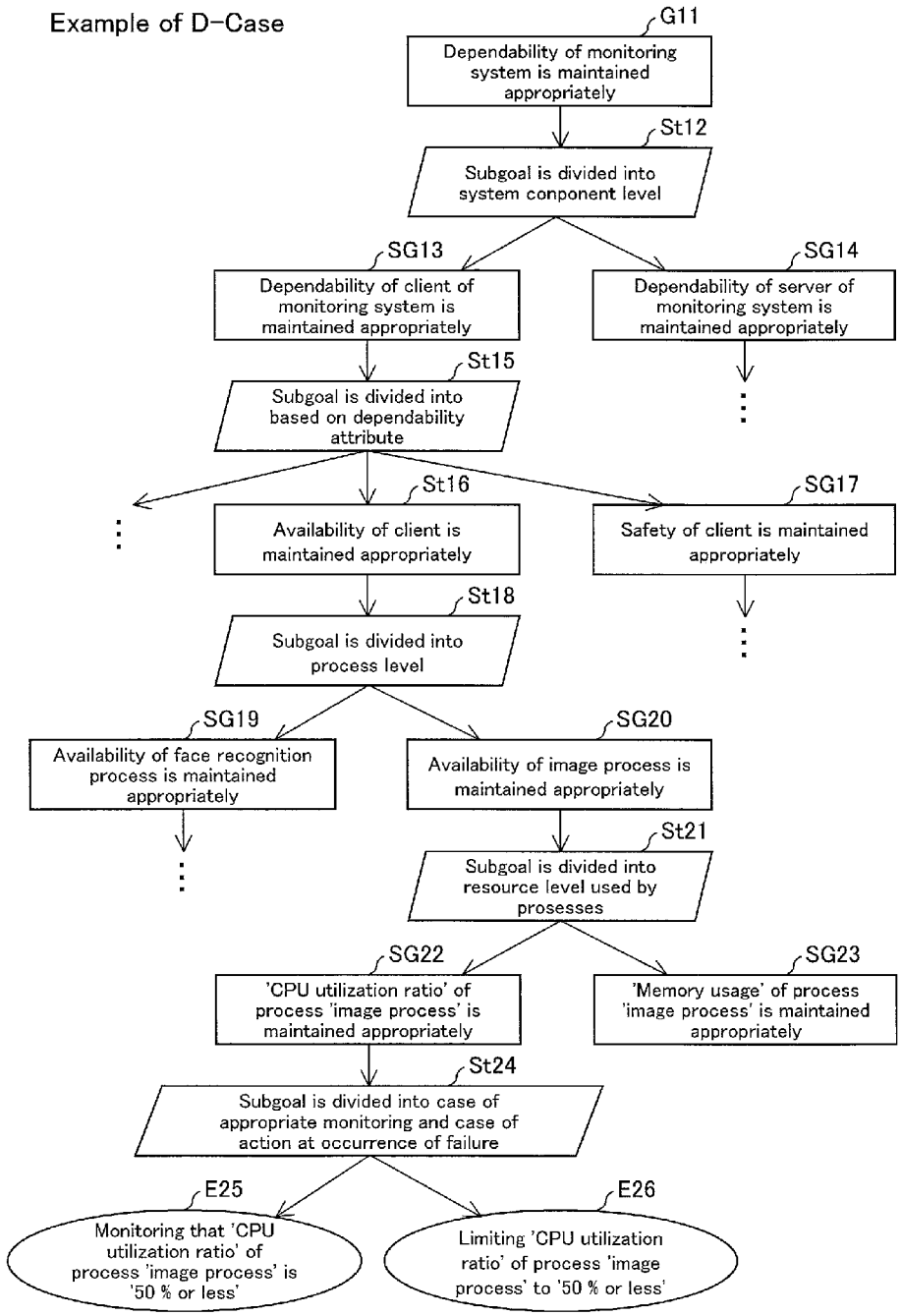
FIG. 43 is an explanatory view showing a specific example of a D-Case used as dependability description data in the failure response system in FIG. 42.

FIG. 8 is an explanatory view showing a basic structure of a D-Case. FIG. 43 is an explanatory view showing a specific example of a D-Case. The D-Case shown in FIG. 43 is one in a case where the monitoring control target system 2 is a monitoring system using face recognition.

As described above, in the present embodiment, a D-Case is used as dependability description data which describes the specification regarding dependability of the monitoring control target system 2.

D-Case is based on Safety Case which is a structured document mainly used in the United Kingdom, for ensuring safety of a system. Herein, dependability description data based on Safety Case is referred to as "D-Case". With the D-Case, general dependability attributes such as availability are detailed in discussions on system level as shown in FIG. 43.

D-Case is a structured document used for agreement among stakeholders involved in the monitoring control target system 2. To be specific, as shown in FIG. 8, D-Case has a tree structure in which the dependability of a system is regarded as a top goal, satisfaction of the top goal is detailed by a tree structure, and evidence is put for the detailed goal. As mentioned later, D-Case can be described in XML (Extensible Markup Language).

In FIG. 43, a block marked with "G" is a top goal. The top goal indicates a proposition to be agreed among stakeholders regarding a target system. An example of the top goal is "the target system meets Safety Integrity Level 3 defined by safety standard X".

A block marked with "SG" is a sub-goal. The sub-goal indicates a proposition obtained by dividing what is to be shown in order to show the top goal. For example, in a case where the top goal is "the target system is A and B", the top goal is divided into sub-goals "the target system is A" and "the target system is B". A sub-goal can be divided into smaller sub-goals. A top goal and sub-goals are generally referred to as goals.

A block marked with "St" is a strategy. The strategy indicates a supplementary explanation on how satisfaction of a goal is discussed by sub-goals thereof. For example, in a case where the goal is "the system responds to all possible failures", a strategy is "discussion for each possible failure". In this case, sub-goals are "the system responds to possible failure 1", . . . , "the system responds to possible failure N".

A block marked with "E" is evidence. The evidence indicates a leaf node which finally assures the divided and detailed goal. For example, regarding a sub-goal SG "a sub-component Y of a system X can deal with failure Z", evidence of "result of FTA analysis" is put right under the sub-goal SG. The sub-goal SG can be further divided into sub-goals, but the goal cannot be divided limitlessly. Evidence is put in order to assure a sub-goal obtained as a result of the division. Whether evidence is valid or not depends on agreement among stakeholders.

Figure 47:
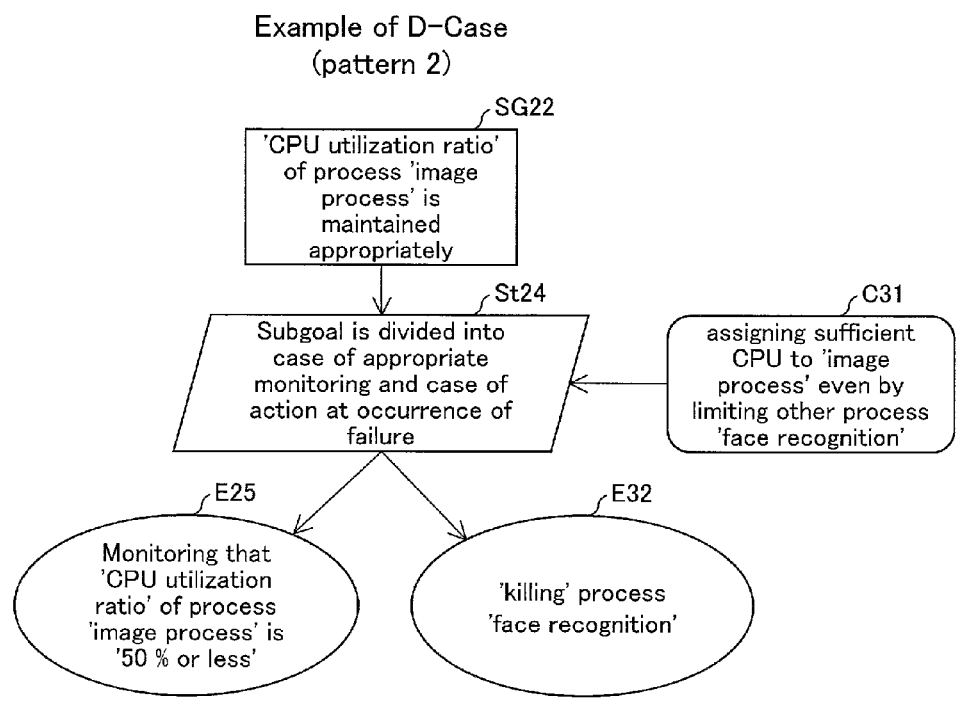
FIG. 47 is an explanatory view showing a specific example of a D-Case including a D-Case pattern, which is used in the failure response system in FIG. 42.

As shown in FIG. 47, a block marked with "C" is a context. The context indicates information which complements the content of the goal or the strategy. For example, in a case where the strategy is "discussion for each possible failure", a context "list of possible failures" can be assigned to the strategy. The strategy and the context serve as supplementary information for assisting a stakeholder to follow division of the goal while reading D-Case.

The strategy and the context are described for easiness in reading in a tree structure, but they are treated as comments in runtime.

Figure 50:
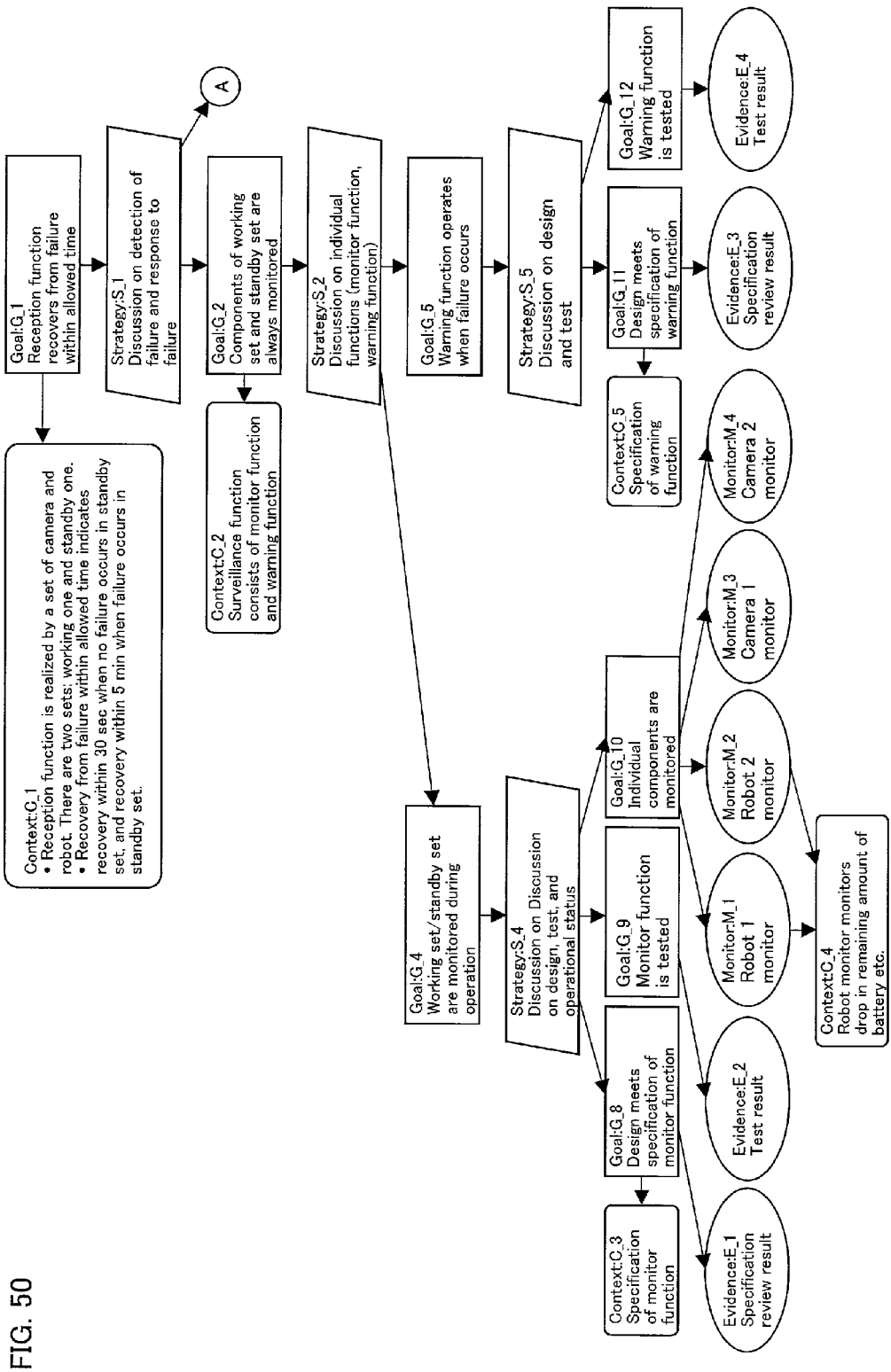
FIG. 50 is (a left part of) an explanatory view showing another specific example of a D-Case used as dependability description data in the failure response system in FIG. 42.

A block marked with "Monitor: M_1" etc. in FIG. 50 is a monitor. The monitor indicates system information in runtime required when a system responds to a failure. For example, "monitoring of CPU utilization ratio in process X" in runtime is a monitor node. The monitor is a subclass of evidence. In a case where information obtained by the monitor management section 40 of the failure response system 1 is used as evidence, the evidence is represented as a monitor node.

Figure 44:
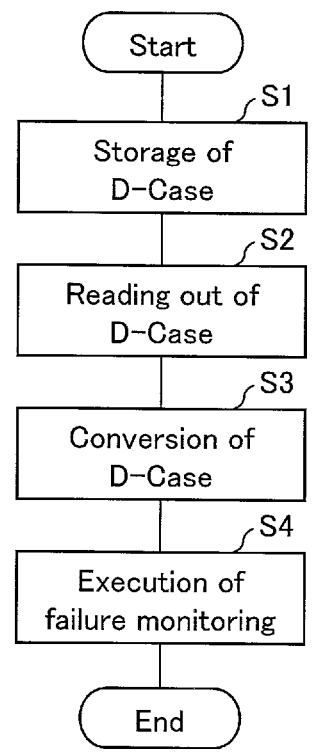
FIG. 44 is a flowchart showing a process in the failure response system in FIG. 42.

Next, with reference to FIGS. 42 and 44, the following description will discuss in detail a configuration of the failure response system 1 and a process flow.

As shown in FIG. 42, the failure response system 1 includes the D-Case storage section (dependability description storage section) 10, a dependability maintenance device 20, a failure monitoring control section 30, a monitor management section 40, a monitoring module group 50, an action management section 60, and an action module group 70.

The D-Case storage section 10 stores D-Case which is dependability description data indicative of agreement among stakeholders on dependability of the monitoring control target system 2. The failure response system 1 receives, as an input, D-Case agreed among stakeholders.

The dependability maintenance device 20 generates monitoring control data (failure response script) from D-Case by using a D-Case pattern <=> module correspondence table (mentioned later) indicative of correspondence between control of an runtime module (monitoring module, action module) for monitoring and controlling the monitoring control target system 2 and a D-Case pattern. For this purpose, the dependability maintenance device 20 includes a D-Case conversion section (dependability description conversion section) 21 and a correspondence table storage section 22.

The D-Case conversion section 21 generates, from D-Case stored in the D-Case storage section 10, monitoring control data (failure-monitoring control data) for controlling the operation of the failure-monitoring control section 30.

D-Case is partially patterned. The correspondence table storage section 22 stores a table indicative of correspondence between a D-Case pattern and monitoring control data (D-Case pattern <=> module correspondence table).

The D-Case conversion section 21 generates monitoring control data from D-Case by referring to the D-Case pattern <=> module correspondence table stored in the correspondence table storage section 22.

Next, the failure-monitoring control section 30 monitors the state of the monitoring control target system 2, and executes a response (action) procedure if necessary. Specifically, the failure-monitoring control section 30 controls the monitor management section 40 and the action management section 60 in accordance with the monitoring control data generated by the D-Case conversion section 21 in the dependability maintenance device 20. The monitoring control data specifies (i) selection of a monitoring module (monitoring module group 50) and control of an operation of the monitoring module by the monitor management section 40 and (ii) selection and control of an action module (action module group 70) by the action management section 60.

The monitor management section 40 manages at least one monitoring module (monitoring module group 50) in accordance with the monitoring control data. In the present embodiment, examples of the monitoring module include a CPU monitoring module 51 and a memory monitoring module 52, but the present invention is not limited to them.

The action management section 60 manages at least one action module (action module group 70) in accordance with the monitoring control data. In the present embodiment, examples of the action module include a CPU limit module 71, a memory limit module 72, and a process-creation-or-termination module 73, but the present invention is not limited to them.

FIG. 44 is a flowchart showing a process in the failure response system 1.

Initially, a D-Case manager causes a D-Case generated and changed under agreement among stakeholders to be stored in the D-Case storage section 10 (51; D-Case storage step).

Next, the D-Case conversion section 21 reads out the D-Case from the D-Case storage section 10 (S2; D-Case reading out step), and generates, from the D-Case thus read out, monitoring control data for controlling the operation of the failure-monitoring control section 30, by referring to the D-Case pattern <=> module correspondence table stored in the correspondence table storage section 22 (S3; D-Case conversion step).

For example, in a case of generating monitoring control data in accordance with a change in D-Case, the D-Case conversion section 21 may generate monitoring control data corresponding to only a difference in the changed D-Case.

Next, the failure-monitoring control section 30 monitors the state of the monitoring control target system 2 in accordance with the generated monitoring control data, and executes a response procedure if necessary (S4; execution of failure monitoring step).

The execution of failure monitoring step (S4) is described below.

The monitor management section 40 stores beforehand monitoring modules to be managed, in such a manner that the monitoring modules are controllable. Similarly, the action management section 60 stores beforehand action modules to be managed, in such a manner that the action modules are controllable.

In the execution of failure monitoring step (S4), the failure-monitoring control section 30 instructs the monitor management section 40 to start a suitable monitoring module in accordance with the monitoring control data. Then, in a case where the result of runtime of the monitoring module informed by the monitor management section 40 meets a condition, the failure-monitoring control section 30 instructs the action management section 60 to start a suitable action module so as to respond to the failure. In this case, the monitor management section 40 and the action management section 60 start modules in accordance with the instructions from the failure-monitoring control section 30, and pass suitable arguments.

(D-Case Conversion)

With reference to FIGS. 45 to 49, the following description will discuss in detail a process of converting D-Case into monitoring control data.

In the failure response system 1, the D-Case pattern <=> module correspondence table is used for converting D-Case into monitoring control data for controlling operations of a monitoring module and an action module each for monitoring and controlling the monitoring control target system 2.

A D-Case pattern is a part of a D-Case of the monitoring control target system 2, and indicates how availability etc. is maintained on system level. The availability of a system is an attribute of the system which, when the system is put in an unserviceable state (system-down state) due to failure etc., restores the system as soon as possible so that a user can use the service at any time when the user desires. When failure occurs, manpower such as a maintainer promptly responds to the failure and the system automatically restores itself using failure restore function. In general, a system provides services by using a CPU resource, a memory resource, a network resource etc. on OS level. Accordingly, when a CPU resource etc. is in shortage, there is a possibility that delay of a service etc. occurs and availability decreases. In order to deal with this, when a CPU resource used for a certain service is in shortage, the system automatically makes, on OS level, an action of using a CPU resource used in other less-important service etc. D-Case of the monitoring control target system 2 discusses the availability on system level from the aforementioned viewpoints.

(D-Case Pattern)

Figure 45:
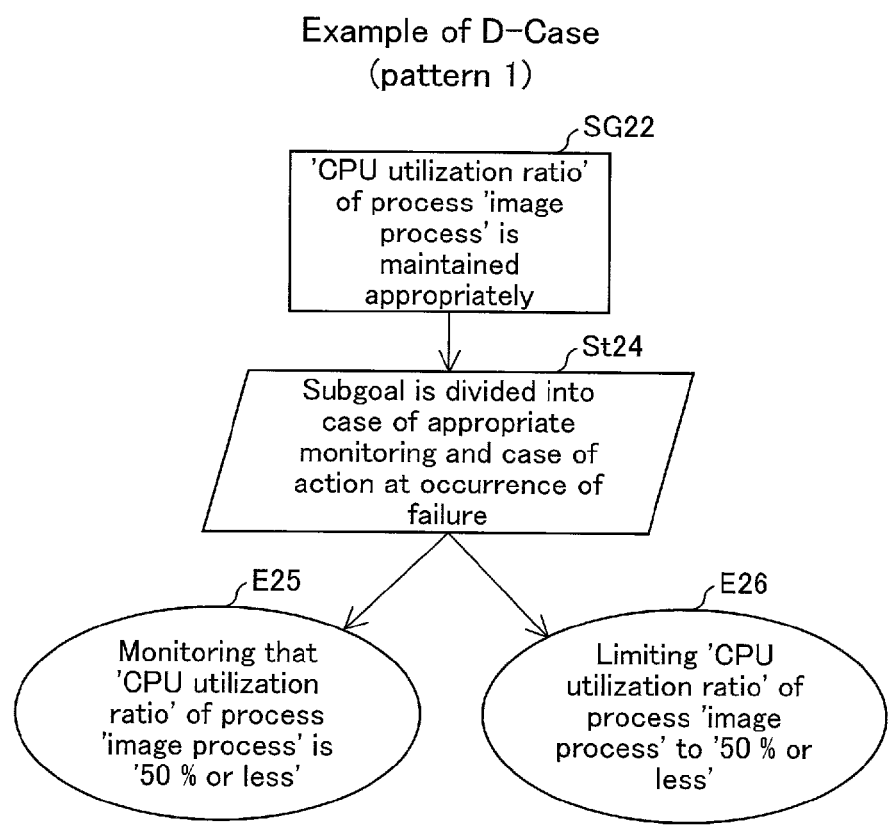
FIG. 45 is an explanatory view showing a specific example of a D-Case including a D-Case pattern, which is used in the failure response system in FIG. 42.

FIG. 45 is an explanatory view showing a specific example of a D-Case including a D-Case pattern.

A D-Case pattern is a subtree of a D-Case and includes a variable part. FIG. 45 shows an example of a pattern, which is used for expressing that the attribute of a process is maintained appropriately. Quotation-marked parts in a sub-goal SG22 and evidences E25 and E26 are variables, and other parts are fixed parts of D-Case pattern. FIG. 45 shows a state where "image process", "CPU utilization ratio", and "50% or less" are already put in quotation-marked parts. In a case where this D-Case pattern is used as a part of D-Case, values based on agreement among stakeholders are put in quotation-marked parts, and the values thus put allow the D-Case to be appropriately related to the monitoring module and the action module. Other parts are fixed parts of D-Case. In the D-Case pattern, i.e. in the quotation-marked parts of the D-Case, values based on agreement among stakeholders are put. Putting values in the quotation-marked parts of the D-Case allows appropriately relating the D-Case to the monitoring module and the action module.

FIG. 46 shows examples of the D-Case pattern <=> module correspondence table. (a) of FIG. 46 shows a correspondence table regarding a monitoring module, and (b) of FIG. 46 shows a correspondence table regarding an action module.

(a) of FIG. 46 is a table to be referred to when the D-Case conversion section 21 converts a D-Case of "monitoring that '$2' of a process '$1' is '$3'". In this D-Case, $1, $2, and $3 are variables.

For example, in a case of processing the D-Case in FIG. 45, the D-Case conversion section 21 reads out, from the correspondence table storage section 22, a table ((a) of FIG. 46) applicable to the description of the evidence E25 of "monitoring that 'CPU utilization ratio' of a process 'image process' is '50% or less'". Then, using the variables $1, $2, and $3 extracted from the description of the evidence E25, the D-Case conversion section 21 specifies a correspondence between the D-Case pattern and a module, thereby generating monitoring control data. Specifically, since the variable $2 is "CPU utilization ratio", a module name "CPU monitoring" and arguments "$1, $3" are specified, and there is generated monitoring control data of "bringing up 'CPU monitoring' module and passing arguments 'image process' and '50% or less'".

Similarly, the D-Case conversion section 21 reads out, from the correspondence table storage section 22, a table ((b) of FIG. 46) applicable to the description of the evidence E26 of "limiting 'CPU utilization ratio' of a process 'image process' to '50% or less'". Then, since the variable $2 is "CPU utilization ratio", a module name "CPU limit" and arguments "$1, $3" are specified, and there is generated monitoring control data of "bringing up 'CPU limit' module and passing arguments 'image process' and '50% or less'".

As described above, a D-Case pattern <=> module correspondence table is selected according to a fixed text sequence (fixed part of description) of a D-Case out of the description of the evidence. Then, a corresponding module is selected according to a part of variables (variable $2 in the above example).

As described above, in the present embodiment, evidence is described in a format partially including variables, and values in accordance with the evidence are assigned to the variables.

With reference to FIGS. 47 and 48, the following description will discuss a process in a case where the D-Case in FIG. 45 is changed.

FIG. 47 is an explanatory view showing a specific example of a D-Case including a D-Case pattern.

FIG. 47 is obtained by changing FIG. 45 to additionally include a context C31 and to replace evidence E26 with evidence E32. This indicates that stakeholders have agreed on "E32: 'killing' a process 'face recognition'" for the purpose of "C31: assigning sufficient CPU to 'image process' even by limiting other process 'face recognition'".

FIG. 48 shows examples of the D-Case pattern <=> module correspondence table. (a) of FIG. 48 shows a correspondence table regarding a monitoring module, and (b) of FIG. 48 shows a correspondence table regarding an action module. (a) of FIG. 48 is equal to (a) of FIG. 46.

In a case of processing the D-Case in FIG. 47, the D-Case conversion section 21 reads out, from the correspondence table storage section 22, a table ((b) of FIG. 48) applicable to the description of the evidence E32 of "'killing' a process 'face recognition'". Then, using the variables $1 and $2 extracted from the description of the evidence E32, the D-Case conversion section 21 specifies a correspondence between the D-Case pattern and a module, thereby generating monitoring control data. Specifically, since the variable $2 is "kill", a module name "process creation or termination" and argument "$1" are specified, and there is generated monitoring control data of "bringing up 'process creation or termination' module and passing arguments 'kill' and 'face recognition'".

As described above, in the D-Case pattern <=> module correspondence table, not only variables but also constants can be set as arguments. That is, in (b) of FIG. 48, when the variable $2 is "kill", the first argument passed to the process-creation-or-termination module 73 is "kill", and when the variable $2 is "restart", the argument passed to the process-creation-or-termination module 73 is "restart". When the variable $2 is "migration", not the process-creation-or-termination module 73 but a migration module (not shown) is executed as an action.

With reference to FIG. 49, the following description will discuss a process in a case where a new monitoring module or action module is added.

In a case where a new monitoring module or action module is added, a D-Case manager adds data defining a correspondence to the D-Case pattern <=> module correspondence table before the new monitoring module or action module is stored in the monitor management section 40 or the action management section 60.

FIG. 49 shows an example of the D-Case pattern <=> module correspondence table, which is a correspondence table regarding a monitoring module. For example, in a case where a new module for monitoring a network traffic volume is added, one line is added to (a) of FIG. 46 as shown in FIG. 49.

(Summary)

As described above, in the failure response system 1, monitoring control data is generated from a D-Case by using the D-Case pattern <=> module correspondence table indicative of correspondences between (i) selection of a monitoring module and control of an operation of the monitoring module by the monitor management section 40 and selection and control of an action module by the action management section 60 and (ii) D-Case patterns. That is, a D-Case stored in the D-Case storage section 10 is converted into monitoring control data of the failure-monitoring control section 30 by referring to the D-Case pattern <=> module correspondence table. As described above, the monitoring control data to be used by the failure-monitoring control section 30 is generated by the D-Case conversion section 21 from the D-Case stored in the D-Case storage section 10, so that consistency between the D-Case and the operation of the failure-monitoring control section 30 is always maintained.

In a case where a D-Case stored in the D-Case storage section 10 is changed, the D-Case conversion section 21 informs the failure-monitoring control section 30 of the change as a change in the monitoring control data. The dependability maintenance device 20 or the D-Case conversion section 21 may detect the change in D-Case and automatically inform the failure-monitoring control section 30 of changed monitoring control data.

In a case of adding a new D-Case pattern to a D-Case, the D-Case manager adds data defining a correspondence (conversion rule) to the D-Case pattern <=> module correspondence table.

In a case where a monitoring module or action module is modified/added, the failure response system 1 informs the D-Case manager. The D-Case manager modifies the D-Case pattern <=> module correspondence table corresponding to the modified/added monitoring module or action module. In a case where the D-Case pattern <=> module correspondence table corresponding to the modified/added monitoring module or action module is not modified, the monitoring module or action module does not correspond to the D-Case, so that monitoring control data cannot be used. By modifying monitoring control data by using the modified D-Case pattern <=> module correspondence table, it is possible to maintain consistency between the D-Case and failure-monitoring.

The present invention may be arranged such that D-Case pattern <=> module correspondence tables are stored in a database and when a D-Case is changed, a suitable D-Case pattern <=> module correspondence table is extracted from the database and referred to. This makes it unnecessary to generate a D-Case pattern <=> module correspondence table every time when a D-Case is changed, making it possible to respond to the change in D-Case at lower costs.

With reference to FIGS. 50-56, the following description will discuss another specific example.

Figure 51:
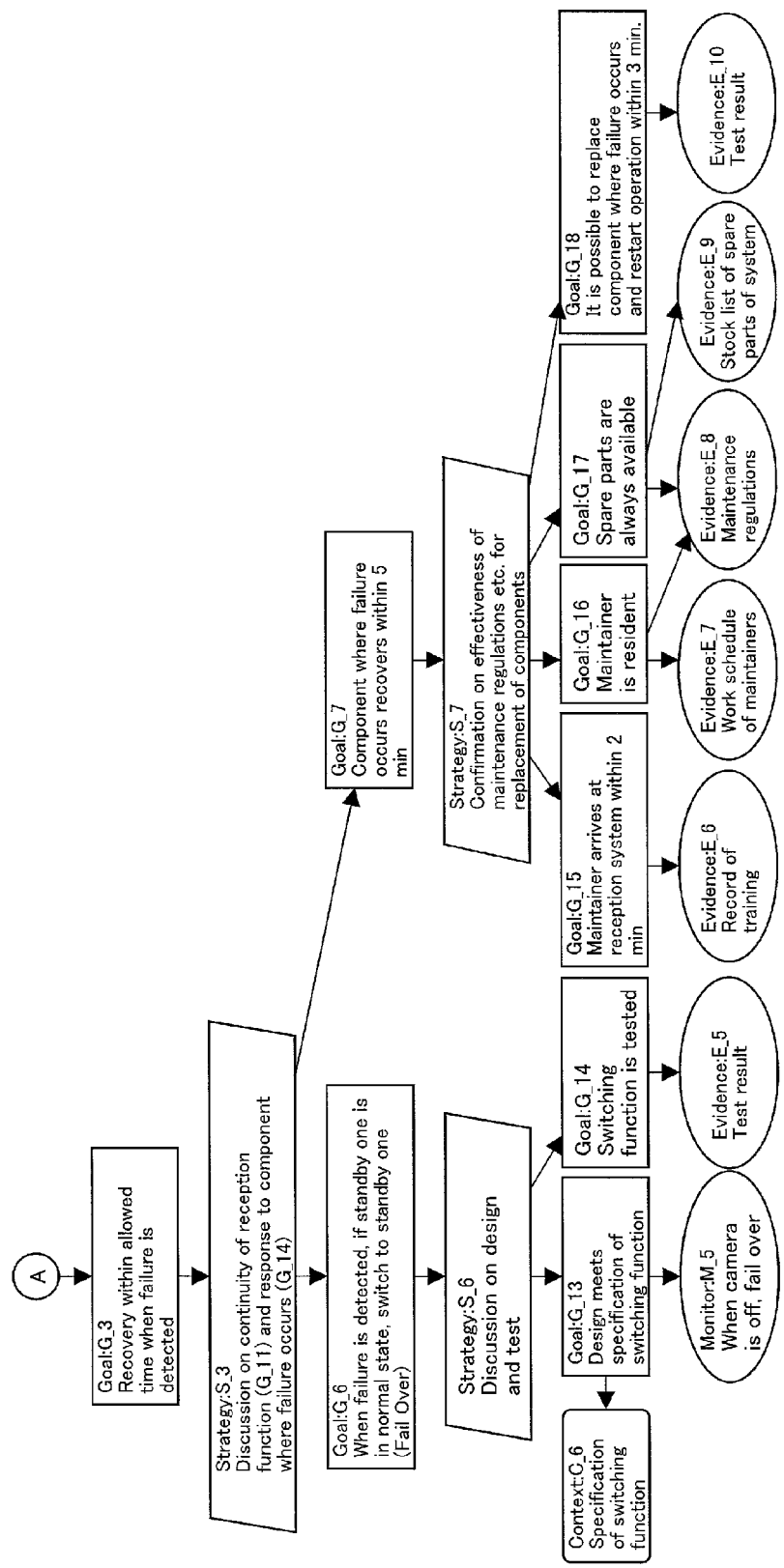
FIG. 51 is (a right part of) the explanatory view showing another specific example of a D-Case used as dependability description data in the failure response system in FIG. 42.

FIGS. 50 and 51 are explanatory views showing another specific example of a D-Case. FIGS. 50 and 51 are connected with each other via a connection A to form one tree structure. FIGS. 52-55 are explanatory views showing examples in which the D-Case shown in FIGS. 50 and 51 is described in XML format. FIGS. 52-55 show partial extracts of the D-Case shown in FIGS. 50 and 51. FIG. 56 is an explanatory view showing an example of monitoring control data (failure response script) converted from the D-Case shown in FIGS. 50, 51, 52-55.

As shown in FIGS. 52-55, in the present specific example, a failure response script for controlling the failure-monitoring control section 30 is embedded in XML files of the D-Case. FIG. 56 shows scripts respectively extracted from "Monitor: M_1" to "Monitor: M_5" of the XML files (FIGS. 52-55) of the D-Case. FIGS. 50 and 51 are graphical representations of FIGS. 52-55, and data of FIGS. 50 and 51 includes the failure response script.

As described above, the specific example shown in FIGS. 50-56 is different from the specific example of the D-Case pattern <=> module correspondence table explained with reference to FIGS. 45-49 in that the failure response script is embedded in the D-Case. However, both examples share the common feature that they can update the D-Case showing agreement among stakeholders and the failure response script of the monitoring control target system with consistency therebetween.

The present invention may be arranged as follows.

The dependability maintenance device 20 of the present invention may be a dependability maintenance device 20, which generates failure-monitoring control data (monitoring control data) for controlling an operation of the failure-monitoring control section 30 for monitoring a state of the monitoring control target system 2 and executing a response procedure if necessary, and which supplies the failure-monitoring control data to the failure-monitoring control section 30, comprising: a dependability description conversion section (D-Case conversion section 21) for reading out, from a dependability description storage section (D-Case storage section 10), dependability description data (D-Case) indicative of a specification regarding dependability of the monitoring control target system 2, and generating the failure-monitoring control data from the dependability description data having been read out.

A method of the present invention for controlling the dependability maintenance device 20 may be a method for controlling the dependability maintenance device 20 which generates failure-monitoring control data for controlling an operation of the failure-monitoring control section 30 for monitoring a state of the monitoring control target system 2 and executing a response procedure if necessary, and which supplies the failure-monitoring control data to the failure-monitoring control section 30, the method comprising the steps of: reading out, from a dependability description storage section (D-Case storage section 10), dependability description data (D-Case) indicative of a specification regarding dependability of the monitoring control target system 2 (S2), and generating the failure-monitoring control data from the dependability description data having been read out (S3).

The dependability maintenance device 20 of the present invention may be arranged such that the failure-monitoring control section 30 is capable of selecting, out of a plurality of modules (monitoring module group 50, action module group 70), a module used for monitoring the state of the monitoring control target system 2 and executing a response procedure if necessary, and of controlling the selected module, the dependability description data is written in a format in which one description (evidence) includes at least a variable to which module-specifying information (variable $2; pattern) for specifying the module is settable as a value, and the dependability description conversion section converts a description to be converted, which is included in the dependability description data, into failure-monitoring control data corresponding to module-specifying information included in the description, in accordance with information indicative of a preset correspondence between the module-specifying information and the failure-monitoring control data (D-Case pattern <=> module correspondence table).

The dependability maintenance device 20 of the present invention may be arranged such that the correspondence is set according to a fixed part other than a variable part in one description in the dependability description data, and the dependability description conversion section converts a description in the dependability description data into corresponding failure-monitoring control data by referring to the correspondence set according to the fixed part in the description in the dependability description data.

The failure response system 1 of the present invention may be arranged so as to comprise: the dependability maintenance device 20; the dependability description storage section (D-Case storage section 10); and the failure-monitoring control section 30, the failure-monitoring control section 30 operating in accordance with failure-monitoring control data generated by the dependability maintenance device 20 from dependability description data read out from the dependability description storage section, so as to monitor a state of the monitoring control target system 2 and execute a response procedure if necessary.

The failure response system 1 of the present invention may be arranged so as to further comprise: at least one monitoring module (monitoring module group 50) for monitoring the state of the monitoring control target system 2; at least one action module (action module group 70) for executing a response procedure on the monitoring control target system 2 if necessary; the monitor management section 40 for selecting the monitoring module and controlling an operation of the monitoring module under control of the failure-monitoring control section 30; and the action management section 60 for selecting the action module and controlling an operation of the action module under control of the failure-monitoring control section 30.

The present invention may be arranged as follows.

A computer system (failure response system 1) of the present invention may be arranged so as to comprise a dependability description storage section (D-Case storage section 10) for storing dependability description data (D-Case) indicative of agreement among stakeholders on dependability, a failure-monitoring control section (failure-monitoring control section 30) for monitoring a state inside a target system (monitoring control target system 2) and executing a response procedure if necessary, and a dependability description conversion section (D-Case conversion section 21) for generating, from the dependability description data, failure-monitoring control data (monitoring control data) for controlling an operation of the failure-monitoring control section, the failure-monitoring control data always being generated by the dependability description conversion section from the dependability description data stored in the dependability description storage section, so that consistency between dependability description and the operation of the failure-monitoring control section is maintained.

Furthermore, the computer system may be arranged such that a part of the dependability description is patterned, and the failure-monitoring control data is generated from the dependability description by using a table (D-Case pattern <=> module correspondence table) indicative of a correspondence between a pattern of the dependability description and failure-monitoring control data.

The computer system may be arranged so as to further comprise a monitor management section (monitor management section 40) and an action management section (action management section 60), the monitor management section managing at least one monitoring module (monitoring module group 50) and the action management section managing at least one action module (action module group 70), failure-monitoring control data being generated from dependability description by using a table indicative of a correspondence between (i) selection of a monitoring module and control of operation of the monitoring module by the monitor management section and selection and control of an action module by the action management section and (ii) a pattern of dependability description.

A method for controlling the computer system may be arranged so as to comprise: a dependability description storage step (D-Case storage step S1) of storing dependability description data indicative of agreement among stakeholders on dependability; a failure-monitoring control step (failure-monitoring execution step S3) of a failure-monitoring control section monitoring a state inside a target system and executing a response procedure if necessary, and a dependability description conversion step (D-Case reading-out step S2, D-Case conversion step S3) of generating, from dependability description, failure-monitoring control data for controlling an operation in the failure-monitoring control step, the failure-monitoring control data always being generated in the dependability description conversion step from the dependability description data stored in the dependability description storage step, so that consistency between dependability description and the operation of the failure-monitoring control section is maintained.

Each block of the failure response system 1, particularly the D-Case conversion section 21 of the dependability maintenance device 20, may be realized by hardware logic or by software by using CPUs as described below.

In the latter case, the failure response system 1 includes: CPUs (central processing unit) for executing a program for realizing functions of each block; ROMs (read only memory) that store the program; RAMs (random access memory) that deploy the program; storage devices (storage mediums) such as memories that store the program and various data; and the like. The objective of the present invention can be realized in such a manner that the failure response system 1 or the dependability maintenance device 20 is provided with a computer-readable storage medium for storing program codes (such as executable program, intermediate code program, and source program) of programs of the failure response system 1 or the dependability maintenance device 20 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a floppy disc(registered trademark) and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the failure response system 1 or the dependability maintenance device 20 may be arranged so as to be connectable to a communication network so that the program code is supplied to the failure response system 1 or the dependability maintenance device 20 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth (registered trademark), 802.11, HDR, mobile phone network, satellite connections, and terrestrial digital network. Note that the present invention can be also realized by the program codes in the form of a computer data signal embedded in a carrier wave, which is the program that is electrically transmitted.

In the above explanation, functional blocks and procedures were illustrated and referred to. Separation/integration of functions or movement of procedures is possible as long as the aforementioned functions are satisfied, and the above explanation does not intend to limit the scope of the present invention.

(1) A dependability maintenance device of the present invention is a dependability maintenance device, which generates failure-monitoring control data for controlling an operation of a failure-monitoring control section for monitoring a state of a monitoring control target system and executing a response procedure if necessary, and which supplies the failure-monitoring control data to the failure-monitoring control section, comprising: a dependability description conversion section for reading out, from a dependability description storage section, dependability description data indicative of a requirement and specification regarding dependability of the monitoring control target system, and generating the failure-monitoring control data from the dependability description data having been read out.

(6) A method of the present invention for controlling a dependability maintenance device is a method for controlling a dependability maintenance device which generates failure-monitoring control data for controlling an operation of a failure-monitoring control section for monitoring a state of a monitoring control target system and executing a response procedure if necessary, and which supplies the failure-monitoring control data to the failure-monitoring control section, the method comprising the steps of: reading out, from a dependability description storage section, dependability description data indicative of a requirement and specification regarding dependability of the monitoring control target system, and generating the failure-monitoring control data from the dependability description data having been read out.

With the arrangements, failure-monitoring control data is generated by the dependability maintenance device from dependability description data read out from the dependability description storage section. The failure-monitoring control section operates in accordance with the failure-monitoring control data, thereby monitoring the state of the monitoring control target system and executing a response procedure if necessary.

The dependability description data is a description of a specification regarding the dependability of the monitoring control target system. It is desirable that when stakeholders of the monitoring control target system agree on the dependability of the monitoring control target system, the result of the agreement is described as dependability description data, which is stored in the dependability description storage section.

As described above, the failure-monitoring control data used by the failure-monitoring control section is generated by the dependability maintenance device from the dependability description data stored in the dependability description storage section, so that it is possible to always maintain consistency between the dependability description data and the operation of the failure-monitoring control section.

(2) The dependability maintenance device of the present invention in the arrangement (1) is arranged such that the failure-monitoring control section is capable of selecting, out of a plurality of modules, a module used for monitoring the state of the monitoring control target system and executing a response procedure if necessary, and of controlling the selected module, the dependability description data is written in a format in which one description includes at least a variable to which module-specifying information for specifying the module is settable as a value, and the dependability description conversion section converts a description to be converted, which is included in the dependability description data, into failure-monitoring control data corresponding to module-specifying information included in the description, in accordance with information indicative of a preset correspondence between the module-specifying information and the failure-monitoring control data.

With the arrangement, the description to be converted, which is included in the dependability description data, is converted into failure-monitoring control data for causing the failure-monitoring control section to select and control a module specified by module-specifying information included in the description.

Consequently, even in a case where there are a plurality of modules controllable by the failure-monitoring control section, it is possible to generate failure-monitoring control data targeting an appropriate module, based on the description of the dependability description data.

(3) The dependability maintenance device of the present invention in the arrangement (2) is arranged such that the correspondence is set according to a fixed part other than a variable part in one description in the dependability description data, and the dependability description conversion section converts a description in the dependability description data into corresponding failure-monitoring control data by referring to the correspondence set according to the fixed part in the description in the dependability description data.

With the arrangement, the description to be converted, which is included in the dependability description data, is converted, by referring to a correspondence set according to a fixed part other than a variable part in the description, into corresponding failure-monitoring control data.

This allows different correspondences to be related to each fixed part in the description of the dependability description data. Accordingly, even when variables in module-specifying information etc. are the same, different fixed parts enable the description in the dependability description data to be converted into failure-monitoring control data by using different correspondences. This realizes various conversions by a simple rule.

(4) A failure response system of the present invention may be arranged so as to comprise: a dependability maintenance device as set forth in any one of the arrangements (1) to (3); the dependability description storage section; and the failure-monitoring control section, the failure-monitoring control section operating in accordance with failure-monitoring control data generated by the dependability maintenance device from dependability description data read out from the dependability description storage section, so as to monitor a state of the monitoring control target system and execute a response procedure if necessary.

(5) The failure response system of the present invention in the arrangement (4) may be arranged so as to further comprise: at least one monitoring module for monitoring the state of the monitoring control target system; at least one action module for executing a response procedure on the monitoring control target system if necessary; a monitor management section for selecting the monitoring module and controlling an operation of the monitoring module under control of the failure-monitoring control section; and an action management section for selecting the action module and controlling an operation of the action module under control of the failure-monitoring control section.

The dependability maintenance device and the failure response system may be realized by a computer. In this case, the scope of the present invention also encompasses a program of the dependability maintenance device for causing a computer to function as the dependability description conversion section to realize the dependability maintenance device by a computer, and a computer-readable storage medium storing the program.

In the above explanation, functional blocks and procedures were illustrated and referred to. Separation/integration of functions or movement of procedures is possible as long as the aforementioned functions are satisfied, and the above explanation does not intend to limit the scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The dependability maintenance device of the present invention provides solutions for three problems in an open environment with potential incompleteness and uncertainty: misunderstanding of a requirement among stakeholders; unableness to respond to an environment change; and unsuccess to respond to failure. Therefore, the dependability maintenance device of the present invention can be widely used for system development and system operation in an open environment.

Furthermore, the failure response system of the present invention and the dependability maintenance device of the present invention allow easy description of agreement among stakeholders, and allow maintenance of the description of the agreement and implementation of a module in such a manner that the description of the agreement and the implementation of a module are developed and updated with consistency therebetween when a part of the monitoring control target system is updated. Therefore, the present invention is preferably used as a device/method for maintaining dependability of various systems such as an embedded system and multiple systems connected with each other via the Internet etc.

REFERENCE SIGNS LIST

100 (100U, 100S, 100B, 100P) Dependability maintenance system
101 Workspace computer (dependability maintenance device, workspace device, change accommodation cycle execution device)
101-05 D value calculation section (dependability value determining means)
102 Runtime computer (dependability maintenance device, runtime device, failure response cycle execution device)
102-04 Reconfiguration section (reconfiguration means)
102-06 D value calculation section (dependability value determining means)
102-07 Script process section (script process means)
901-01 (dependability description data input section (description data acquiring means)
902-01 Software input section (description data acquiring means)
902-02 Change transmission section (change request transmission means)
P300 Change accommodation cycle
P301 Failure response cycle
1 Failure response system
2 Monitoring control target system
10 D-Case storage section (dependability description storage section)
20 Dependability maintenance device
21 D-Case conversion section (dependability description conversion section, dependability description conversion means)
22 D-Case pattern <=> module correspondence table
30 Failure monitoring control section
40 Monitor management section
50 Monitoring module group (module)
60 Action management section
70 Action module group (module)
S2 Reading out step
S3 Conversion step

The invention claimed is:

1. A dependability maintenance system for maintaining dependability of a target system, comprising:
a change accommodation cycle execution device for executing a change accommodation cycle for adding and/or modifying dependability description data indicative of a requirement and specification regarding the dependability of the target system, in accordance with a change in a requirement and specification regarding the target system, during development of the target system or during update of the target system in operation;
a failure response cycle execution device for executing a failure response cycle for avoiding abort of the target system based on the dependability description data when occurrence of failure or a sign of failure is detected during operation of the target system, and
change request transmission means for, when the failure response cycle execution device detects the occurrence of the failure or the sign of failure and abort of the target system is unavoidable, transmitting a request for changing the dependability description data to the change accommodation cycle execution device.

2. The dependability maintenance system as set forth in claim 1, further comprising a dependability description storage section for storing the dependability description data,
the change accommodation cycle execution device and the failure response cycle execution device executing the change accommodation cycle and the failure response cycle one by one or simultaneously while the change accommodation cycle execution device and the failure response cycle execution device share the dependability description data stored in the dependability description storage section.

3. The dependability maintenance system as set forth in claim 1, further comprising reconfiguration means for, when the failure response cycle execution device detects the occurrence of the failure or the sign of the failure, reconfiguring the target system based on the dependability description data.

4. The dependability maintenance system as set forth in claim 3, wherein
the dependability description data describes a procedure of the reconfiguration, and
the reconfiguration means reconfigures the target system in accordance with the procedure of the reconfiguration.

5. The dependability maintenance system as set forth in claim 1, wherein
when the change accommodation cycle execution device receives a requirement for changing the dependability description data, the change accommodation cycle execution device changes the dependability description data.

6. The dependability maintenance system as set forth in claim 1, further comprising dependability value determining means for acquiring the dependability description data from the dependability description storage section to determine an evaluation value quantitatively indicative of a value of the dependability of the target system,
the dependability value determining means determining the evaluation value in the change accommodation cycle or the failure response cycle.

7. The dependability maintenance system as set forth in claim 6, wherein
the dependability description data is data defining a set of a goal node and a monitor node which are related to each other,
the goal node is a node in which a requirement and specification are described in goal form,
the monitor node is evidence which shows that a goal described in the goal node is met and which corresponds to a monitoring point of the target system, and
the dependability value determining means calculates the evaluation value based on a tolerable range of variation for which data acquired from a corresponding monitoring point is related to a monitor node.

8. The dependability maintenance system as set forth in claim 7, wherein the dependability value determining means calculates the evaluation value based on evidence whose monitor value acquired by monitoring the target system is satisfactory with respect to a tolerable range of variation.

9. The dependability maintenance system as set forth in claim 1, further comprising script process means for, when the failure response cycle execution device detects the occurrence of the failure or the sign of the failure, executing a script included in the dependability description data,
the script including a scenario for restoring the target system to be in a state defined by a tolerable range of variation.

10. The dependability maintenance system as set forth in claim 1, further comprising:
a failure-monitoring control section for monitoring a state of the target system and executing a response procedure if necessary;
a dependability description storage section for storing the dependability description data; and dependability description conversion means for reading out the dependability description data from the dependability description storage section, generating, from the read-out dependability description data, failure-monitoring control data for controlling an operation of the failure-monitoring control section, and supplying the failure-monitoring control data to the failure-monitoring control section, the failure-monitoring control section operating in accordance with the failure-monitoring control data, so as to monitor the state of the target system and execute a response procedure if necessary.

11. The dependability maintenance system as set forth in claim 10, further comprising:
at least one monitoring module for monitoring the state of the target system;
at least one action module for executing a response procedure on the target system if necessary;
a monitor management section for selecting the monitoring module and controlling an operation of the monitoring module under control of the failure-monitoring control section; and
an action management section for selecting the action module and controlling an operation of the action module under control of the failure-monitoring control section.

12. The dependability maintenance system as set forth in claim 1, which is connected with other dependability maintenance system via a network.

13. A change accommodation cycle execution device, constituting the dependability maintenance system as set forth in claim 1.

14. A failure response cycle execution device, constituting the dependability maintenance system as set forth in claim 1.

15. The failure response cycle execution device as set forth in claim 14, comprising dependability description conversion means for reading out the dependability description data from a dependability description storage section, and generating, from the read-out dependability description data, failure-monitoring control data for controlling an operation of a failure-monitoring control section for monitoring a state of the target system and executing a response procedure if necessary.

16. The failure response cycle execution device as set forth in claim 15, wherein
the failure-monitoring control section is capable of selecting, out of a plurality of modules, a module used for monitoring the state of the target system and executing a response procedure if necessary, and of controlling the selected module,
the dependability description data is written in a format in which one description includes at least a variable to which module-specifying information for specifying the module is settable as a value, and
the dependability description conversion means converts a description to be converted, which is included in the dependability description data, into failure-monitoring control data corresponding to module-specifying information included in the description, in accordance with information indicative of a preset correspondence between the module-specifying information and the failure-monitoring control data.

17. The failure response cycle execution device as set forth in claim 16, wherein
the correspondence is set according to a fixed part other than a variable part in one description in the dependability description data, and
the dependability description conversion means converts a description in the dependability description data into corresponding failure-monitoring control data by referring to the correspondence set according to the fixed part in the description in the dependability description data.

18. A control program stored in a non-transitory storage medium, the control program causing a computer to function as the dependability description conversion means of a failure-response cycle execution device as set forth in claim 15.

19. A control program stored in a non-transitory storage medium, the control program causing a computer to function as the means of a dependability maintenance system as set forth in claim 1.

20. A method for controlling a dependability maintenance system for maintaining dependability of a target system,
the method comprising:
a change accommodation cycle carried out by a change accommodation cycle execution device in the dependability maintenance system, for adding and/or modifying dependability description data indicative of a requirement and specification regarding the dependability of the target system, in accordance with a change in a requirement and specification regarding the target system, during development of the target system or during update of the target system in operation;
a failure response cycle carried out by a failure response cycle execution device in the dependability maintenance system, for avoiding abort of the target system based on the dependability description data when occurrence of failure or a sign of failure is detected during operation of the target system, and
when the failure response cycle execution device detects the occurrence of the failure or the sign of the failure and abort of the target system is unavoidable, transmitting a request for changing the dependability description data to the change accommodation cycle execution device.

21. The method as set forth in claim 20, further comprising the steps of:
reading out the dependability description data from a dependability description storage section, and
generating, from the read-out dependability description data, failure-monitoring control data for controlling an operation of a failure-monitoring control section for monitoring a state of the target system and executing a response procedure if necessary.

* * * * *